(12) United States Patent
Monden et al.

(10) Patent No.: US 8,642,495 B2
(45) Date of Patent: Feb. 4, 2014

(54) CATALYST, PRODUCTION PROCESS THEREFOR AND USE THEREOF

(75) Inventors: Ryuji Monden, Chiba (JP); Tadatoshi Kurozumi, Chiba (JP); Toshikazu Shishikura, Chiba (JP); Takuya Imai, Chiba (JP)

(73) Assignee: Showa Denko K.K., Tokyo (JP)

( * ) Notice: Subject to any disclaimer, the term of this patent is extended or adjusted under 35 U.S.C. 154(b) by 755 days.

(21) Appl. No.: 12/863,405

(22) PCT Filed: Jan. 16, 2009

(86) PCT No.: PCT/JP2009/050570
§ 371 (c)(1),
(2), (4) Date: Jul. 16, 2010

(87) PCT Pub. No.: WO2009/091043
PCT Pub. Date: Jul. 23, 2009

(65) Prior Publication Data
US 2011/0053040 A1  Mar. 3, 2011

(30) Foreign Application Priority Data

Jan. 18, 2008 (JP) ................................. 2008-009272
Sep. 30, 2008 (JP) ................................. 2008-253577

(51) Int. Cl.
H01M 4/88 (2006.01)
B01J 27/20 (2006.01)
H01M 8/10 (2006.01)
H01M 4/02 (2006.01)
H01M 4/36 (2006.01)

(52) U.S. Cl.
USPC ............ 502/174; 502/101; 429/483; 429/524

(58) Field of Classification Search
None
See application file for complete search history.

(56) References Cited

U.S. PATENT DOCUMENTS

| | | | |
|---|---|---|---|
| 3,492,100 A | 1/1970 | Roubin et al. | |
| 4,418,154 A | 11/1983 | McCandlish et al. | |
| 4,828,664 A | 5/1989 | Dietrich et al. | |
| 5,811,624 A * | 9/1998 | Hantzer et al. | 585/700 |
| 6,799,076 B2 | 9/2004 | Gelb et al. | |
| 7,194,315 B1 | 3/2007 | Platt et al. | |
| 7,767,330 B2 * | 8/2010 | Merzougui et al. | 429/524 |
| 2001/0032005 A1 | 10/2001 | Gelb et al. | |
| 2010/0331172 A1 | 12/2010 | Monden et al. | |

FOREIGN PATENT DOCUMENTS

| | | |
|---|---|---|
| EP | 0 053 018 A1 | 6/1982 |
| EP | 2 258 474 A1 | 12/2010 |
| FR | 1508370 | 1/1968 |
| GB | 1213999 | 11/1970 |
| JP | 2003-012375 A | 1/2003 |
| JP | 2003-342058 A | 12/2003 |
| JP | 2006-107967 A | 4/2006 |
| JP | 2006-134603 A | 5/2006 |
| JP | 2007-031781 A | 2/2007 |
| JP | 2008-108594 A | 5/2008 |
| WO | 2009/031383 A1 | 3/2009 |

OTHER PUBLICATIONS

Doi et al. "Zirconium-Based Compounds for Cathode of Polymer Electrolyte Fuel Cell", J Electrochem Society, 2007, 154 (3), pp. B362-B369.
Ohgi, Y. et al., "Catalytic activity of partially-oxidized transition metal carbonitrides for oxygen reduction reaction", Electrochem Soc of Japan, Mar. 29, 2007, p. 94, English translation.
European Office Action issued in corresponding European Application No. 09702714.8 dated Nov. 9, 2012.

* cited by examiner

Primary Examiner — Milton I Cano
Assistant Examiner — Sarah A Slifka
(74) Attorney, Agent, or Firm — Sughrue Mion, PLLC

(57) ABSTRACT

Catalysts of the invention are not corroded in acidic electrolytes or at high potential and have excellent durability and high oxygen reducing ability. A catalyst includes a metal oxycarbonitride containing niobium and at least one metal M selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel. A process for making the catalyst involves a heat treatment.

20 Claims, 39 Drawing Sheets

[Fig. 25]
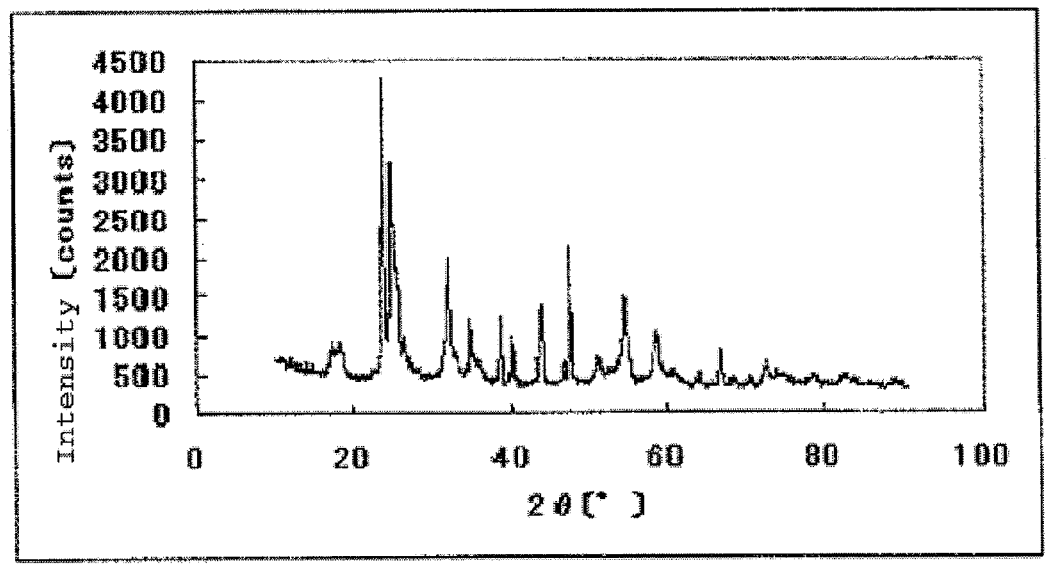
[Fig. 26]
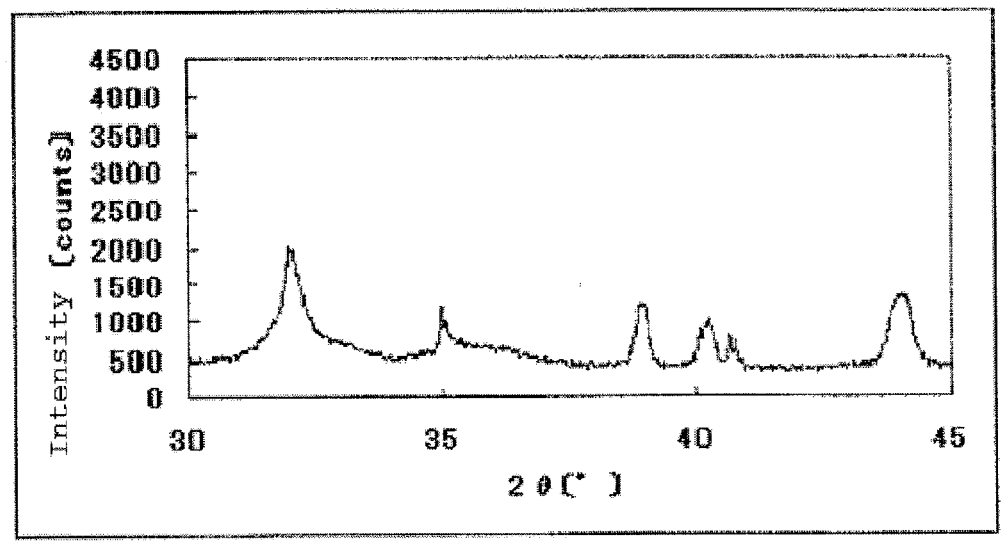

CATALYST, PRODUCTION PROCESS THEREFOR AND USE THEREOF

FIELD OF THE INVENTION

The present invention relates to catalysts, processes for producing the catalysts, and use of the catalysts.

BACKGROUND OF THE INVENTION

Fuel cells are classified into several types according to the electrolytes or electrodes used therein. Typical types are alkaline types, phosphoric acid types, molten carbonate types, solid electrolyte types and polymer electrolyte types. In particular, polymer electrolyte fuel cells that can operate at temperatures ranging from low temperatures (about −40° C.) to about 120° C. attract attention and are progressively developed and practically used as power sources for low pollution automobiles. The polymer electrolyte fuel cells are expected to be used as automobile drive sources or stationary power sources. The use in these applications requires long-term durability.

The polymer electrolyte fuel cell has a solid polymer electrolyte sandwiched between an anode and a cathode. A fuel is fed to the anode, and oxygen or air is supplied to the cathode, whereby oxygen is reduced at the cathode to produce electricity. The fuel is usually hydrogen or methanol.

To increase the reaction rate in fuel cells and enhance the energy conversion efficiency, a layer containing a catalyst (hereinafter, also the fuel cell catalyst layer) is conventionally provided on the surface of a cathode (an air electrode) or an anode (a fuel electrode) of fuel cells.

Here, noble metals are generally used as the catalysts. Of the noble metals, platinum that is stable at high potential and has high catalytic activity is most frequently used. However, since platinum is expensive and exists in a limited amount, alternative catalysts have been desired.

Further, the noble metals used on a cathode surface are often dissolved in an acidic atmosphere and are not suited in applications requiring long-term durability. Accordingly, it has been strongly demanded that catalysts are developed which are not corroded in an acidic atmosphere and have excellent durability and high oxygen reducing ability.

Materials containing nonmetals such as carbon, nitrogen and boron capture attention as alternative catalysts to platinum. The materials containing these nonmetals are inexpensive compared to noble metals such as platinum and are abundant.

Nonpatent Document 1 reports that zirconium-based ZrOxN compounds show oxygen reducing ability.

Patent Document 1 discloses, as platinum-alternative materials, oxygen-reducing electrode materials containing a nitride of one or more elements selected from Groups 4, 5 and 14 in the long periodic table.

However, the materials containing these nonmetals do not provide sufficient oxygen reducing ability for practical use as catalysts.

Patent Document 2 discloses an oxycarbonitride obtained by mixing a carbide, an oxide and a nitride and heat treating the mixture in vacuum or an inert or non-oxidative atmosphere at 500 to 1500° C.

However, the oxycarbonitride disclosed in Patent Document 2 is a thin-film magnetic head ceramic substrate material, and the use of the oxycarbonitride as catalyst is not considered therein.

Meanwhile, platinum is useful not only as a fuel cell catalyst as described above but as a catalyst in exhaust gas treatment or organic synthesis. However, the expensiveness and the limited amount of platinum have created a need of alternative catalysts in these applications too.

Patent Document 1: JP-A-2007-31781
Patent Document 2: JP-A-2003-342058
Nonpatent Document 1: Journal of The Electrochemical Society, S. Doi, A. Ishihara, S. Mitsushima, N. Kamiya, and K. Ota, 2007, 154 (3) B362-B369

DISCLOSURE OF THE INVENTION

Problems to be Solved by the Invention

The present invention is aimed at solving the problems in the background art as described above. It is therefore an object of the invention to provide catalysts that are not corroded in acidic electrolytes or at high potential and have excellent durability and high oxygen reducing ability.

Means for Solving the Problems

The present inventors studied diligently to solve the conventional problems in the art. They have then found that catalysts which are formed of a metal oxycarbonitride containing a specific metal and niobium are not corroded in acidic electrolytes or at high potential and have excellent durability and high oxygen reducing ability. The present invention has been completed based on the finding.

The present invention is concerned with the following (1) to (21), for example.

(1) A catalyst which comprises a metal oxycarbonitride containing niobium and at least one metal (hereinafter the "metal M" or "M") selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel.

(2) The catalyst as described in (1) above, wherein the metal oxycarbonitride has a compositional formula represented by $Nb_aM_bC_xN_yO_z$, (wherein a, b, x, y and z represent a ratio of the numbers of the atoms, $0.01 \leq a < 1$, $0 < b \leq 0.99$, $0.01 \leq x \leq 2$, $0.01 \leq y \leq 2$, $0.01 \leq z \leq 3$, $a+b=1$, and $x+y+z \leq 5$).

(3) The catalyst as described in (1) or (2) above, wherein the metal oxycarbonitride shows two or more diffraction peaks at diffraction angles 2θ of 33° to 43° as measured by powder X-ray diffractometry (Cu—Kα radiation).

(4) The catalyst as described in any one of (1) to (3) above, wherein the metal oxycarbonitride is a mixture comprising a plurality of phases and the metal oxycarbonitride shows a peak assigned to $Nb_{12}O_{29}$ as measured by powder X-ray diffractometry (Cu—Kα radiation).

(5) A process for producing a catalyst comprising a metal oxycarbonitride, the process comprising a step (ia) of heat treating a mixture comprising an oxide of at least one metal M, niobium oxide and carbon in a nitrogen atmosphere or an inert gas containing nitrogen to give a metal carbonitride, the at least one metal M being selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel; and a step (ii) of heat treating the metal carbonitride in an oxygen-containing inert gas to give a catalyst comprising a metal oxycarbonitride.

(6) A process for producing a catalyst comprising a metal oxycarbonitride, the process comprising a step (ib) of heat treating a mixture comprising an oxide of at least one metal M, niobium carbide and niobium nitride in an inert gas to give a metal carbonitride, the at least one metal M being selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel; and a step (ii) of heat treating the metal carbonitride in an oxygen-containing inert gas to give a catalyst comprising a metal oxycarbonitride.

(7) A process for producing a catalyst comprising a metal oxycarbonitride, the process comprising a step (ic) of heat treating a mixture comprising an oxide of at least one metal M, niobium carbide, niobium nitride and niobium oxide in an inert gas to give a metal carbonitride, the at least one metal M being selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel; and a step (ii) of heat treating the metal carbonitride in an oxygen-containing inert gas to give a catalyst comprising a metal oxycarbonitride.

(8) A process for producing a catalyst comprising a metal oxycarbonitride, the process comprising a step (id) of heat treating a mixture comprising a compound containing at least one metal M, niobium carbide and niobium nitride in an inert gas to give a metal carbonitride, the at least one metal M being selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel; and a step (ii) of heat treating the metal carbonitride in an oxygen-containing inert gas to give a catalyst comprising a metal oxycarbonitride.

(9) The process as described in (5) above, wherein the heat treatment in the step (ia) is performed at a temperature in the range of 600 to 1800° C.

(10) The process as described in (6) above, wherein the heat treatment in the step (ib) is performed at a temperature in the range of 600 to 1800° C.

(11) The process as described in (7) above, wherein the heat treatment in the step (ic) is performed at a temperature in the range of 600 to 1800° C.

(12) The process as described in (8) above, wherein the heat treatment in the step (id) is performed at a temperature in the range of 600 to 1800° C.

(13) The process as described in any one of (5) to (12) above, wherein the heat treatment in the step (ii) is performed at a temperature in the range of 400 to 1400° C.

(14) The process as described in any one of (5) to (13) above, wherein the inert gas in the step (ii) has an oxygen gas concentration in the range of 0.1 to 10% by volume.

(15) The process as described in any one of (5) to (14) above, wherein the inert gas in the step (ii) contains hydrogen gas at not more than 5% by volume.

(16) A catalyst layer for fuel cells, comprising the catalyst described in any one of (1) to (4) above.

(17) The catalyst layer for fuel cells as described in (16) above, further comprising electron conductive particles.

(18) An electrode comprising a catalyst layer for fuel cells and a porous support layer, wherein the catalyst layer for fuel cells is the catalyst layer for fuel cells as described in (16) or (17) above.

(19) A membrane electrode assembly comprising a cathode, an anode and an electrolyte membrane interposed between the cathode and the anode, wherein the cathode and/or the anode is the electrode as described in (18) above.

(20) A fuel cell comprising the membrane electrode assembly as described in (19) above.

(21) A polymer electrolyte fuel cell comprising the membrane electrode assembly as described in (19) above.

Advantageous Effects of the Invention

The catalysts according to the invention are stable and are not corroded in acidic electrolytes or at high potential, have high oxygen reducing ability and are inexpensive compared to platinum. The fuel cells having the catalysts are therefore relatively inexpensive and have high performance.

BRIEF DESCRIPTION OF THE DRAWINGS

FIG. 25 is a powder X-ray diffraction spectrum of a catalyst (21) in Example 20.

FIG. 26 is an enlarged view of the powder X-ray diffraction spectrum of the catalyst (21) in Example 20 at diffraction angles $2\theta$ of 30° to 45°.

PREFERRED EMBODIMENTS FOR CARRYING OUT THE INVENTION

<Catalysts>

Figure 1:
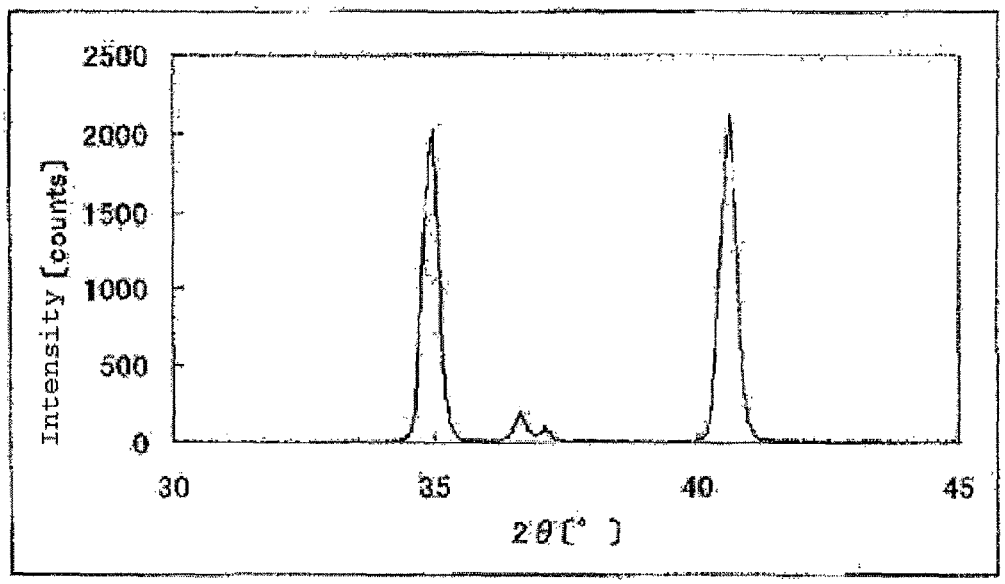
FIG. 1 is a powder X-ray diffraction spectrum of a catalyst (1) in Example 1.

Catalysts according to the invention are formed of a metal oxycarbonitride containing niobium and at least one metal M selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel.

The metal oxycarbonitride preferably has a compositional formula represented by $Nb_aM_bC_xN_yO_z$ (wherein a, b, x, y and z represent a ratio of the numbers of the atoms, $0.01 \le a < 1$, $0 < b \le 0.99$, $0.01 \le x \le 2$, $0.01 \le y \le 2$, $0.01 \le z \le 3$, $a+b=1$, and $x+y+z \le 5$).

In a preferred embodiment of the compositional formula, $0.05 \le a \le 0.99$, $0.01 \le b \le 0.95$ (more preferably $0.50 \le a \le 0.99$, $0.01 \le b \le 0.50$, and still more preferably $0.80 \le a \le 0.99$, $0.01 \le b \le 0.20$), $0.01 \le x \le 2$, $0.01 \le y \le 2$, $0.05 \le z \le 3$, and $0.07 \le x+y+z \le 5$.

When the numbers of the atoms have the above ratio, the obtainable catalyst tends to have an increased oxygen reduction potential.

When the metal M is platinum, the subscript letter b in the compositional formula ($Nb_aM_bC_xN_yO_z$) is not more than 0.50, and preferably not more than 0.20 to limit the use amount of expensive and scarce platinum.

In the invention, the "metal oxycarbonitride containing the metal M and niobium" indicates either or both a compound represented by a compositional formula $Nb_aM_bC_xN_yO_z$ and a mixture which contains metal M oxide, metal M carbide, metal M nitride, metal M carbonitride, metal M oxycarbide, metal M oxynitride, niobium oxide, niobium carbide, niobium nitride, niobium carbonitride, niobium oxycarbide, niobium oxynitride, oxide having the metal M and niobium, carbide having the metal M and niobium, nitride having the metal M and niobium, carbonitride having the metal M and niobium, oxycarbide having the metal M and niobium, and oxynitride having the metal M and niobium and which is represented as a whole by a compositional formula $Nb_aM_bC_xN_yO_z$ (the mixture may not contain a compound represented by $Nb_aM_bC_xN_yO_z$). In particular, the metal oxycarbonitride preferably contains niobium oxides such as $Nb_{12}O_{29}$ having oxygen vacancies, in which case the obtainable catalyst tends to have an increased oxygen reduction potential.

In a preferred embodiment, the above compounds show two or more diffraction peaks at diffraction angles $2\theta$ of 33° to 43° as measured by powder X-ray diffractometry (Cu—K$\alpha$ radiation). When two or more diffraction peaks are observed, the obtainable catalysts tend to have a higher oxygen reduction potential.

The diffraction peak is a peak that is observed at a specific diffraction angle and a specific diffraction intensity when a sample (crystal) is irradiated with X-rays at various angles. In the invention, a signal that is detected with a signal (S) to noise (N) ratio (S/N) of 2 or more is regarded as a diffraction peak. Here, the noise (N) is the width of the baseline.

The X-ray diffractometer may be powder X-ray diffractometer Rigaku RAD-RX. The measurement conditions may be X-ray output (Cu—K$\alpha$): 50 kV, 180 mA; scan axis: $\theta/2\theta$; measurement angles ($2\theta$): 10° to 89.98°; measurement mode: FT; scanning width: 0.02°; sampling time: 0.70 sec; DS, SS and RS: 0.5°, 0.5° and 0.15 mm; goniometer radius: 185 mm.

In a preferred embodiment, the metal oxycarbonitride is a mixture containing a plurality of phases and the metal oxycarbonitride shows a peak assigned to $Nb_{22}O_{29}$ as measured by powder X-ray diffractometry (Cu—K$\alpha$ radiation). The mixture may show other peaks assigned to oxides such as $NbO$, $NbO_2$, $Nb_2O_5$, $Nb_{25}O_{62}$, $Nb_{47}O_{116}$ and $Nb_{22}O_{54}$.

Structures of the metal oxycarbonitrides are unclear, but the metal oxycarbonitrides probably have a phase composed of oxide such as $Nb_{22}O_{29}$ having oxygen vacancies. In general, $Nb_{22}O_{29}$ alone does not have high oxygen reducing ability. The present inventors assume that oxides such as $Nb_{22}O_{29}$ having oxygen vacancies exist as phases in the metal oxycarbonitrides and thus the final catalysts show high oxygen reducing ability.

In the metal oxycarbonitrides, units which are each composed of $Nb_{22}O_{29}$ with oxygen vacancies are probably linked together via bridge coordination of oxygen between Nb and Nb of adjacent units (Nb—O—O—Nb). Although the mechanism of the exhibition of oxygen reducing ability is not clear, it is assumed that the Nb atoms participating in the bridge coordination (Nb—O—O—Nb) function as active sites to permit the compounds to display oxygen reducing ability. When $Nb_{12}O_{29}$ units having oxygen vacancies overlap one another, the bond distance between Nb and Nb of adjacent units is shorter. It is assumed that the oxygen reducing ability is enhanced as the compounds have an increased number of such short bonds. It is also assumed that the presence of carbon or nitrogen in the units changes the electron density around Nb and the catalytic activity is improved as a result. Also, the presence of carbon or nitrogen may be responsible for enhanced electron conductivity, but the reason for the improved performance is not exactly known.

The catalyst used in the invention preferably has an oxygen reduction onset potential of not less than 0.5 V as measured versus a reversible hydrogen electrode (vs. NHE) by the measurement method (A) described below.

[Measurement Method (A)] A catalyst and carbon are added to a solvent so that the catalyst dispersed in the carbon being electron conductive particles accounts for 1% by mass. The mixture is ultrasonically stirred to give a suspension. The carbon source herein is carbon black (specific surface area: 100-300 $m^2/g$) (e.g., XC-72 manufactured by Cabot Corporation), and the catalyst is dispersed therein with a catalyst: carbon mass ratio of 95:5. The solvent is a mixture of isopropyl alcohol:water (=2:1 by mass).

While ultrasonicating the suspension, a 30 $\mu$l portion thereof is collected and is quickly dropped on a glassy carbon electrode (diameter: 5.2 mm) and dried at 120° C. for 1 hour to form a fuel cell catalyst layer containing the catalyst on the glassy carbon electrode.

Subsequently, 10 $\mu$l of Nafion (a 5% Nafion solution (DE521) manufactured by Du Pont Kabushiki Kaisha) diluted ten times with pure water is dropped on the fuel cell catalyst layer and is dried at 120° C. for 1 hour.

Using the electrode manufactured above, polarization is carried out in a 0.5 mol/$dm^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode in a sulfuric acid solution of the same concentration is used. In the current-potential curve, the potential at which the reduction current starts to differ by 0.2 $\mu$A/$cm^2$ or more between the polarization under the oxygen atmosphere and that under the nitrogen atmosphere is obtained as the oxygen reduction onset potential.

If the oxygen reduction onset potential is less than 0.7 V (vs. NHE), the use of the catalyst in a fuel cell cathode may cause the generation of hydrogen peroxide. For the oxygen reduction, the oxygen reduction onset potential is preferably 0.85 V (vs. NHE) or above. A higher oxygen reduction onset potential is more preferable. The upper limit of the oxygen reduction onset potential is not particularly limited but is theoretically 1.23 V (vs. NHE).

The catalyst layer for fuel cells according to the invention that is prepared using the inventive catalyst is preferably used at a potential of not less than 0.4 V (vs. NHE) in an acidic electrolyte. The upper limit of the potential depends on the stability of the electrode. The electrode according to the invention may be used at as high a potential as about 1.23 V (vs. NHE) which is the oxygen generation potential.

At a potential of less than 0.4 V (vs. NHE), the compound can exist stably but oxygen cannot be reduced sufficiently. Catalysts having such a low potential are not useful in catalyst layers used in membrane electrode assemblies for fuel cells.

<Catalyst Production Processes>

The catalysts described above may be produced by any processes without limitation. An exemplary production process may include a step in which a metal carbonitride containing niobium and at least one metal M selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel, is heat treated in an oxygen-containing inert gas to give a metal oxycarbonitride containing niobium and at least one metal M selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel.

The metal carbonitride used in the above step may be obtained by a method (I) in which a mixture containing an oxide of the metal M, niobium oxide and carbon is heat treated in a nitrogen atmosphere or an inert gas containing nitrogen to give a metal carbonitride; a method (II) in which a mixture containing an oxide of the metal M, niobium carbide and niobium nitride is heat treated in an inert gas such as nitrogen gas to give a metal carbonitride; a method (III) in which a mixture containing an oxide of the metal M, niobium carbide, niobium nitride and niobium oxide is heat treated in an inert gas such as nitrogen gas to give a metal carbonitride; or a method (IV) in which a mixture containing a compound of the metal M (for example an organic acid salt, chloride, carbide, nitride or complex), niobium carbide and niobium nitride is heat treated in an inert gas such as nitrogen gas to give a metal carbonitride. The materials are not particularly limited as long as the metal carbonitride is obtained. For example, the materials used in the production methods (I) to (IV) and other materials may be used in combination. That is, the metal carbonitride may be produced by a method (V) in which a mixture of these materials is heat treated in an inert gas such as nitrogen gas.

[Production Method (I)]

In the production method (I), a mixture containing an oxide of the metal M, niobium oxide and carbon is heat treated in a nitrogen atmosphere or an inert gas containing nitrogen to give a metal carbonitride.

The heat treatment to produce the metal carbonitride is performed at a temperature in the range of 600 to 1800° C., and preferably 800 to 1600° C. This heat treatment temperature ensures that good crystallinity and homogeneity are obtained. The heat treatment at temperatures lower than 600° C. tends to deteriorate crystallinity and homogeneity. Heat treatment temperatures not lower than 1800° C. tend to result in sintering.

Examples of the oxides of the metals M as materials include tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide, mercury oxide, plutonium oxide, gold oxide, silver oxide, iridium oxide, palladium oxide, yttrium oxide, ruthenium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide and nickel oxide. One or more oxides of the metals M may be used.

Examples of the niobium oxides as materials include NbO, $NbO_2$ and $Nb_2O_5$.

Examples of the carbons as materials include carbon, carbon blacks, graphites, black leads, activated carbons, carbon nanotubes, carbon nanofibers, carbon nanohorns and fullerenes. The carbon preferably has smaller particle diameters. Such carbon particles have a larger specific surface area and react easily with the oxides. A suitable carbon material is carbon black (specific surface area: 100-300 m²/g, for example XC-72 manufactured by Cabot Corporation).

Even any of the above materials are used, metal oxycarbonitride catalysts obtained by heat treating the metal carbonitride, which is prepared from the metal M oxide, the niobium oxide and the carbon, in an oxygen-containing inert gas have a high oxygen reduction onset potential and high activity.

An appropriate metal carbonitride may be produced by controlling the amounts (the molar ratio) of the metal M oxide, the niobium oxide and the carbon.

The amounts (the molar ratio) are usually such that the metal M oxide and the carbon are used at 0.01 to 10 mol and 1 to 10 mol, respectively, based on 1 mol of the niobium oxide, and preferably such that the metal M oxide and the carbon are used at 0.01 to 4 mol and 2 to 6 mol, respectively, based on 1 mol of the niobium oxide. This molar ratio tends to ensure that the obtainable metal carbonitride gives a metal oxycarbonitride having a high oxygen reduction onset potential and high activity.

[Production Method (II)]

In the production method (II), a mixture containing an oxide of the metal M, niobium carbide and niobium nitride is heat treated in an inert gas such as nitrogen gas to give a metal carbonitride.

The heat treatment to produce the metal carbonitride is performed at a temperature in the range of 600 to 1800° C., and preferably 800 to 1600° C. This heat treatment temperature ensures that good crystallinity and homogeneity are obtained. The heat treatment at temperatures lower than 600° C. tends to deteriorate crystallinity and homogeneity. Heat treatment temperatures not lower than 1800° C. tend to result in sintering.

Materials used herein are an oxide of the metal M, niobium carbide and niobium nitride.

Examples of the oxides of the metals M as materials include tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide, mercury oxide, plutonium oxide, gold oxide, silver oxide, iridium oxide, palladium oxide, yttrium oxide, ruthenium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide and nickel oxide. One or more oxides of the metals M may be used.

Examples of the niobium carbides as materials include NbC.

Examples of the niobium nitrides as materials include NbN.

Even any of the above materials are used, metal oxycarbonitride catalysts obtained by heat treating the metal carbonitride, which is prepared from the metal M oxide, the niobium carbide and the niobium nitride, in an oxygen-containing inert gas have a high oxygen reduction onset potential and high activity.

An appropriate metal carbonitride may be produced by controlling the amounts (the molar ratio) of the metal M oxide, the niobium carbide and the niobium nitride. The amounts (the molar ratio) are usually such that the niobium carbide (NbC) and the metal M oxide are used at 0.01 to 500 mol and 0.01 to 50 mol, respectively, based on 1 mol of the niobium nitride (NbN), and preferably such that the niobium carbide (NbC) and the metal M oxide are used at 0.1 to 300 mol and 0.1 to 30 mol, respectively, based on 1 mol of the niobium nitride (NbN). This molar ratio tends to ensure that the obtainable metal carbonitride gives a metal oxycarbonitride having a high oxygen reduction onset potential and high activity.

[Production Method (III)]

In the production method (III), a mixture containing an oxide of the metal M, niobium carbide, niobium nitride and niobium oxide is heat treated in an inert gas such as nitrogen gas to give a metal carbonitride.

The heat treatment to produce the metal carbonitride is performed at a temperature in the range of 600 to 1800° C., and preferably 800 to 1600° C. This heat treatment temperature ensures that good crystallinity and homogeneity are obtained. The heat treatment at temperatures lower than 600° C. tends to deteriorate crystallinity and homogeneity. Heat treatment temperatures not lower than 1800° C. tend to result in sintering.

Materials used herein are an oxide of the metal M, niobium carbide, niobium nitride and niobium oxide.

Examples of the oxides of the metals M as materials include tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide, mercury oxide, plutonium oxide, gold oxide, silver oxide, iridium oxide, palladium oxide, yttrium oxide, ruthenium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide and nickel oxide. One or more oxides of the metals M may be used.

Examples of the niobium carbides as materials include NbC.

Examples of the niobium nitrides as materials include NbN.

Examples of the niobium oxides as materials include NbO, $NbO_2$ and $Nb_2O_5$.

Even any of the above materials are used, metal oxycarbonitride catalysts obtained by heat treating the metal carbonitride, which is prepared from the metal M oxide, the niobium carbide, the niobium nitride and the niobium oxide, in an oxygen-containing inert gas have a high oxygen reduction onset potential and high activity.

An appropriate metal carbonitride may be produced by controlling the amounts (the molar ratio) of the metal M oxide, the niobium carbide, the niobium nitride and the niobium oxide. The amounts (the molar ratio) are usually such that the niobium carbide (NbC) is used at 0.01 to 500 mol, and the metal M oxide and the niobium oxide combined are used at 0.01 to 50 mol based on 1 mol of the niobium nitride (NbN), and preferably such that the niobium carbide (NbC) is used at 0.1 to 300 mol, and the metal M oxide and the niobium oxide combined are used at 0.1 to 30 mol based on 1 mol of the niobium nitride (NbN). This molar ratio tends to ensure that the obtainable metal carbonitride gives a metal oxycarbonitride having a high oxygen reduction onset potential and high activity.

[Production Method (IV)]

In the production method (IV), a mixture containing a compound of the metal M, niobium carbide and niobium nitride is heat treated in an inert gas such as nitrogen gas to give a metal carbonitride.

The heat treatment to produce the metal carbonitride is performed at a temperature in the range of 600 to 1800° C., and preferably 800 to 1600° C. This heat treatment temperature ensures that good crystallinity and homogeneity are obtained. The heat treatment at temperatures lower than 600° C. tends to deteriorate crystallinity and homogeneity. Heat treatment temperatures not lower than 1800° C. tend to result in sintering.

Materials used herein are a compound of the metal M, niobium carbide and niobium nitride.

Examples of the compounds of the metals M as materials include organic acid salts, carbonates, chlorides, organic complexes, carbides and nitrides of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium or nickel. One or more compounds of the metals M may be used.

Examples of the niobium carbides as materials include NbC.

Examples of the niobium nitrides as materials include NbN.

Even any of the above materials are used, metal oxycarbonitride catalysts obtained by heat treating the metal carbonitride, which is prepared from the compound of the metal M, the niobium carbide and the niobium nitride, in an oxygen-containing inert gas have a high oxygen reduction onset potential and high activity.

An appropriate metal carbonitride may be produced by controlling the amounts (the molar ratio) of the compound of the metal M, the niobium carbide and the niobium nitride. The amounts (the molar ratio) are usually such that the niobium carbide (NbC) and the compound of the metal M are used at 0.01 to 500 mol and 0.001 to 50 mol, respectively, based on 1 mol of the niobium nitride (NbN), and preferably such that the niobium carbide (NbC) and the compound of the metal M are used at 0.1 to 300 mol and 0.01 to 30 mol, respectively, based on 1 mol of the niobium nitride (NbN). This molar ratio tends to ensure that the obtainable metal carbonitride gives a metal oxycarbonitride having a high oxygen reduction onset potential and high activity.

[Production Method (V)]

The materials are not particularly limited as long as the metal carbonitride is obtained. The materials used in the production methods (I) to (IV) and other materials may be used in various combinations.

In the production method (V), a mixture having a different combination of materials from the combinations in the production methods (I) to (IV) is heat treated in an inert gas such as nitrogen gas to give a metal carbonitride.

The heat treatment to produce the metal carbonitride is performed at a temperature in the range of 600 to 1800° C., and preferably 800 to 1600° C. This heat treatment temperature ensures that good crystallinity and homogeneity are obtained. The heat treatment at temperatures lower than 600° C. tends to deteriorate crystallinity and homogeneity. Heat treatment temperatures not lower than 1800° C. tend to result in sintering.

The mixture used herein may contain materials such as compounds of the metals M, niobium carbides, niobium nitrides, niobium oxides, niobium precursors and carbons in any combination.

Examples of the compounds of the metals M as materials include organic acid salts, carbonates, chlorides, organic complexes, carbides, nitrides and precursors containing tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium or nickel. One or more compounds of the metals M may be used.

Examples of the niobium carbides as materials include NbC.

Examples of the niobium nitrides as materials include NbN.

Examples of the niobium oxides as materials include NbO, $NbO_2$ and $Nb_2O_5$.

Examples of the niobium precursors include organic acid salts, carbonates, chlorides, organic complexes, carbides, nitrides and alkoxides containing niobium.

Examples of the carbons as materials include carbon, carbon blacks, graphites, black leads, activated carbons, carbon nanotubes, carbon nanofibers, carbon nanohorns and fullerenes. The carbon preferably has smaller particle diameters. Such carbon particles have a larger specific surface area and react easily with the oxides. A suitable carbon material is carbon black (specific surface area: 100-300 $m^2/g$, for example XC-72 manufactured by Cabot Corporation).

Even any of the above materials are used, metal oxycarbonitride catalysts obtained by heat treating the metal carbonitride in an oxygen-containing inert gas have a high oxygen reduction onset potential and high activity.

An appropriate metal carbonitride may be produced by controlling the amounts (the molar ratio) of, for example, the compound of the metal M, the niobium carbide and the niobium nitride. The amounts (the molar ratio) are usually such that the niobium carbide (NbC) and the compound of the metal M are used at 0.01 to 500 mol and 0.001 to 50 mol, respectively, based on 1 mol of the niobium nitride (NbN), and preferably such that the niobium carbide (NbC) and the compound of the metal M are used at 0.1 to 300 mol and 0.01 to 30 mol, respectively, based on 1 mol of the niobium nitride (NbN). This molar ratio tends to ensure that the obtainable metal carbonitride gives a metal oxycarbonitride having a high oxygen reduction onset potential and high activity.

(Step of Producing Metal Oxycarbonitride)

A step will be described below in which the metal carbonitride obtained by any of the methods (I) to (V) is heat treated in an oxygen-containing inert gas to give a metal oxycarbonitride.

Examples of the inert gases include nitrogen, helium gas, neon gas, argon gas, krypton gas, xenon gas and radon gas. Nitrogen, argon gas and helium gas are particularly preferable because of their relatively high availability.

The concentration of oxygen gas in the inert gas depends on the heat treatment time and the heat treatment temperature, but is preferably in the range of 0.1 to 10% by volume, and particularly preferably 0.5 to 5% by volume. When the oxygen gas concentration is in this range, a homogeneous oxycarbonitride is formed. If the oxygen gas concentration is below 0.1% by volume, the oxidation tends to fail. If the concentration is in excess of 10% by volume, the oxidation tends to proceed excessively.

In a preferred embodiment, the inert gas contains hydrogen gas at not more than 5% by volume. The hydrogen gas concentration is more preferably 0.01 to 4% by volume, and still more preferably 0.1 to 4% by volume. In the invention, % by volume is determined under standard conditions.

The heat treatment in this step is usually performed at a temperature in the range of 400 to 1400° C., and preferably 600 to 1200° C. This heat treatment temperature ensures that a homogeneous metal oxycarbonitride is formed. If the heat treatment temperature is lower than 400° C., the oxidation tends not to proceed. The heat treatment at a temperature not lower than 1400° C. tends to result in excessive oxidation and crystal growth.

The heat treatment methods in this step include a standing method, a stirring method, a dropping method and a powder capturing method.

The dropping method is a method comprising heating an induction furnace to a predetermined heat treatment temperature while flowing an inert gas containing a trace amount of oxygen gas through the furnace; maintaining a thermal equilibrium at the temperature; and then dropping the metal carbonitride into a crucible which is a heating zone in the furnace to carry out heat treatment. The dropping methods provide advantages that the aggregation and growth of particles of the metal carbonitride are minimized.

In the powder capturing method, the metal carbonitride is caused to suspend as particles in an inert gas atmosphere containing a trace amount of oxygen gas, and the metal carbonitride is captured and heat treated in a vertical tubular furnace controlled at a predetermined heat treatment temperature.

In the dropping method, the heat treatment time for the metal carbonitride is usually from 0.5 to 10 minutes, and preferably from 0.5 to 3 minutes. This heat treatment time tends to ensure that a homogeneous metal oxycarbonitride is formed. The heat treatment for less than 0.5 minute tends to result in partial formation of the metal oxycarbonitride. If the heat treatment time exceeds 10 minutes, the oxidation tends to proceed excessively.

In the powder capturing method, the heat treatment time for the metal carbonitride is from 0.2 second to 1 minute, and preferably from 0.2 to 10 seconds. This heat treatment time tends to ensure that a homogeneous metal oxycarbonitride is formed. The heat treatment for less than 0.2 second tends to result in partial formation of the metal oxycarbonitride. If the heat treatment time exceeds 1 minute, the oxidation tends to proceed excessively. When the treatment is performed in a tubular furnace, the heat treatment time for the metal carbonitride may be from 0.1 to 10 hours, and preferably from 0.5 to 5 hours. This heat treatment time tends to ensure that a homogeneous metal oxycarbonitride is formed. The heat treatment for less than 0.1 hour tends to result in partial formation of the metal oxycarbonitride. If the heat treatment time exceeds 10 hours, the oxidation tends to proceed excessively.

In the invention, the metal oxycarbonitrides obtained by the aforementioned processes may be used directly as catalysts according to the invention. In another embodiment, the metal oxycarbonitride may be crushed into finer particles.

The methods for crushing the metal oxycarbonitrides include roll milling, ball milling, medium stirring milling, and crushing with an air flow crusher, a mortar or a crushing tank. To crush the metal oxycarbonitrides into finer particles, an air flow crusher is preferably used. To facilitate the crushing in small amounts, the use of a mortar is preferable.

<Uses>

The catalysts according to the present invention may be used as catalysts alternative to platinum catalysts.

For example, the catalysts may be used as fuel cell catalysts, exhaust gas treatment catalysts and organic synthesis catalysts.

Catalyst layers for fuel cells according to the invention comprise the above catalyst.

The catalyst layers for fuel cells may be anode catalyst layers or cathode catalyst layers, and the catalysts of the invention may be used in any of these layers. Because the catalysts have excellent durability and high oxygen reducing ability, they are preferably used in cathode catalyst layers.

In a preferred embodiment, the catalyst layer for fuel cells further contains electron conductive particles. When the fuel cell catalyst layer comprising the catalyst further contains electron conductive particles, the reduction current may be increased, probably because the electron conductive particles establish electrical contacts with the catalyst to induce electrochemical reaction.

The electron conductive particles are generally used as a carrier for the catalyst.

Examples of the materials forming the electron conductive particles include carbons, conductive polymers, conductive ceramics, metals and conductive inorganic oxides such as tungsten oxide and iridium oxide. These materials may be used singly or in combination with one another. In particular, carbon particles having a large specific surface area or a mixture of carbon particles having a large specific surface area and other electron conductive particles are preferable. That is, the catalyst layer for fuel cells according to a preferred embodiment comprises the catalyst and carbon particles having a large specific surface area.

Examples of the carbons include carbon blacks, graphites, black leads, activated carbons, carbon nanotubes, carbon nanofibers, carbon nanohorns and fullerenes. If the particle diameter of carbon is excessively small, an electron conductive path is hard to be formed. If the particle diameter is excessively large, the catalyst layer for fuel cells tends to reduce gas diffusion properties or the catalyst usage rate tends to be lowered. The carbon particle diameter is preferably in the range of 10 to 1000 nm, and more preferably 10 to 100 nm.

When the electron conductive particles are formed of carbon, the mass ratio of the catalyst and the carbon (catalyst: electron conductive particles) is preferably in the range of 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

A common polymer electrolyte used in fuel cell catalyst layers may be used without limitation. Specific examples include perfluorocarbon polymers having a sulfonic acid group (such as Nafion (a 5% Nafion solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, Nafion (a 5% Nafion solution (DE521) manufactured by Du Pont Kabushiki Kaisha) is preferable.

The catalyst layers for fuel cells according to the present invention may be used as anode catalyst layers or cathode catalyst layers. The catalyst layers for fuel cells contain the catalyst that has high oxygen reducing ability and is resistant to corrosion in acidic electrolytes at high potential. Accordingly, the catalyst layers of the invention are suited for use in fuel cell cathodes (as cathode catalyst layers). In particular, the catalyst layers are suitably provided in cathodes of membrane electrode assemblies in polymer electrolyte fuel cells.

The catalyst may be dispersed on the electron conductive particles as carriers by methods such as airborne dispersion methods and in-liquid dispersion methods. The in-liquid dispersion methods are preferable because the fuel cell catalyst layer may be prepared using a dispersion of the catalyst and the electron conductive particles in a solvent. Exemplary in-liquid dispersion methods include a method using orifice-choked flow, a method using rotational shear flow and a method using ultrasonic. The solvents used in the in-liquid dispersion methods are not particularly limited as long as the catalysts or the electron conductive particles are not corroded and are dispersed therein. Volatile liquid organic solvents and water are generally used.

When the catalyst is dispersed on the electron conductive particles, the electrolyte described above and a dispersant may be dispersed together.

The catalyst layers for fuel cells may be formed by any methods without limitation. For example, a suspension containing the catalyst, the electron conductive particles and the electrolyte may be applied to an electrolyte membrane or a gas diffusion layer as described later. The application methods include dipping, screen printing, roll coating and spraying. In another embodiment, a suspension containing the catalyst, the electron conductive particles and the electrolyte may be applied or filtered on a substrate to form a fuel cell catalyst layer, and the catalyst layer may be transferred to an electrolyte membrane.

Electrodes according to the present invention comprise the fuel cell catalyst layer and a porous support layer.

The electrodes of the invention may be used as cathodes or anodes. The electrodes have excellent durability and high catalytic ability, and therefore are more effective when used as cathodes.

The porous support layer is a layer which diffuses gas (hereinafter, also the gas diffusion layer). The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction may be generally used.

Membrane electrode assemblies of the invention have a cathode, an anode and an electrolyte membrane between the cathode and the anode. The cathode and/or the anode is the electrode as described hereinabove.

The electrolyte membranes may be general perfluorosulfonic acid electrolyte membranes or hydrocarbon electrolyte membranes. Further, polymer fine-pore membranes impregnated with liquid electrolyte, or porous membranes filled with polymer electrolyte may be used.

Fuel cells according to the present invention have the membrane electrode assembly as described above.

The electrode reaction in fuel cells takes place at a three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assemblies of the invention are suitably used in polymer electrolyte fuel cells.

EXAMPLES

The present invention will be described based on examples hereinbelow without limiting the scope of the invention.

In Examples and Comparative Examples, measurements were carried out by the following methods.

[Analytical Methods]

1. Powder X-Ray Diffractometry

Samples were analyzed by powder X-ray diffractometry using Rotaflex manufactured by Rigaku Corporation and X'Pert Pro manufactured by PANalytical.

In the powder X-ray diffractometry of each sample, the number of diffraction peaks was counted in a manner such that a signal which was detected with a signal (S) to noise (N) ratio (S/N) of 2 or more was regarded as a diffraction peak. The noise (N) was the width of the baseline.

2. Elemental Analysis

Carbon: Approximately 0.1 g of a sample was weighed out and analyzed with EMIA-110 manufactured by HORIBA, Ltd.

Nitrogen and oxygen: Approximately 0.1 g of a sample sealed in a Ni cup was analyzed with an ON analyzer.

Niobium and other metals M: Approximately 0.1 g of a sample was weighed on a platinum dish, and an acid was added thereto. The sample was then thermally decomposed. The thermal decomposition product was collected to a predetermined volume, diluted and analyzed by ICP-MS.

Example 1

1. Preparation of Catalyst

Niobium (IV) oxide ($NbO_2$) weighing 4.95 g (39.6 mmol) and tin (IV) oxide ($SnO_2$) weighing 60 mg (0.4 mmol) were mixed with 1.2 g (100 mmol) of carbon (Vulcan 72 manufactured by Cabot Corporation) and were sufficiently crushed. The resultant powder mixture was heat treated in a tubular furnace under a nitrogen atmosphere at 1400° C. for 3 hours to give 4.23 g of a carbonitride (1) containing tin (1 mol %) and niobium.

The carbonitride (1) in an amount of 1.02 g was heat treated in the tubular furnace at 800° C. for 1 hour while passing an argon gas containing 1% by volume of oxygen gas. As a result, 1.10 g of an oxycarbonitride containing tin (1 mol %) and niobium (hereinafter, also the catalyst (1)) was obtained.

FIG. 1 shows a powder X-ray diffraction spectrum of the catalyst (1). Four diffraction peaks were observed at diffraction angles 2θ of 33° to 43°.

2. Production of Fuel Cell Electrode

The oxygen reducing ability was determined in the following manner. The catalyst (1) in an amount of 0.095 g and carbon (XC-72 manufactured by Cabot Corporation) weighing 0.005 g were added to 10 g of a solution consisting of isopropyl alcohol:pure water=2:1 (mass ratio). The mixture was ultrasonically stirred to give a suspended mixture. The mixture in a volume of 30 μl was applied on a glassy carbon electrode (diameter: 5.2 mm, manufactured by Tokai Carbon Co., Ltd.) and was dried at 120° C. for 1 hour. Subsequently, 10 μl of Nafion (a 5% Nafion solution (DE521) manufactured by Du Pont Kabushiki Kaisha) diluted ten times with pure water was applied thereon and was dried at 120° C. for 1 hour. A fuel cell electrode (1) was thus manufactured.

3. Evaluation of oxygen reducing ability

The fuel cell electrode (1) manufactured above was evaluated for catalytic performance (oxygen reducing ability) as described below.

The fuel cell electrode (1) was subjected to polarization in a 0.5 mol/dm³ sulfuric acid solution at 30° C. under an oxygen atmosphere or a nitrogen atmosphere at a potential scanning rate of 5 mV/sec, thereby recording a current-potential curve. As a reference, a reversible hydrogen electrode in a sulfuric acid solution of the same concentration was used.

In the current-potential curve obtained, the potential at which the reduction current started to differ by 0.2 μA/cm² or more between the polarization under the oxygen atmosphere and that under the nitrogen atmosphere was obtained as the oxygen reduction onset potential. The difference between the reduction currents was obtained as the oxygen reduction current.

The catalytic performance (oxygen reducing ability) of the fuel cell electrode (1) was evaluated based on the oxygen reduction onset potential and the oxygen reduction current.

In detail, the higher the oxygen reduction onset potential and the higher the oxygen reduction current, the higher the catalytic performance (oxygen reducing ability) of the fuel cell electrode (1).

Figure 39:
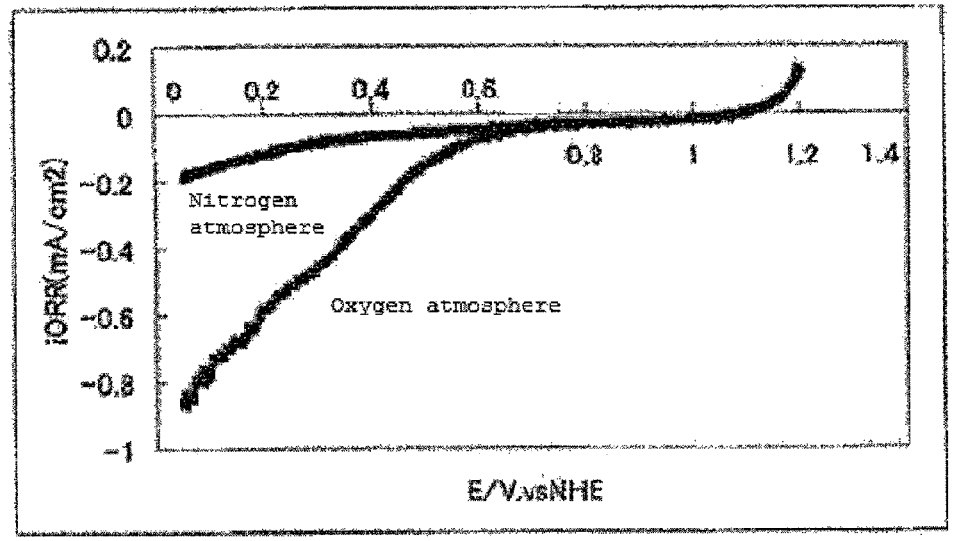
FIG. 39 is a graph showing an evaluation of the oxygen reducing ability of a fuel cell electrode (1) in Example 1.

The current-potential curve recorded during the above measurement is shown in FIG. 39.

The fuel cell electrode (1) manufactured in Example 1 had an oxygen reduction onset potential of 0.78 V (vs. NHE) and was found to have high oxygen reducing ability.

Example 2

1. Preparation of Catalyst

Niobium (IV) oxide ($NbO_2$) weighing 4.75 g (38 mmol) and tin (IV) oxide ($SnO_2$) weighing 302 mg (2 mmol) were mixed with 1.2 g (100 mmol) of carbon (Vulcan 72 manufactured by Cabot Corporation) and were sufficiently crushed. The resultant powder mixture was heat treated in a tubular furnace under a nitrogen atmosphere at 1400° C. for 3 hours to give 4.10 g of a carbonitride (2) containing tin (5 mol %) and niobium.

The carbonitride (2) in an amount of 1.02 g was heat treated in the tubular furnace at 800° C. for 1 hour while passing an argon gas containing 1% by volume of oxygen gas. As a result, 1.09 g of an oxycarbonitride containing tin (5 mol %) and niobium (hereinafter, also the catalyst (2)) was obtained.

The results of elemental analysis of the catalyst (2) are shown in Table 1.

Figure 2:
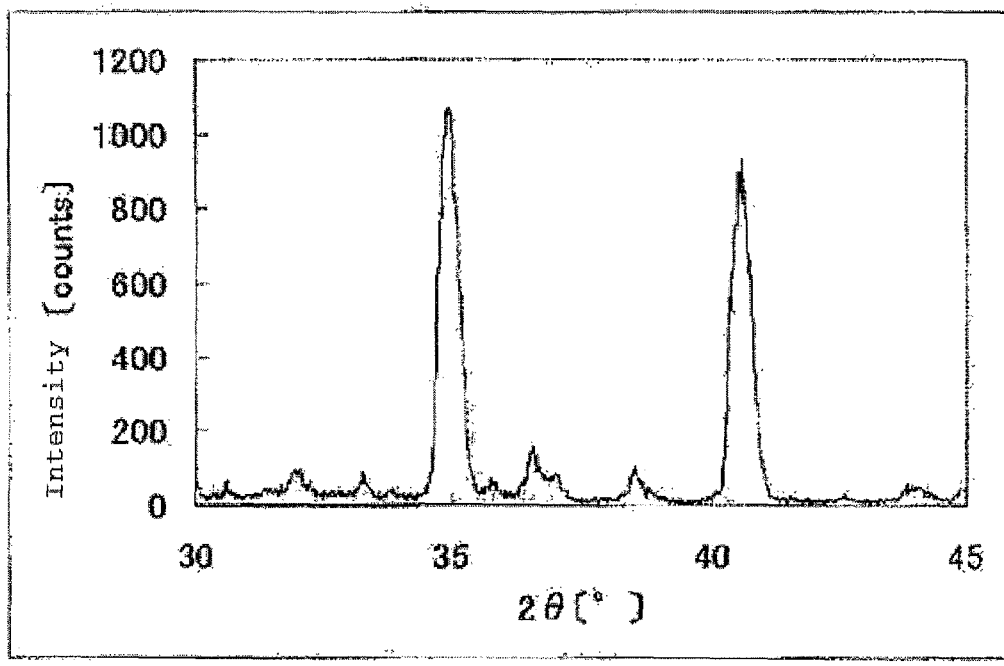
FIG. 2 is a powder X-ray diffraction spectrum of a catalyst (2) in Example 2.

FIG. 2 shows a powder X-ray diffraction spectrum of the catalyst (2). Seven diffraction peaks were observed at diffraction angles 2θ of 33° to 43°.

2. Production of Fuel Cell Electrode

A fuel cell electrode (2) was produced in the same manner as in Example 1, except that the catalyst (2) was used.

3. Evaluation of Oxygen Reducing Ability

The fuel cell electrode (2) was evaluated for catalytic performance (oxygen reducing ability) as described in Example 1.

Figure 40:
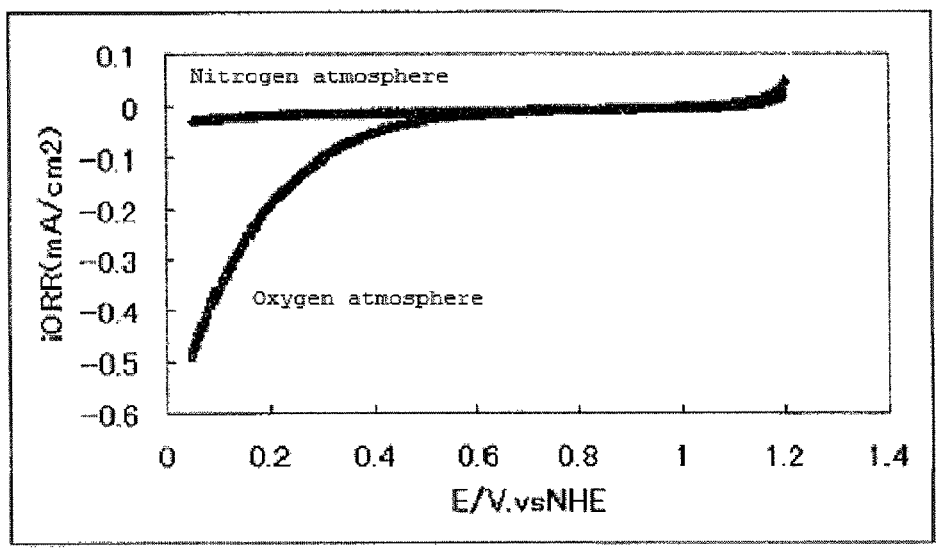
FIG. 40 is a graph showing an evaluation of the oxygen reducing ability of a fuel cell electrode (2) in Example 2.

The current-potential curve recorded during the measurement is shown in FIG. 40.

The fuel cell electrode (2) manufactured in Example 2 had an oxygen reduction onset potential of 0.72 V (vs. NHE) and was found to have high oxygen reducing ability.

Example 3

1. Preparation of Catalyst

The procedures in Example 1 were repeated, except that niobium (IV) oxide ($NbO_2$) was used in an amount of 4.00 g (32 mmol) and tin (IV) oxide ($SnO_2$) was used in an amount of 1.21 g (8 mmol), thereby producing 4.23 g of a carbonitride (3) containing tin (20 mol %) and niobium. The carbonitride (3) in an amount of 1.02 g was heat treated to give 1.09 g of an oxycarbonitride containing tin (20 mol %) and niobium (hereinafter, also the catalyst (3)). The results of elemental analysis of the catalyst (3) are shown in Table 1.

Figure 3:
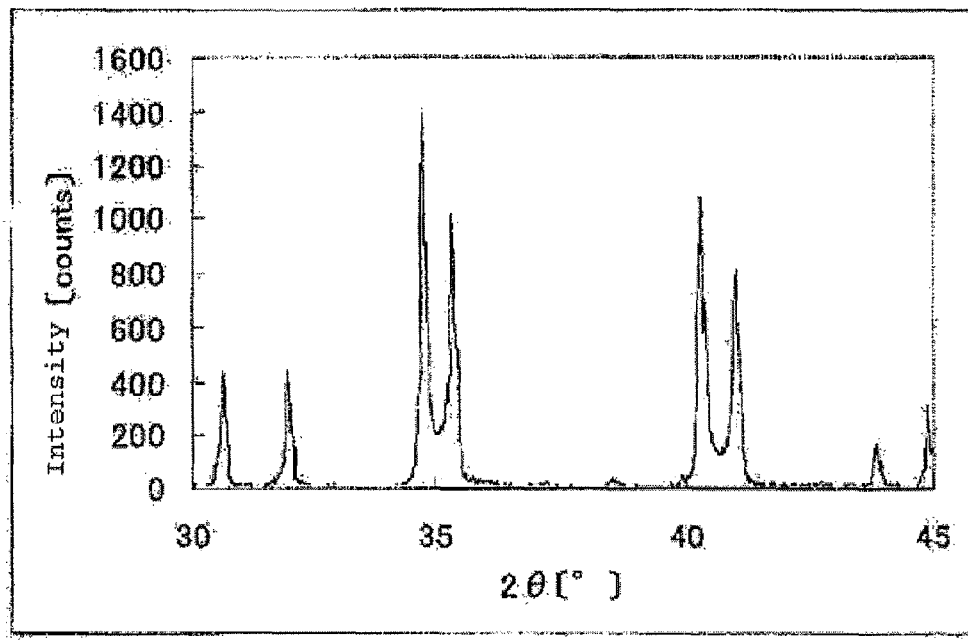
FIG. 3 is a powder X-ray diffraction spectrum of a catalyst (3) in Example 3.

FIG. 3 shows a powder X-ray diffraction spectrum of the catalyst (3). Four diffraction peaks were observed at diffraction angles 2θ of 33° to 43°.

2. Production of Fuel Cell Electrode

A fuel cell electrode (3) was produced in the same manner as in Example 1, except that the catalyst (3) was used.

3. Evaluation of Oxygen Reducing Ability

The fuel cell electrode (3) was evaluated for catalytic performance (oxygen reducing ability) as described in Example 1.

Figure 41:
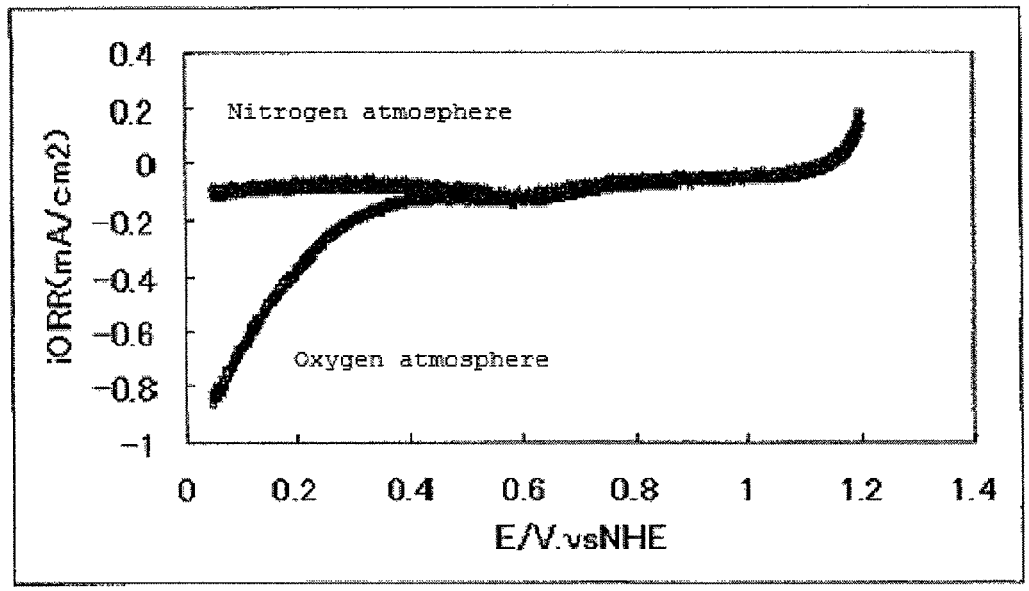
FIG. 41 is a graph showing an evaluation of the oxygen reducing ability of a fuel cell electrode (3) in Example 3.

The current-potential curve recorded during the measurement is shown in FIG. 41.

The fuel cell electrode (3) manufactured in Example 3 had an oxygen reduction onset potential of 0.65 V (vs. NHE) and was found to have high oxygen reducing ability.

Example 4

1. Preparation of Catalyst

The procedures in Example 1 were repeated, except that tin (IV) oxide ($SnO_2$) weighing 60 mg (0.4 mmol) was replaced by indium (III) oxide ($In_2O_3$) weighing 55 mg (0.2 mmol), thereby producing 4.23 g of a carbonitride (4) containing indium (0.4 mol %) and niobium. The carbonitride (4) in an amount of 1.02 g was heat treated to give 1.10 g of an oxycarbonitride containing indium (0.4 mol %) and niobium (hereinafter, also the catalyst (4)).

Figure 4:
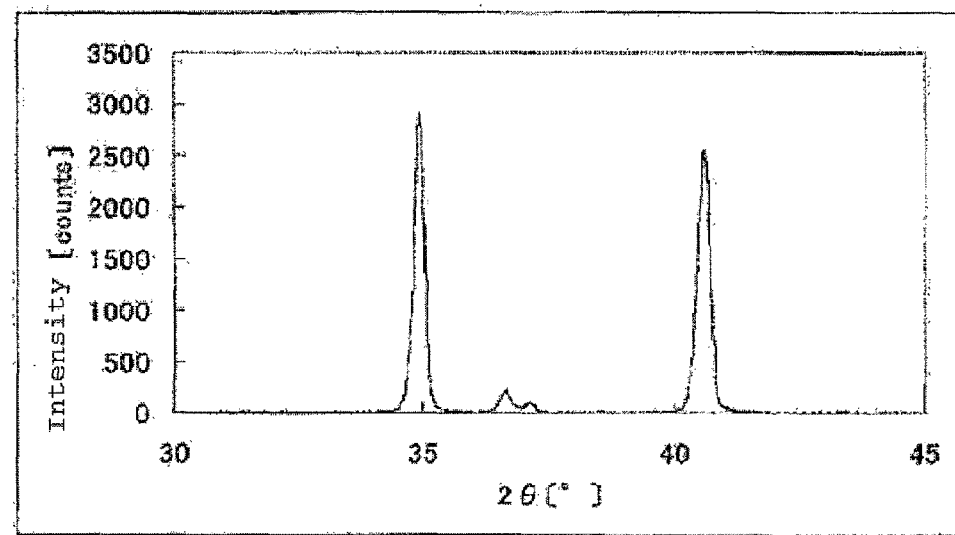
FIG. 4 is a powder X-ray diffraction spectrum of a catalyst (4) in Example 4.

FIG. 4 shows a powder X-ray diffraction spectrum of the catalyst (4). Four diffraction peaks were observed at diffraction angles 2θ of 33° to 43°.

2. Production of Fuel Cell Electrode

A fuel cell electrode (4) was produced in the same manner as in Example 1, except that the catalyst (4) was used.

3. Evaluation of Oxygen Reducing Ability

The fuel cell electrode (4) was evaluated for catalytic performance (oxygen reducing ability) as described in Example 1.

Figure 42:
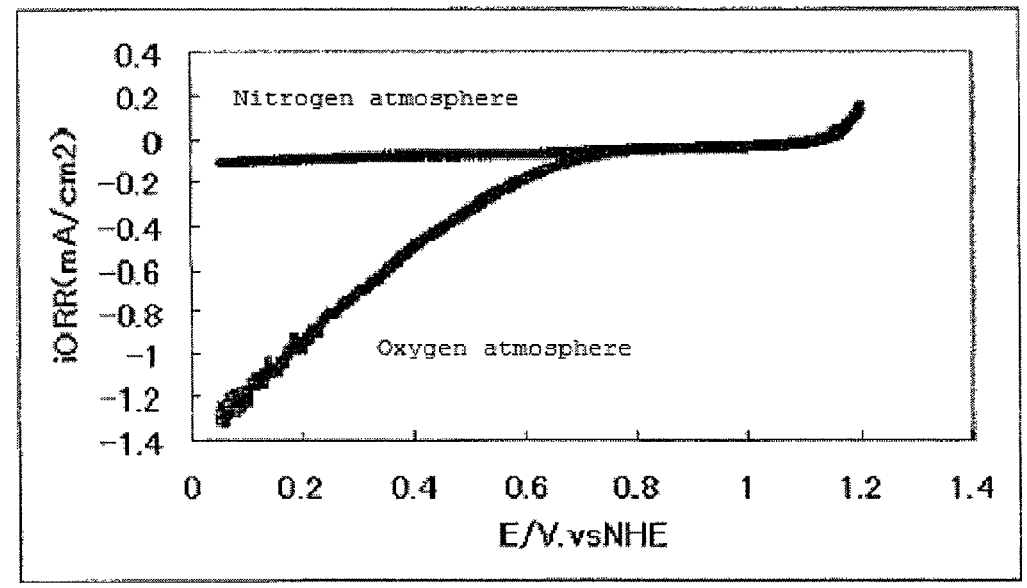
FIG. 42 is a graph showing an evaluation of the oxygen reducing ability of a fuel cell electrode (4) in Example 4.

The current-potential curve recorded during the measurement is shown in FIG. 42.

The fuel cell electrode (4) manufactured in Example 4 had an oxygen reduction onset potential of 0.80 V (vs. NHE) and was found to have high oxygen reducing ability.

Example 5

1. Preparation of Catalyst

The procedures in Example 1 were repeated, except that the amount of niobium (IV) oxide ($NbO_2$) was changed from 4.95 g (39.6 mmol) to 4.75 g (38 mmol) and that tin (IV) oxide ($SnO_2$) weighing 60 mg (0.4 mmol) was replaced by indium (III) oxide ($In_2O_3$) weighing 278 mg (2 mmol), thereby producing 3.94 g of a carbonitride (5) containing indium (5 mol %) and niobium. The carbonitride (5) in an amount of 1.02 g was heat treated to give 1.10 g of an oxycarbonitride containing indium (5 mol %) and niobium (hereinafter, also the catalyst (5)). The results of elemental analysis of the catalyst (5) are shown in Table 1.

Figure 5:
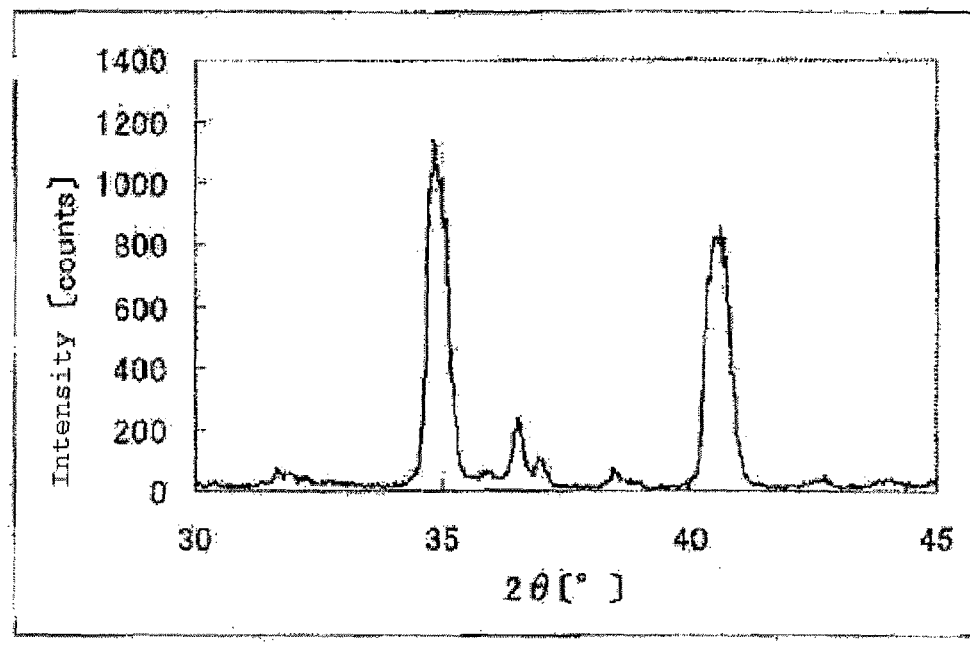
FIG. 5 is a powder X-ray diffraction spectrum of a catalyst (5) in Example 5.

FIG. 5 shows a powder X-ray diffraction spectrum of the catalyst (5). Five diffraction peaks were observed at diffraction angles 2θ of 33° to 43°.

2. Production of Fuel Cell Electrode

A fuel cell electrode (5) was produced in the same manner as in Example 1, except that the catalyst (5) was used.

3. Evaluation of Oxygen Reducing Ability

The fuel cell electrode (5) was evaluated for catalytic performance (oxygen reducing ability) as described in Example 1.

Figure 43:
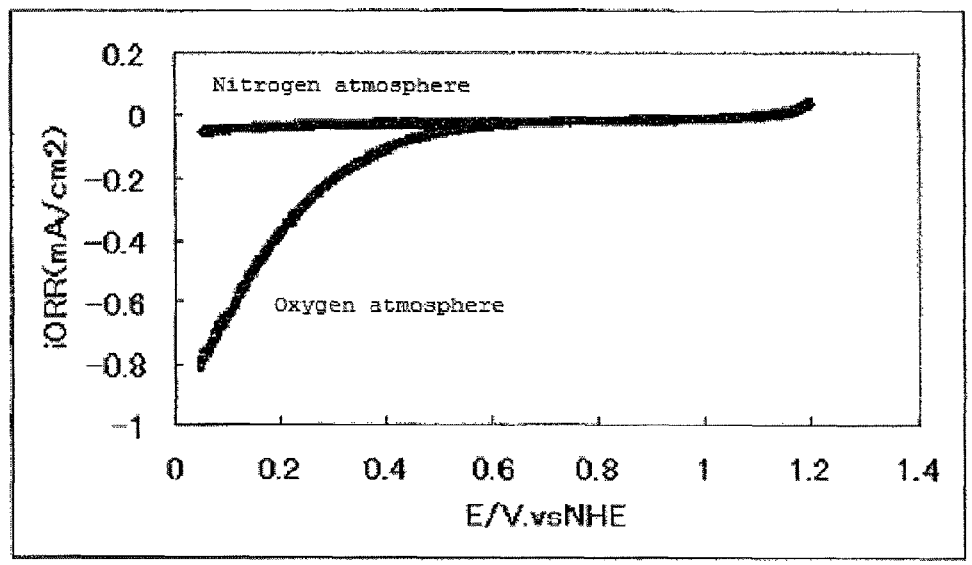
FIG. 43 is a graph showing an evaluation of the oxygen reducing ability of a fuel cell electrode (5) in Example 5.

The current-potential curve recorded during the measurement is shown in FIG. 43.

The fuel cell electrode (5) manufactured in Example 5 had an oxygen reduction onset potential of 0.80 V (vs. NHE) and was found to have high oxygen reducing ability.

Example 6

1. Preparation of Catalyst

The procedures in Example 1 were repeated, except that the amount of niobium (IV) oxide ($NbO_2$) was changed from 4.95 g (39.6 mmol) to 4.00 g (32 mmol) and that tin (IV) oxide ($SnO_2$) weighing 60 mg (0.4 mmol) was replaced by indium (III) oxide ($In_2O_3$) weighing 1.11 g (8 mmol), thereby producing 3.34 g of a carbonitride (6) containing indium (20 mol %) and niobium. The carbonitride (6) in an amount of 1.02 g was heat treated to give 1.11 g of an oxycarbonitride containing indium (20 mol %) and niobium (hereinafter, also the catalyst (6)). The results of elemental analysis of the catalyst (6) are shown in Table 1.

Figure 6:
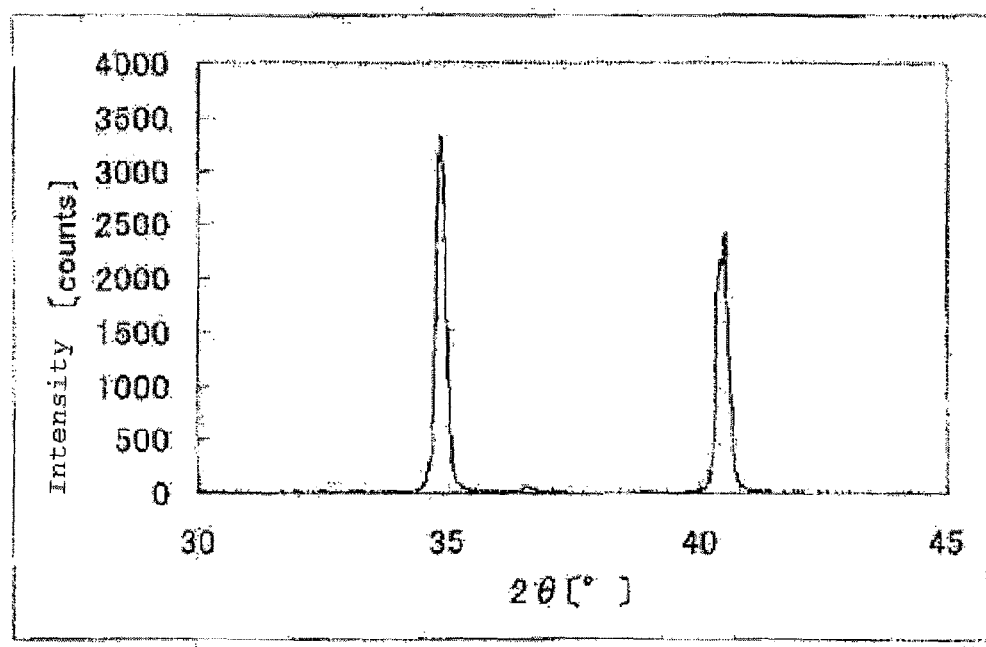
FIG. 6 is a powder X-ray diffraction spectrum of a catalyst (6) in Example 6.

FIG. 6 shows a powder X-ray diffraction spectrum of the catalyst (6). Three diffraction peaks were observed at diffraction angles 2θ of 33° to 43°.

2. Production of Fuel Cell Electrode

A fuel cell electrode (6) was produced in the same manner as in Example 1, except that the catalyst (6) was used.

3. Evaluation of Oxygen Reducing Ability

The fuel cell electrode (6) was evaluated for catalytic performance (oxygen reducing ability) as described in Example 1.

Figure 44:
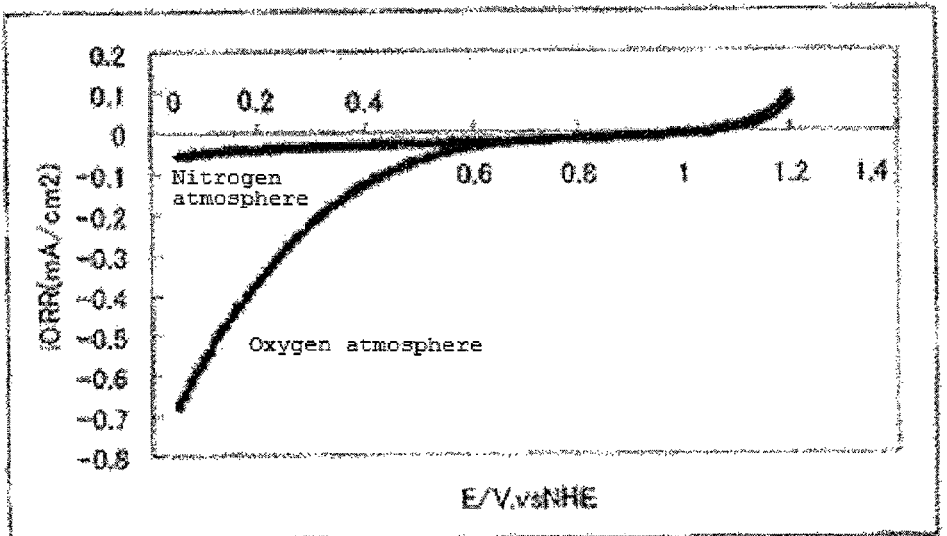
FIG. 44 is a graph showing an evaluation of the oxygen reducing ability of a fuel cell electrode (6) in Example 6.

The current-potential curve recorded during the measurement is shown in FIG. 44.

The fuel cell electrode (6) manufactured in Example 6 had an oxygen reduction onset potential of 0.80 V (vs. NHE) and was found to have high oxygen reducing ability.

Example 7

1. Preparation of Catalyst

Niobium carbide (NbC) weighing 4.96 g (42.5 mmol), indium oxide ($In_2O_3$) weighing 0.60 g (2.5 mmol) and niobium nitride (NbN) weighing 0.27 g (2.5 mmol) were sufficiently crushed and mixed together. The resultant powder mixture was heat treated in a tubular furnace under a nitrogen atmosphere at 1400° C. for 3 hours to give 5.12 g of a carbonitride (7) containing indium and niobium. The sintered carbonitride (7) was crushed with a ball mill. The carbonitride (7) in an amount of 1.02 g was heat treated in the same manner as in Example 1 to give 1.11 g of an oxycarbonitride containing indium and niobium (hereinafter, also the catalyst (7)).

Figure 7:
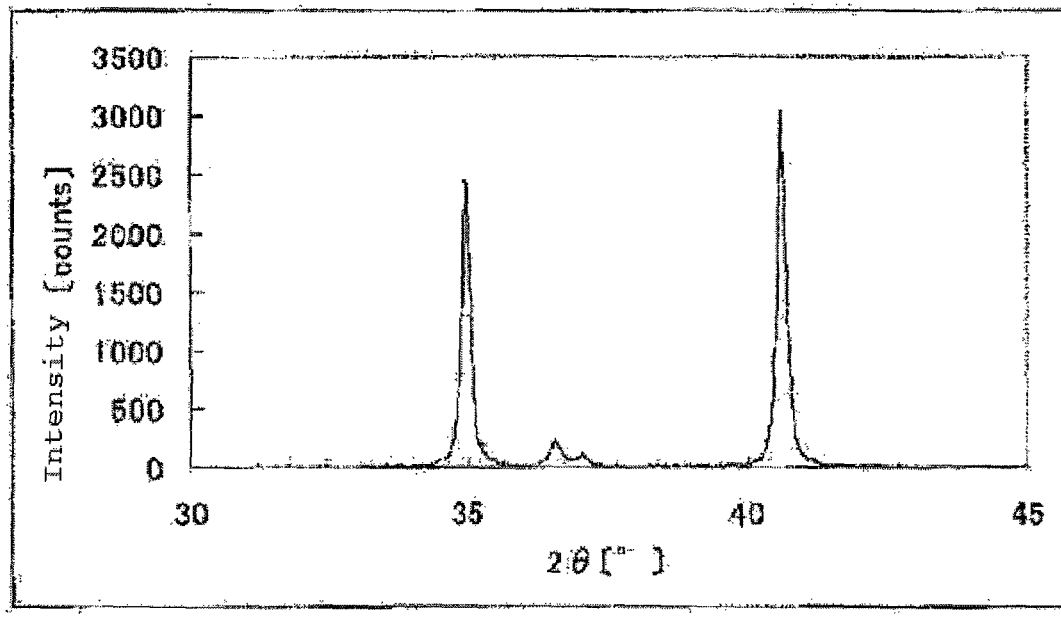
FIG. 7 is a powder X-ray diffraction spectrum of a catalyst (7) in Example 7.

FIG. 7 shows a powder X-ray diffraction spectrum of the catalyst (7). Four diffraction peaks were observed at diffraction angles 2θ of 33° to 43°.

2. Production of Fuel Cell Electrode

A fuel cell electrode (7) was produced in the same manner as in Example 1, except that the catalyst (7) was used.

3. Evaluation of Oxygen Reducing Ability

The fuel cell electrode (7) was evaluated for catalytic performance (oxygen reducing ability) as described in Example 1.

Figure 45:
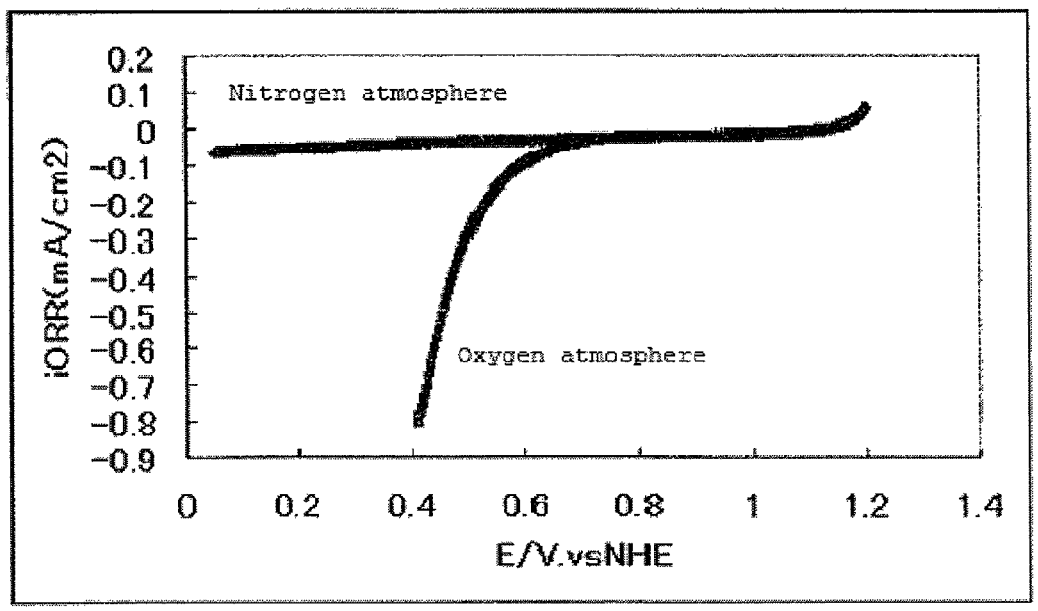
FIG. 45 is a graph showing an evaluation of the oxygen reducing ability of a fuel cell electrode (7) in Example 7.

The current-potential curve recorded during the measurement is shown in FIG. 45.

The fuel cell electrode (7) manufactured in Example 7 had an oxygen reduction onset potential of 0.82 V (vs. NHE) and was found to have high oxygen reducing ability.

Example 8

1. Preparation of Catalyst

Niobium carbide (NbC) weighing 4.96 g (42.5 mmol), tantalum oxide ($Ta_2O_5$) weighing 1.11 g (2.5 mmol) and niobium nitride (NbN) weighing 0.27 g (2.5 mmol) were sufficiently mixed together. The resultant mixture was heat treated under a nitrogen atmosphere at 1500° C. for 3 hours to give 5.94 g of a carbonitride (8) containing tantalum and niobium. The sintered carbonitride (8) was crushed with a ball mill. The carbonitride (8) in an amount of 1.02 g was heat treated in the same manner as in Example 1 to give 1.11 g of an oxycarbonitride containing tantalum and niobium (hereinafter, also the catalyst (8)).

Figure 8:
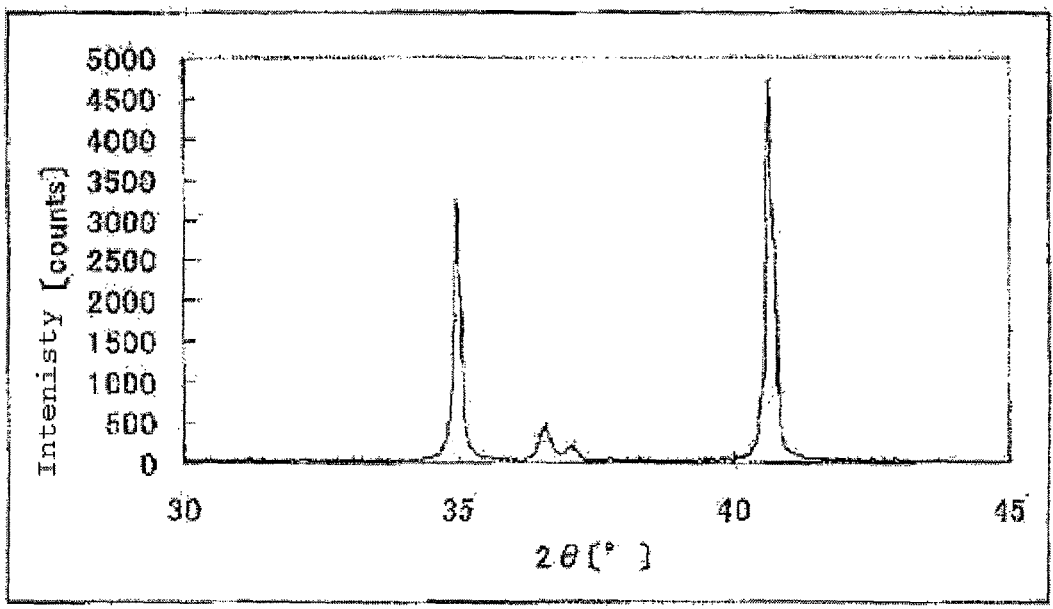
FIG. 8 is a powder X-ray diffraction spectrum of a catalyst (8) in Example 8.

FIG. 8 shows a powder X-ray diffraction spectrum of the catalyst (8). Four diffraction peaks were observed at diffraction angles 2θ of 33° to 43°.

2. Production of Fuel Cell Electrode

A fuel cell electrode (8) was produced in the same manner as in Example 1, except that the catalyst (8) was used.

3. Evaluation of Oxygen Reducing Ability

The fuel cell electrode (8) was evaluated for catalytic performance (oxygen reducing ability) as described in Example 1.

Figure 46:
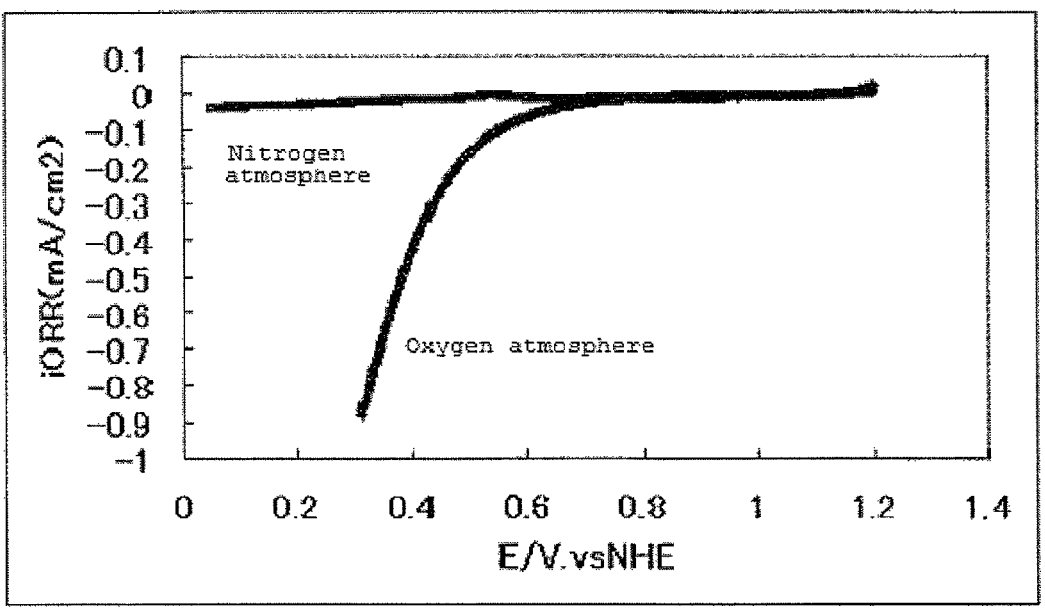
FIG. 46 is a graph showing an evaluation of the oxygen reducing ability of a fuel cell electrode (8) in Example 8.

The current-potential curve recorded during the measurement is shown in FIG. 46.

The fuel cell electrode (8) manufactured in Example 8 had an oxygen reduction onset potential of 0.83 V (vs. NHE) and was found to have high oxygen reducing ability.

Example 9

1. Preparation of Catalyst

Niobium carbide (NbC) weighing 4.96 g (42.5 mmol), niobium oxide ($NbO_2$) weighing 0.31 g (2.5 mmol), platinum oxide ($PtO_2$) weighing 0.57 g (2.5 mmol) and niobium nitride (NbN) weighing 0.27 g (2.5 mmol) were sufficiently mixed together. The resultant mixture was heat treated under a nitrogen atmosphere at 1600° C. for 3 hours to give 5.87 g of a carbonitride (9) containing platinum and niobium. The sintered carbonitride (9) was crushed with a ball mill. The carbonitride (9) in an amount of 1.02 g was heat treated in the same manner as in Example 1 to give 1.10 g of an oxycarbonitride containing platinum and niobium (hereinafter, also the catalyst (9)).

Figure 9:
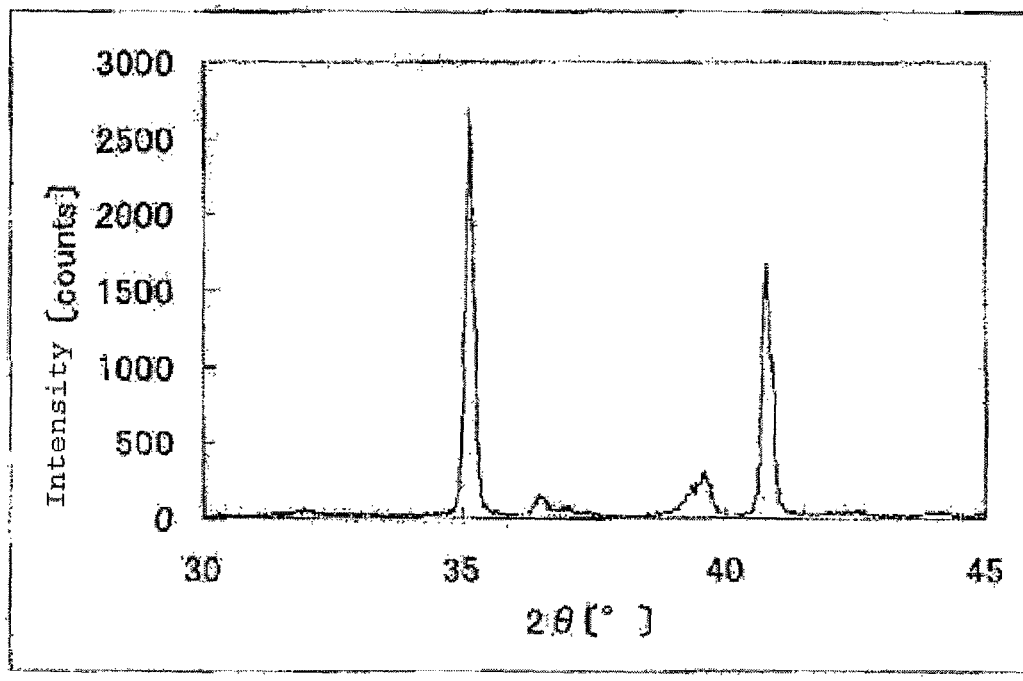
FIG. 9 is a powder X-ray diffraction spectrum of a catalyst (9) in Example 9.

FIG. 9 shows a powder X-ray diffraction spectrum of the catalyst (9). Six diffraction peaks were observed at diffraction angles 2θ of 33° to 43°.

2. Production of Fuel Cell Electrode

A fuel cell electrode (9) was produced in the same manner as in Example 1, except that the catalyst (9) was used.

3. Evaluation of Oxygen Reducing Ability

The fuel cell electrode (9) was evaluated for catalytic performance (oxygen reducing ability) as described in Example 1.

Figure 47:
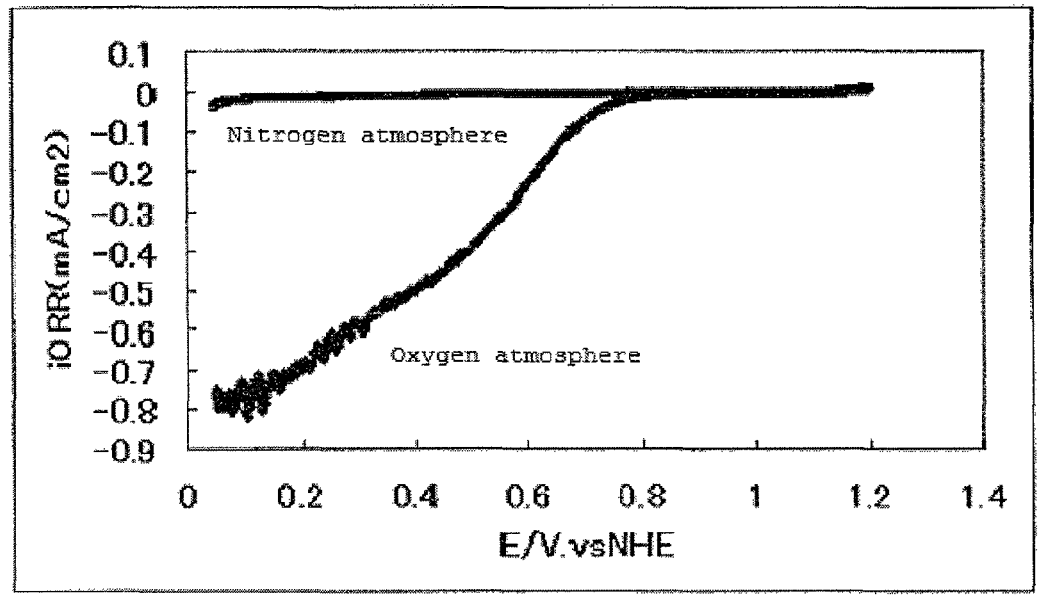
FIG. 47 is a graph showing an evaluation of the oxygen reducing ability of a fuel cell electrode (9) in Example 9.

The current-potential curve recorded during the measurement is shown in FIG. 47.

The fuel cell electrode (9) manufactured in Example 9 had an oxygen reduction onset potential of 0.90 V (vs. NHE) and was found to have high oxygen reducing ability.

Example 10

1. Preparation of Catalyst

Niobium (IV) oxide ($NbO_2$) weighing 5.05 g (40 mmol) was sufficiently mixed with 1.5 g of 20% Pt carbon (Pt: 1.6 mmol) (manufactured by TANAKA KIKINZOKU). The resultant mixture was heat treated under a nitrogen atmosphere at 1600° C. for 1 hour to give 4.47 g of a carbonitride (10) containing platinum and niobium. The sintered carbonitride (10) was crushed with a ball mill.

The carbonitride (10) in an amount of 1.02 g was heat treated in the same manner as in Example 1 to give 1.10 g of an oxycarbonitride containing platinum and niobium (hereinafter, also the catalyst (10)).

Figure 10:
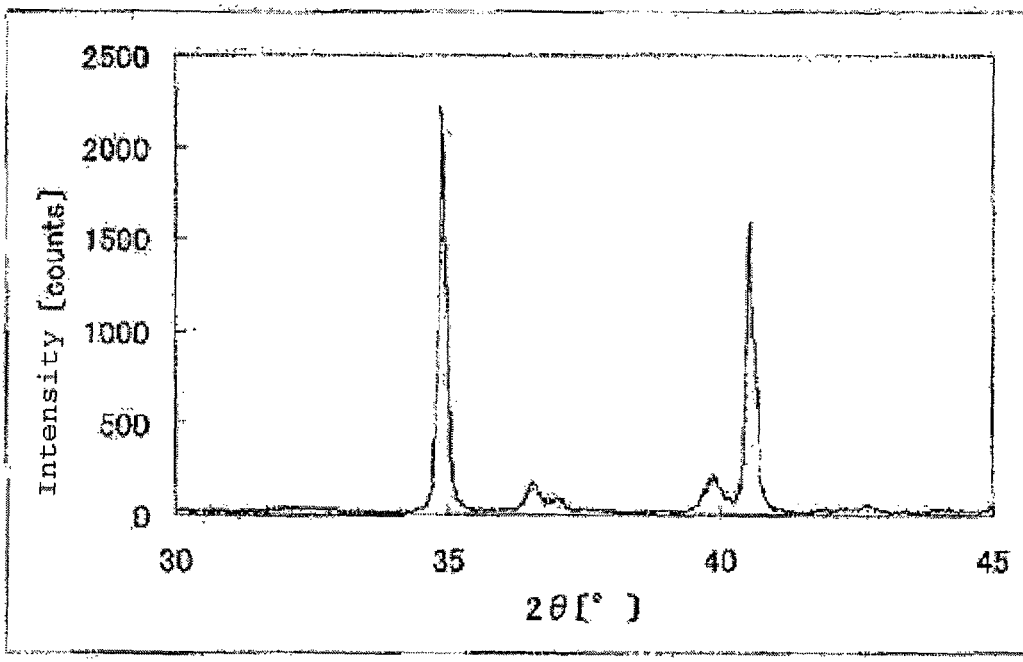
FIG. 10 is a powder X-ray diffraction spectrum of a catalyst (10) in Example 10.

FIG. 10 shows a powder X-ray diffraction spectrum of the catalyst (10). Five diffraction peaks were observed at diffraction angles 2θ of 33° to 43°.

2. Production of Fuel Cell Electrode

A fuel cell electrode (10) was produced in the same manner as in Example 1, except that the catalyst (10) was used.

3. Evaluation of Oxygen Reducing Ability

The fuel cell electrode (10) was evaluated for catalytic performance (oxygen reducing ability) as described in Example 1.

Figure 48:
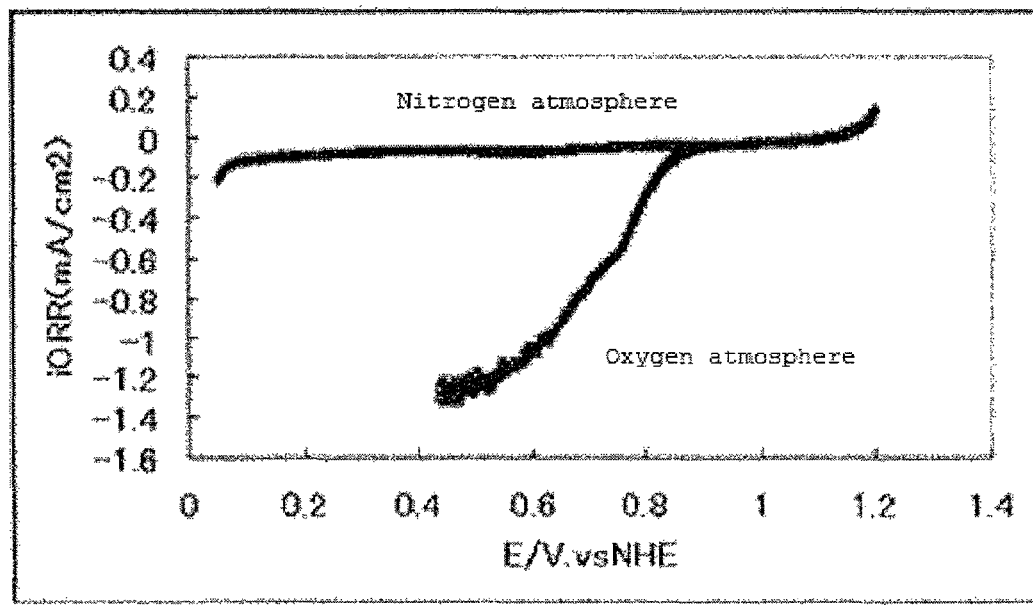
FIG. 48 is a graph showing an evaluation of the oxygen reducing ability of a fuel cell electrode (10) in Example 10.

The current-potential curve recorded during the measurement is shown in FIG. 48.

The fuel cell electrode (10) manufactured in Example 10 had an oxygen reduction onset potential of 0.95 V (vs. NHE) and was found to have high oxygen reducing ability.

Example 11

1. Preparation of Catalyst

Niobium carbide (NbC) weighing 4.96 g (42.5 mmol), indium tin oxide ($In_2O_2$—$SnO_2$) (ITO) (powder, manufactured by JGC Catalysts and Chemicals Ltd.) weighing 0.69 g (2.5 mmol) and niobium nitride (NbN) weighing 0.27 g (2.5 mmol) were sufficiently crushed and mixed together. The resultant powder mixture was heat treated in a tubular furnace under a nitrogen atmosphere at 1400° C. for 3 hours to give 5.94 g of a carbonitride (11) containing indium, tin and niobium. The sintered carbonitride (11) was crushed with a ball mill. The carbonitride (11) in an amount of 1.02 g was heat treated in the same manner as in Example 1 to give 1.10 g of an oxycarbonitride containing indium, tin and niobium (hereinafter, also the catalyst (11)).

Figure 11:
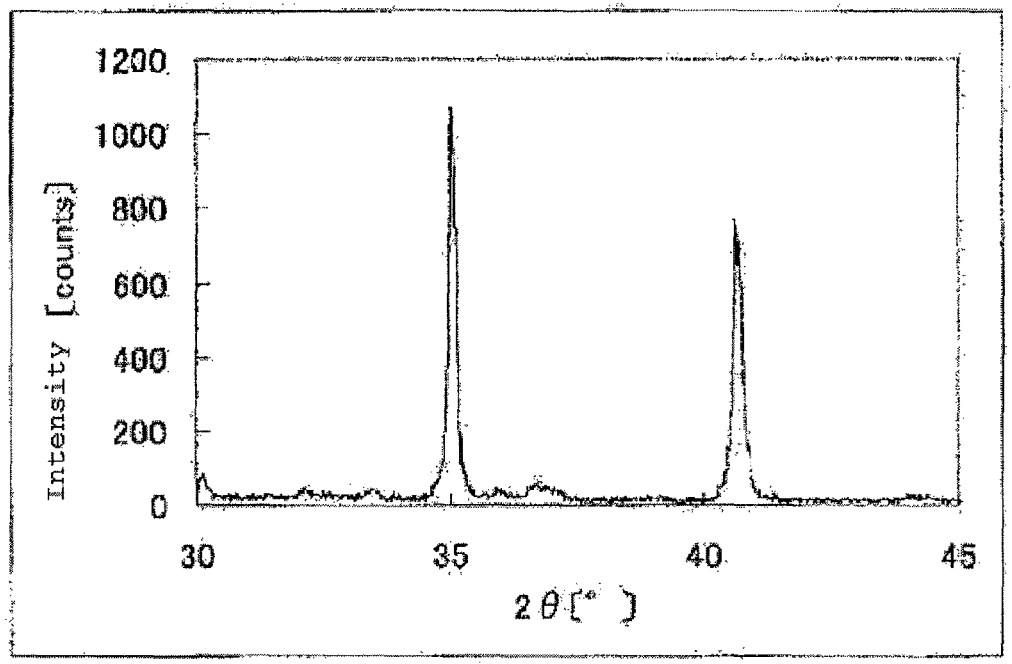
FIG. 11 is a powder X-ray diffraction spectrum of a catalyst (11) in Example 11.

FIG. 11 shows a powder X-ray diffraction spectrum of the catalyst (11). Five diffraction peaks were observed at diffraction angles 2θ of 33° to 43°.

2. Production of Fuel Cell Electrode

A fuel cell electrode (11) was produced in the same manner as in Example 1, except that the catalyst (11) was used.

3. Evaluation of Oxygen Reducing Ability

The fuel cell electrode (11) was evaluated for catalytic performance (oxygen reducing ability) as described in Example 1.

Figure 49:
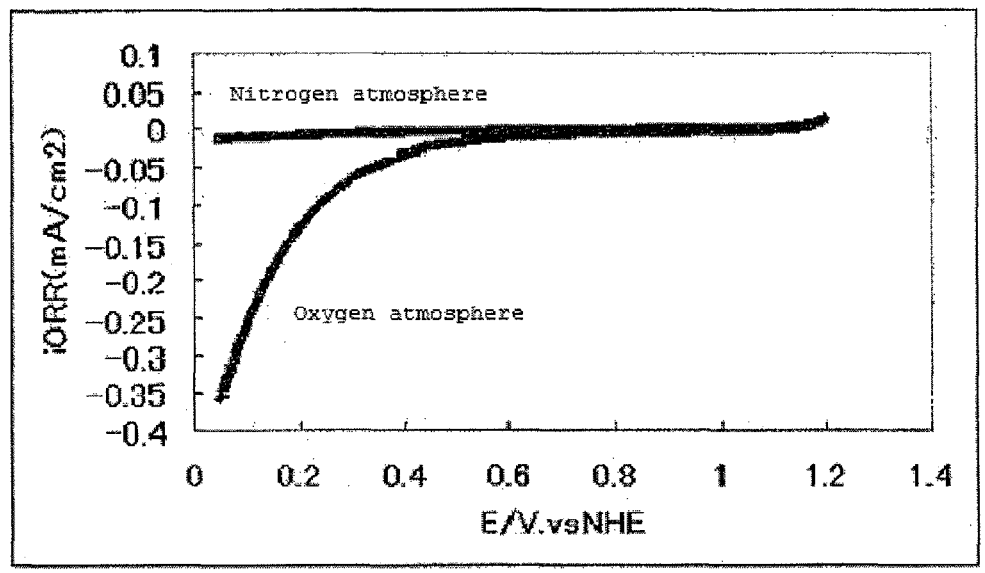
FIG. 49 is a graph showing an evaluation of the oxygen reducing ability of a fuel cell electrode (11) in Example 11.

The current-potential curve recorded during the measurement is shown in FIG. 49.

The fuel cell electrode (11) manufactured in Example 11 had an oxygen reduction onset potential of 0.85 V (vs. NHE) and was found to have high oxygen reducing ability.

Comparative Example 1

1. Preparation of Catalyst

Niobium carbide (NbC) weighing 4.96 g (81 mmol), niobium oxide ($NbO_2$) weighing 1.25 g (10 mmol) and niobium nitride (NbN) weighing 0.54 g (5 mmol) were sufficiently mixed together. The resultant mixture was heat treated under a nitrogen atmosphere at 1500° C. for 3 hours to give 2.70 g of a sintered niobium carbonitride (hereinafter, also the catalyst (12)). The sintered product was crushed with a ball mill.

The results of elemental analysis of the crushed catalyst (12) are shown in Table 1.

2. Production of Fuel Cell Electrode

A fuel cell electrode (12) was produced in the same manner as in Example 1, except that the above obtained niobium carbonitride was used.

3. Evaluation of Oxygen Reducing Ability

The fuel cell electrode (12) was evaluated for catalytic performance (oxygen reducing ability) as described in Example 1.

Figure 50:
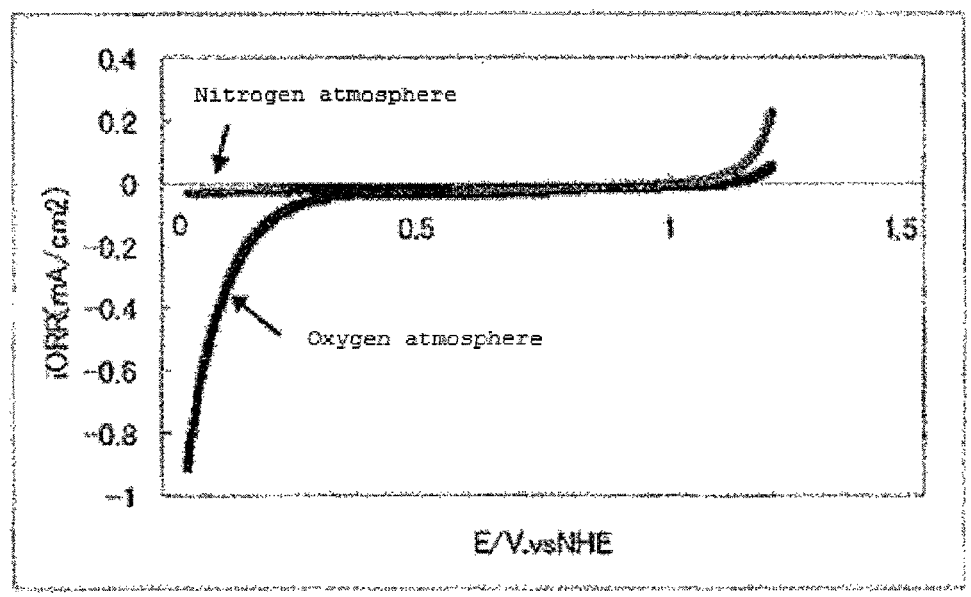
FIG. 50 is a graph showing an evaluation of the oxygen reducing ability of a fuel cell electrode (12) in Comparative Example 1.

The current-potential curve recorded during the measurement is shown in FIG. 50.

The fuel cell electrode (12) manufactured in Comparative Example 1 had an oxygen reduction onset potential of 0.45 V (vs. NHE) and was found to have low oxygen reducing ability.

Example 12

1. Preparation of Catalyst

Niobium carbide (NbC) weighing 5.88 g (56 mmol), ferric oxide ($Fe_2O_3$) weighing 0.40 g (2.5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 11.19 g of a carbonitride (13) containing iron and niobium. The sintered carbonitride (13) was crushed with a ball mill. The carbonitride (13) in an amount of 1.00 g was heat treated in the tubular furnace at 900° C. for 6 hours while passing through the furnace a nitrogen gas containing 1% by volume of oxygen gas and 0.8% by volume of hydrogen gas. As a result, 1.24 g of an oxycarbonitride containing iron (5 mol %) and niobium (hereinafter, also the catalyst (13)) was obtained. The results of elemental analysis of the catalyst (13) are shown in Table 1.

Figure 12:
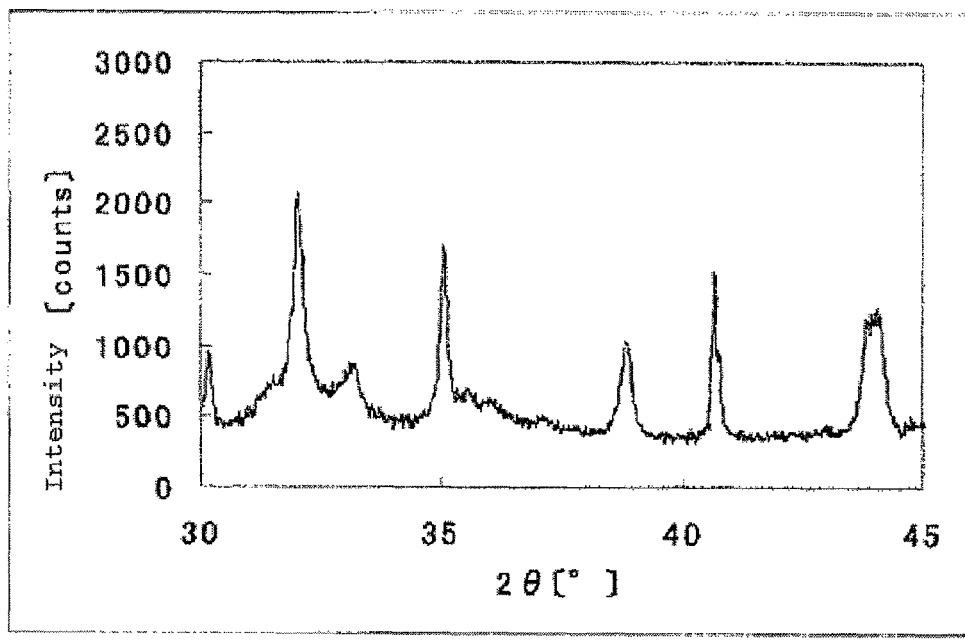
FIG. 12 is a powder X-ray diffraction spectrum of a catalyst (13) in Example 12.

FIG. 12 shows a powder X-ray diffraction spectrum of the catalyst (13). Four diffraction peaks were observed at diffraction angles 2θ of 33° to 43°.

2. Production of Fuel Cell Electrode

A fuel cell electrode (13) was produced in the same manner as in Example 1, except that the catalyst (13) was used.

3. Evaluation of Oxygen Reducing Ability

The fuel cell electrode (13) was evaluated for catalytic performance (oxygen reducing ability) as described in Example 1.

Figure 51:
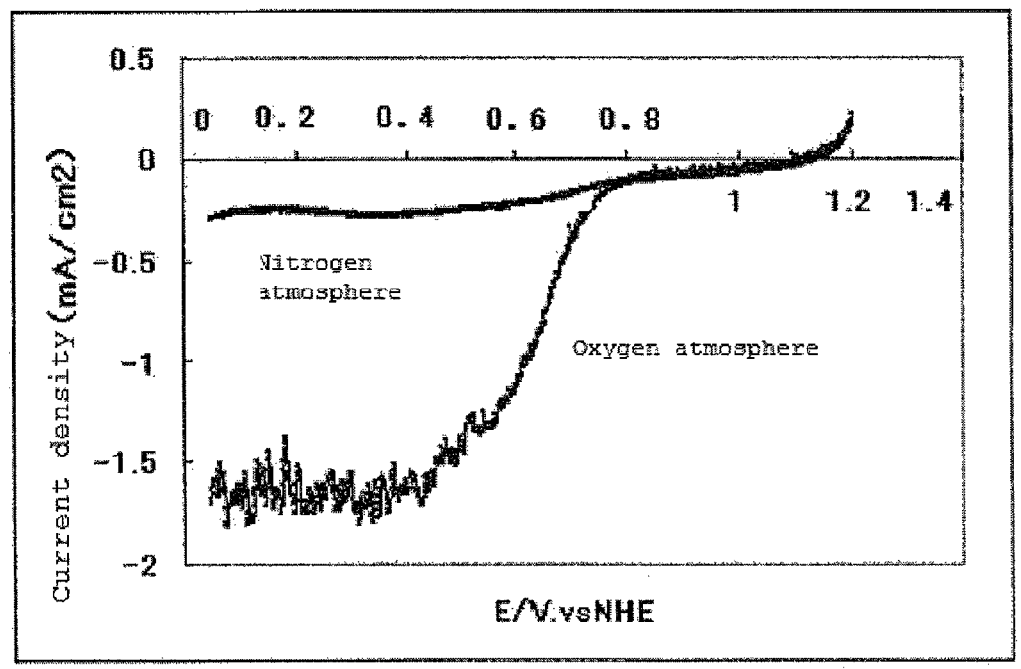
FIG. 51 is a graph showing an evaluation of the oxygen reducing ability of a fuel cell electrode (13) in Example 12.

The current-potential curve recorded during the measurement is shown in FIG. 51.

The fuel cell electrode (13) manufactured in Example 12 had an oxygen reduction onset potential of 0.90 V (vs. NHE) and was found to have high oxygen reducing ability.

Example 13

1. Preparation of Catalyst

Niobium carbide (NbC) weighing 5.88 g (56 mmol), manganese oxide (MnO) weighing 0.36 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 10.93 g of a carbonitride (14) containing manganese and niobium. The sintered carbonitride (14) was crushed with a ball mill. The carbonitride (14) in an amount of 1.04 g was heat treated in the same manner as in Example 12 to give 1.33 g of an oxycarbonitride containing manganese and niobium (hereinafter, also the catalyst (14)). The results of elemental analysis of the catalyst (14) are shown in Table 1.

Figure 13:
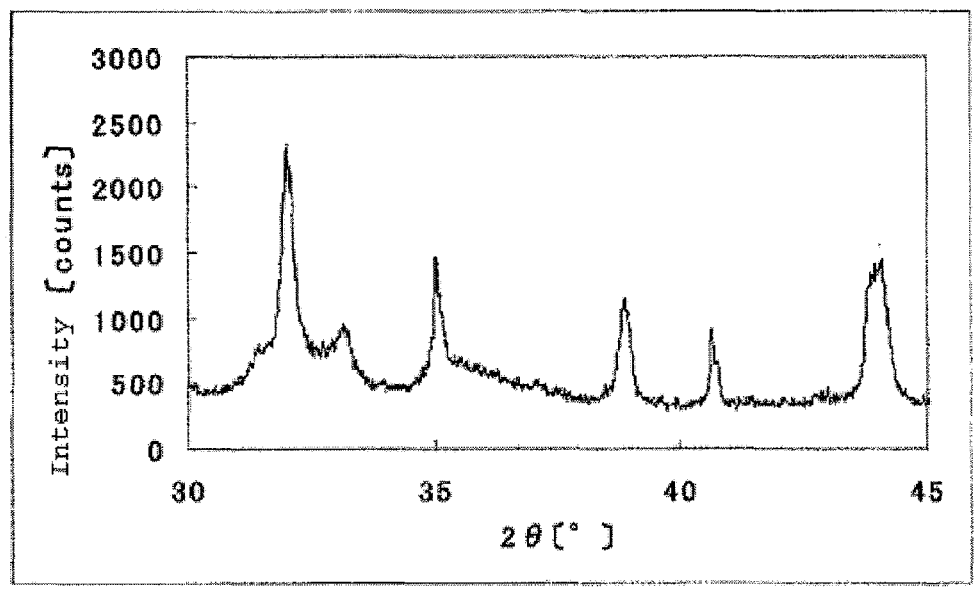
FIG. 13 is a powder X-ray diffraction spectrum of a catalyst (14) in Example 13.
Figure 14:
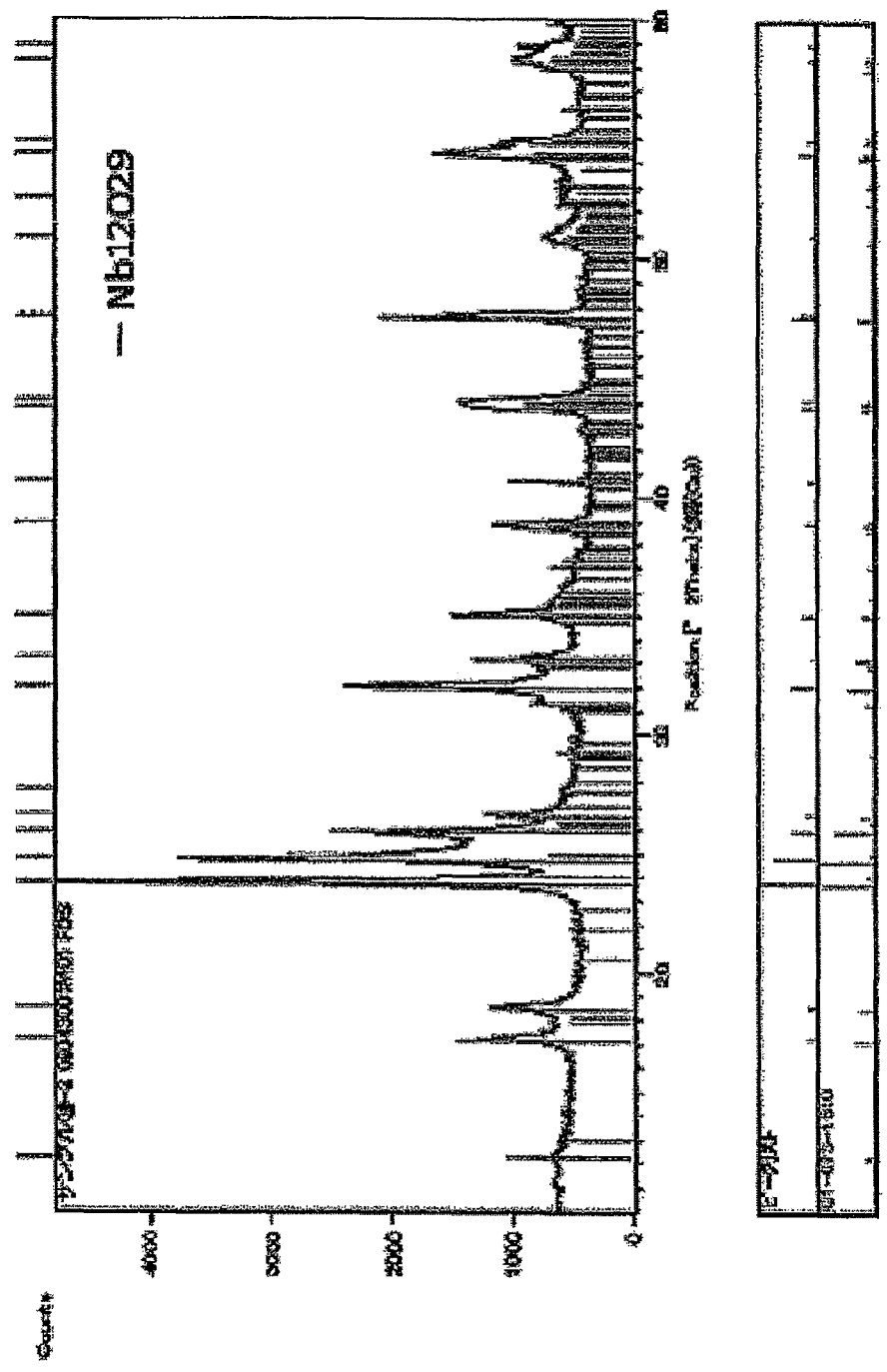
FIG. 14 is a graph obtained by peak analysis of the powder X-ray diffraction spectrum of the catalyst (14) in Example 13.

FIG. 13 shows a powder X-ray diffraction spectrum of the catalyst (14). Four diffraction peaks were observed at diffraction angles 2θ of 33° to 43°. From spectral retrieval of the powder X-ray diffraction spectrum of the catalyst (14), a peak assigned to $Nb_{12}O_{29}$ was observed as shown in FIG. 14.

2. Production of Fuel Cell Electrode

A fuel cell electrode (14) was produced in the same manner as in Example 1, except that the catalyst (14) was used.

3. Evaluation of Oxygen Reducing Ability

The fuel cell electrode (14) was evaluated for catalytic performance (oxygen reducing ability) as described in Example 1.

Figure 52:
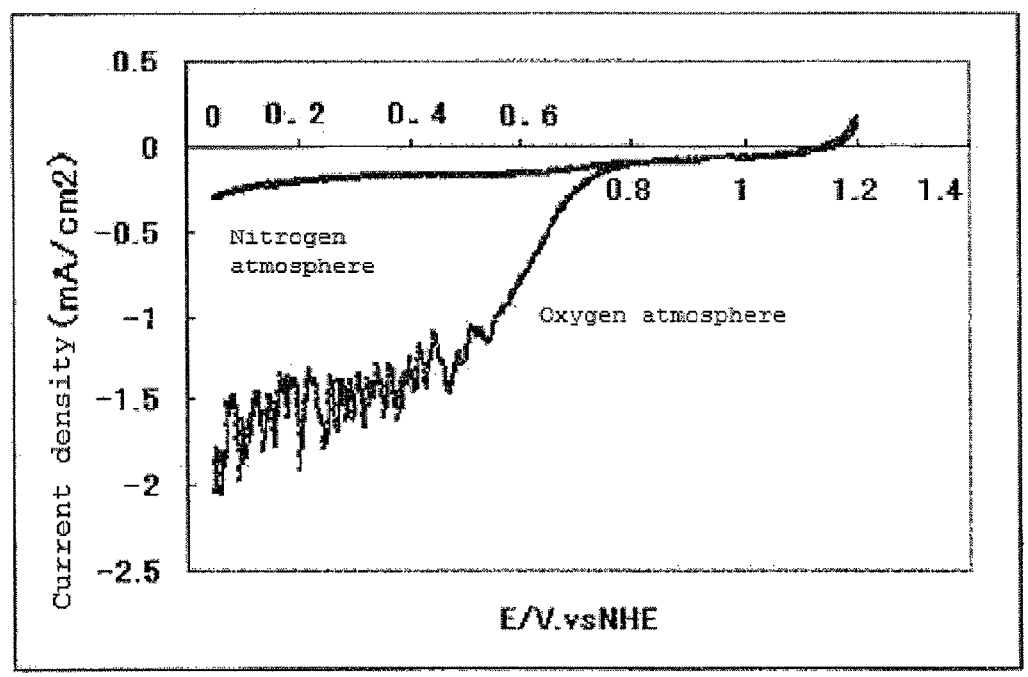
FIG. 52 is a graph showing an evaluation of the oxygen reducing ability of a fuel cell electrode (14) in Example 13.

The current-potential curve recorded during the measurement is shown in FIG. 52.

The fuel cell electrode (14) manufactured in Example 13 had an oxygen reduction onset potential of 0.85 V (vs. NHE) and was found to have high oxygen reducing ability.

Example 14

1. Preparation of Catalyst

Niobium carbide (NbC) weighing 5.88 g (56 mmol), cerium oxide ($CeO_2$) weighing 0.86 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 11.69 g of a carbonitride (15) containing cerium and niobium. The sintered carbonitride (15) was crushed with a ball mill. The carbonitride (15) in an amount of 1.03 g was heat treated in the same manner as in Example 12 to give 1.31 g of an oxycarbonitride containing cerium and niobium (hereinafter, also the catalyst (15)). The results of elemental analysis of the catalyst (15) are shown in Table 1.

Figure 15:
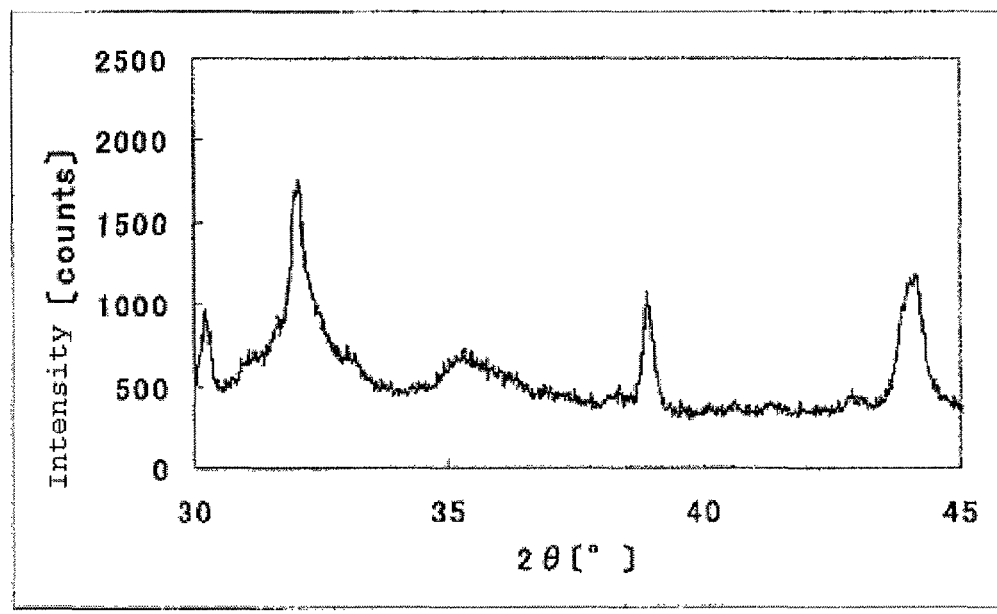
FIG. 15 is a powder X-ray diffraction spectrum of a catalyst (15) in Example 14.
Figure 16:
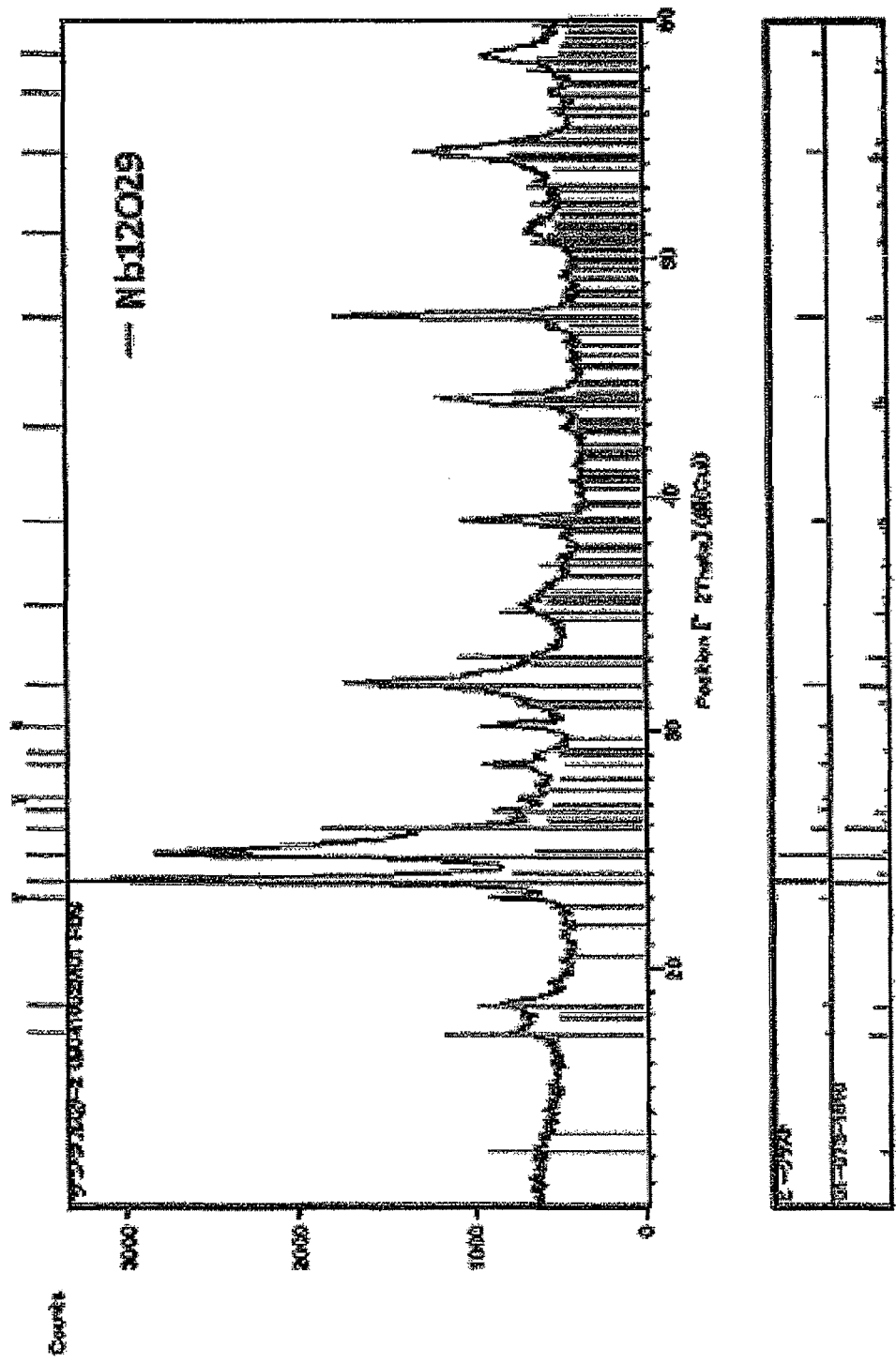
FIG. 16 is a graph obtained by peak analysis of the powder X-ray diffraction spectrum of the catalyst (15) in Example 14.

FIG. 15 shows a powder X-ray diffraction spectrum of the catalyst (15). Three diffraction peaks were observed at diffraction angles 2θ of 33° to 43°. From spectral retrieval of the powder X-ray diffraction spectrum of the catalyst (15), a peak assigned to $Nb_{12}O_{29}$ was observed as shown in FIG. 16.

2. Production of Fuel Cell Electrode

A fuel cell electrode (15) was produced in the same manner as in Example 1, except that the catalyst (15) was used.

3. Evaluation of Oxygen Reducing Ability

The fuel cell electrode (15) was evaluated for catalytic performance (oxygen reducing ability) as described in Example 1.

Figure 53:
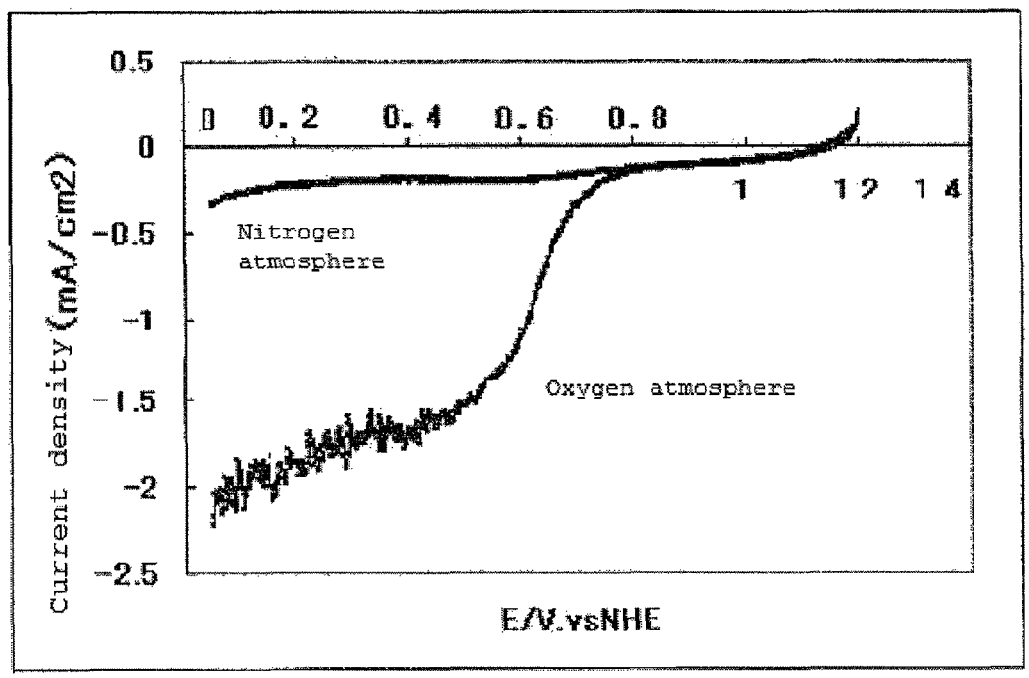
FIG. 53 is a graph showing an evaluation of the oxygen reducing ability of a fuel cell electrode (15) in Example 14.

The current-potential curve recorded during the measurement is shown in FIG. 53.

The fuel cell electrode (15) manufactured in Example 14 had an oxygen reduction onset potential of 0.86 V (vs. NHE) and was found to have high oxygen reducing ability.

Example 15

1. Preparation of Catalyst

Niobium carbide (NbC) weighing 5.88 g (56 mmol), chromium oxide ($Cr_2O_3$) weighing 0.38 g (2.5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 11.17 g of a carbonitride (16) containing chromium and niobium. The sintered carbonitride (16) was crushed with a ball mill. The carbonitride (16) in an amount of 0.97 g was heat treated in the same manner as in Example 12 to give 1.20 g of an oxycarbonitride containing chromium and niobium (hereinafter, also the catalyst (16)). The results of elemental analysis of the catalyst (16) are shown in Table 1.

Figure 17:
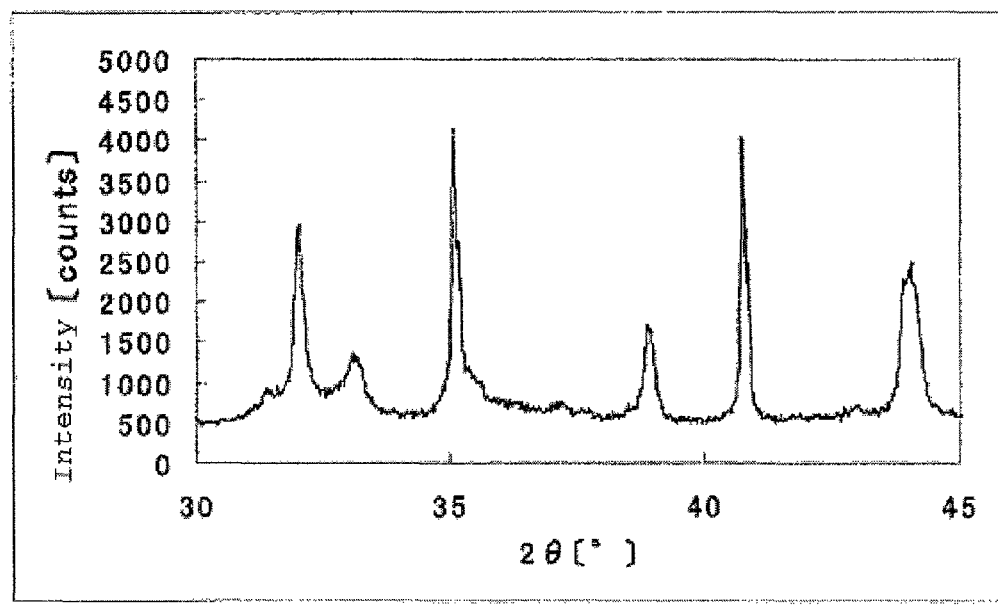
FIG. 17 is a powder X-ray diffraction spectrum of a catalyst (16) in Example 15.
Figure 18:
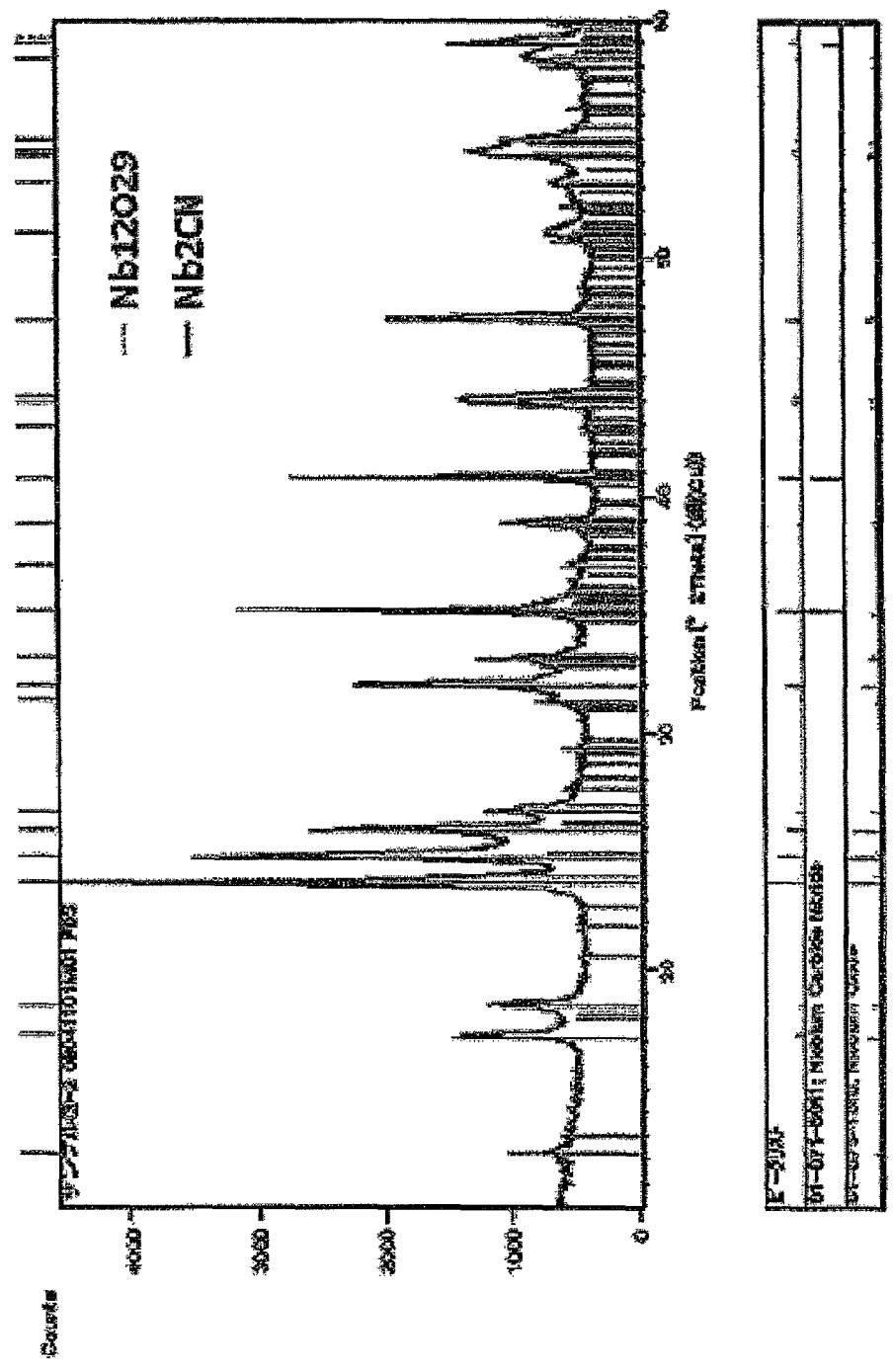
FIG. 18 is a graph obtained by peak analysis of the powder X-ray diffraction spectrum of the catalyst (16) in Example 15.

FIG. 17 shows a powder X-ray diffraction spectrum of the catalyst (16). Four diffraction peaks were observed at diffraction angles 2θ of 33° to 43°. From spectral retrieval of the powder X-ray diffraction spectrum of the catalyst (16), a peak assigned to $Nb_{12}O_{29}$ was observed as shown in FIG. 18.

2. Production of Fuel Cell Electrode

A fuel cell electrode (16) was produced in the same manner as in Example 1, except that the catalyst (16) was used.

3. Evaluation of Oxygen Reducing Ability

The fuel cell electrode (16) was evaluated for catalytic performance (oxygen reducing ability) as described in Example 1.

Figure 54:
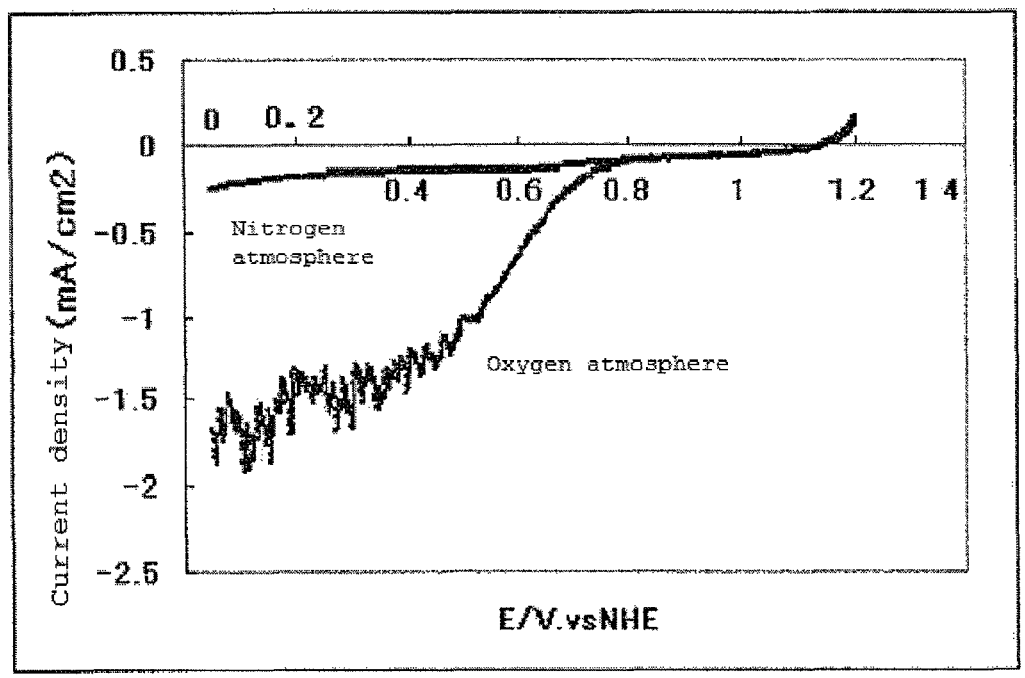
FIG. 54 is a graph showing an evaluation of the oxygen reducing ability of a fuel cell electrode (16) in Example 15.

The current-potential curve recorded during the measurement is shown in FIG. 54.

The fuel cell electrode (16) manufactured in Example 15 had an oxygen reduction onset potential of 0.85 V (vs. NHE) and was found to have high oxygen reducing ability.

Example 16

1. Preparation of Catalyst

Niobium carbide (NbC) weighing 5.88 g (56 mmol), iron acetate ($C_4H_6O_4Fe$) weighing 0.87 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 10.89 g of a carbonitride (17) containing iron and niobium. The sintered carbonitride (17) was crushed with a ball mill. The carbonitride (17) in an amount of 1.05 g was heat treated in the same manner as in Example 12 to give 1.34 g of an oxycarbonitride containing iron and niobium (hereinafter, also the catalyst (17)). The results of elemental analysis of the catalyst (17) are shown in Table 1.

Figure 19:
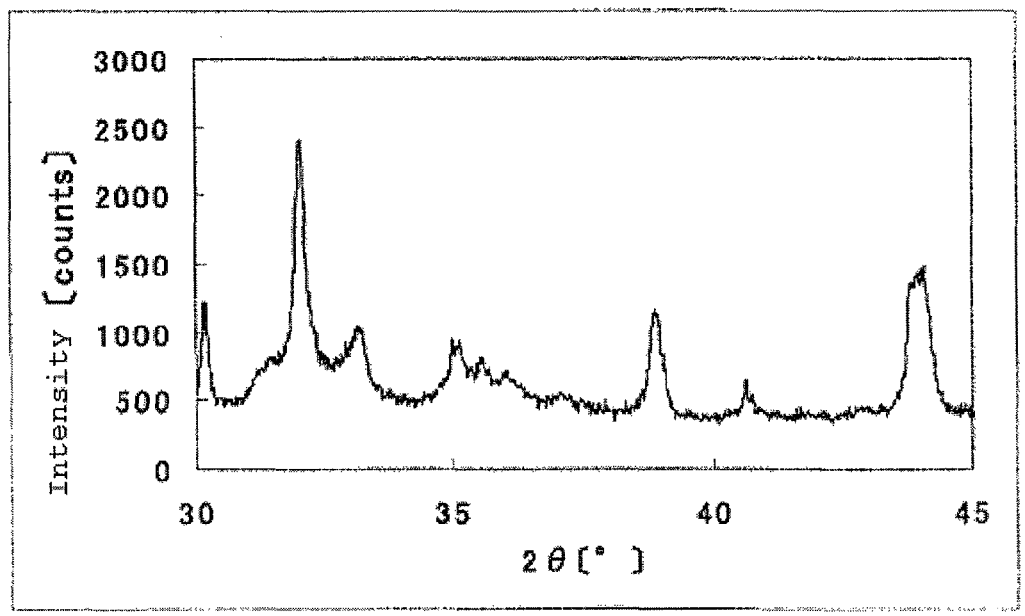
FIG. 19 is a powder X-ray diffraction spectrum of a catalyst (17) in Example 16.
Figure 20:
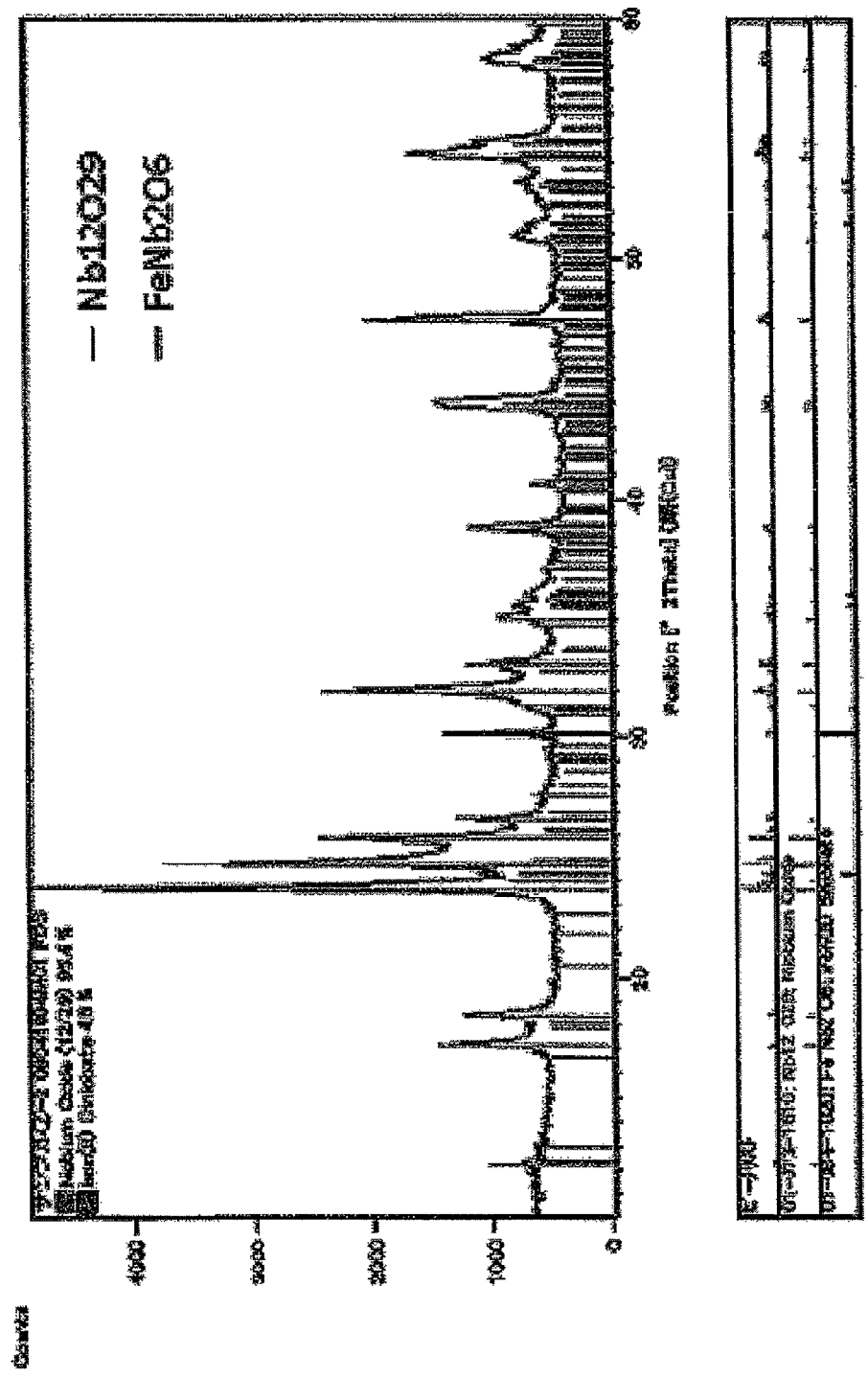
FIG. 20 is a graph obtained by peak analysis of the powder X-ray diffraction spectrum of the catalyst (17) in Example 16.

FIG. 19 shows a powder X-ray diffraction spectrum of the catalyst (17). Six diffraction peaks were observed at diffraction angles 2θ of 33° to 43°. From spectral retrieval of the powder X-ray diffraction spectrum of the catalyst (17), a peak assigned to $Nb_{12}O_{29}$ was observed as shown in FIG. 20.

2. Production of Fuel Cell Electrode

A fuel cell electrode (17) was produced in the same manner as in Example 1, except that the catalyst (17) was used.

3. Evaluation of Oxygen Reducing Ability

The fuel cell electrode (17) was evaluated for catalytic performance (oxygen reducing ability) as described in Example 1.

Figure 55:
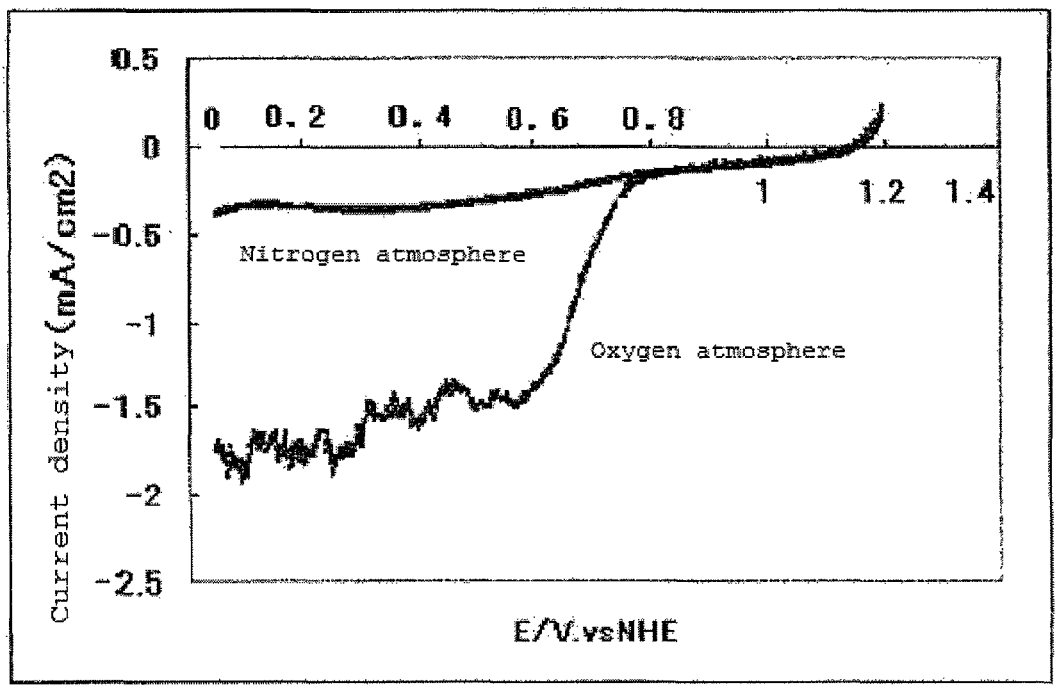
FIG. 55 is a graph showing an evaluation of the oxygen reducing ability of a fuel cell electrode (17) in Example 16.

The current-potential curve recorded during the measurement is shown in FIG. 55.

The fuel cell electrode (17) manufactured in Example 16 had an oxygen reduction onset potential of 0.90 V (vs. NHE) and was found to have high oxygen reducing ability.

Example 17

1. Preparation of Catalyst

Niobium carbide (NbC) weighing 5.88 g (56 mmol), cobalt acetylacetone complex ($C_{10}H_{14}O_4Co$) weighing 1.29 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 10.94 g of a carbonitride (18) containing cobalt and niobium. The sintered carbonitride (18) was crushed with a ball mill. The carbonitride (18) in an amount of 1.05 g was heat treated in the same manner as in Example 12 to give 1.35 g of an oxycarbonitride containing cobalt and niobium (hereinafter, also the catalyst (18)). The results of elemental analysis of the catalyst (18) are shown in Table 1.

Figure 21:
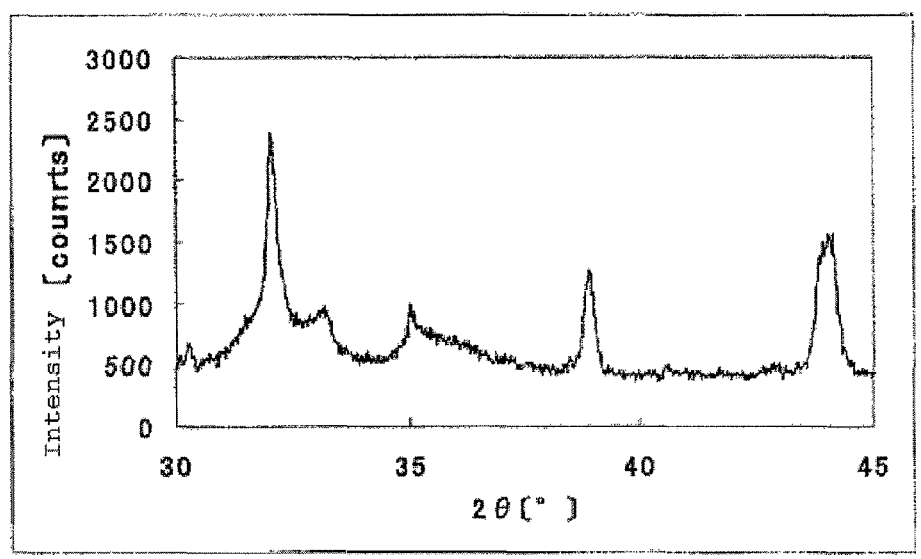
FIG. 21 is a powder X-ray diffraction spectrum of a catalyst (18) in Example 17.
Figure 22:
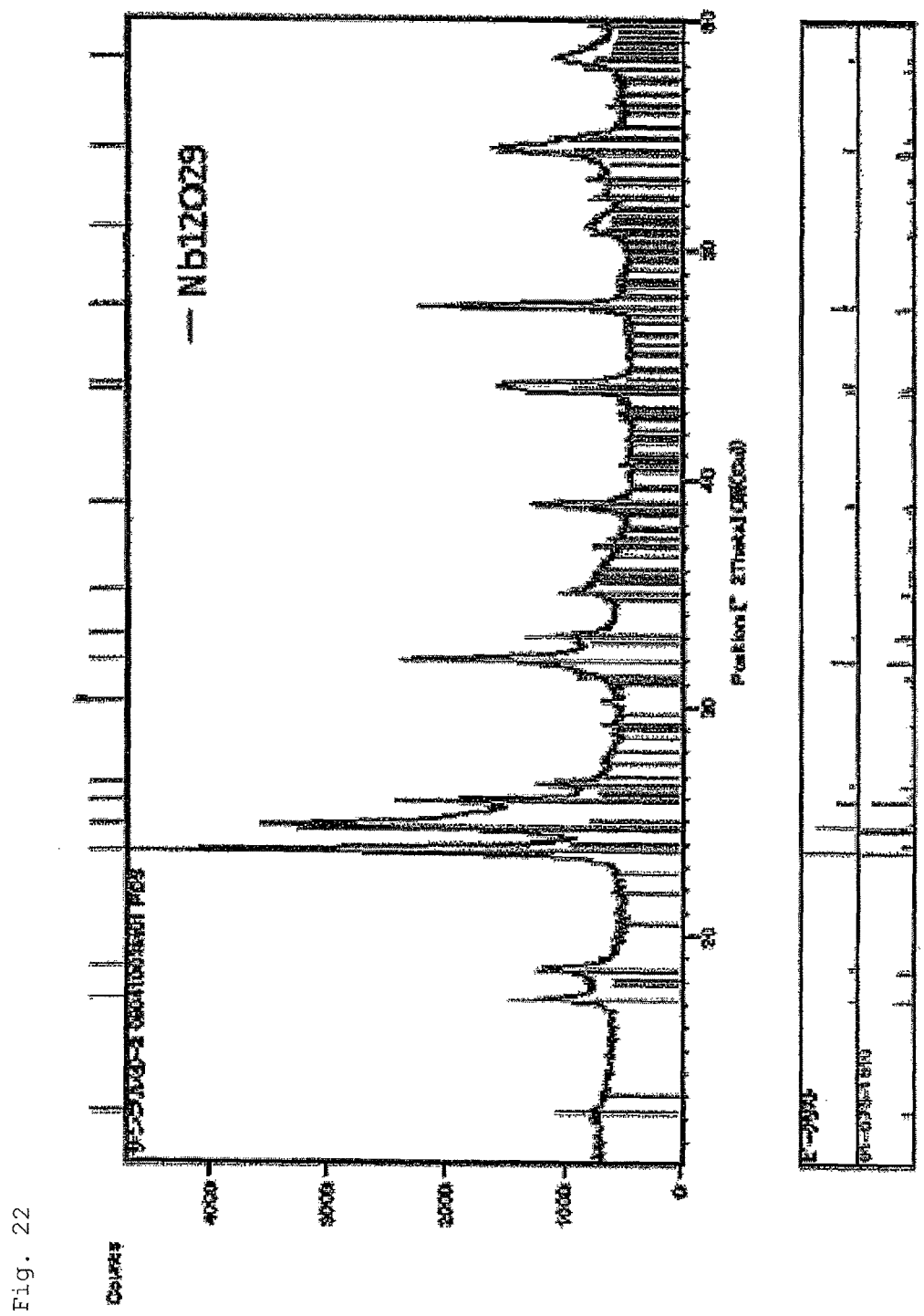
FIG. 22 is a graph obtained by peak analysis of the powder X-ray diffraction spectrum of the catalyst (18) in Example 17.

FIG. 21 shows a powder X-ray diffraction spectrum of the catalyst (18). Three diffraction peaks were observed at diffraction angles 2θ of 33° to 43°. From spectral retrieval of the powder X-ray diffraction spectrum of the catalyst (18), a peak assigned to $Nb_{12}O_{29}$ was observed as shown in FIG. 22.

2. Production of Fuel Cell Electrode

A fuel cell electrode (18) was produced in the same manner as in Example 1, except that the catalyst (18) was used.

3. Evaluation of Oxygen Reducing Ability

The fuel cell electrode (18) was evaluated for catalytic performance (oxygen reducing ability) as described in Example 1.

Figure 56:
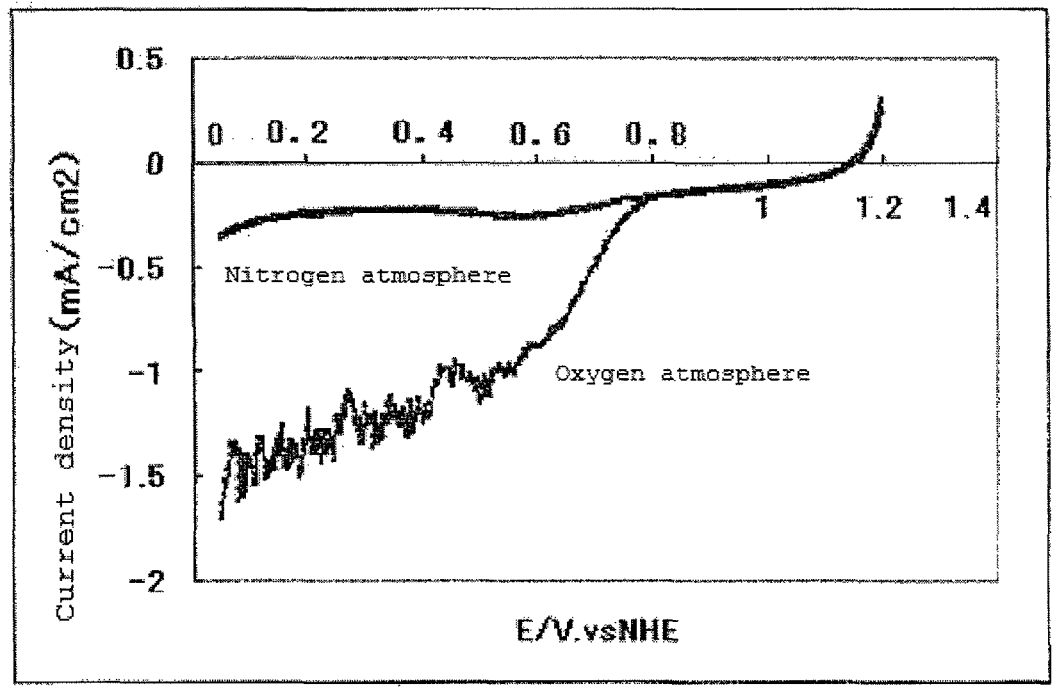
FIG. 56 is a graph showing an evaluation of the oxygen reducing ability of a fuel cell electrode (18) in Example 17.

The current-potential curve recorded during the measurement is shown in FIG. 56.

The fuel cell electrode (18) manufactured in Example 17 had an oxygen reduction onset potential of 0.87 V (vs. NHE) and was found to have high oxygen reducing ability.

Example 18

1. Preparation of Catalyst

Niobium carbide (NbC) weighing 5.88 g (56 mmol) and niobium nitride (NbN) weighing 5.14 g (48 mmol) were mixed together. A solution of 0.203 g (0.5 mmol) of tetrachloroauric acid ($HAuCl_4.nH_2O$) in 1 ml of ethanol was added to the mixture. The mixture was sufficiently crushed and mixed together. The resultant powder mixture was heat treated in a tubular furnace under a nitrogen atmosphere at 1600° C. for 3 hours to give 11.33 g of a carbonitride (19) containing gold and niobium. The sintered carbonitride (19) was crushed with a ball mill. The carbonitride (19) in an amount of 1.02 g was heat treated in the same manner as in Example 12 to give 1.25 g of an oxycarbonitride containing gold and niobium (hereinafter, also the catalyst (19)). The results of elemental analysis of the catalyst (19) are shown in Table 1.

Figure 23:
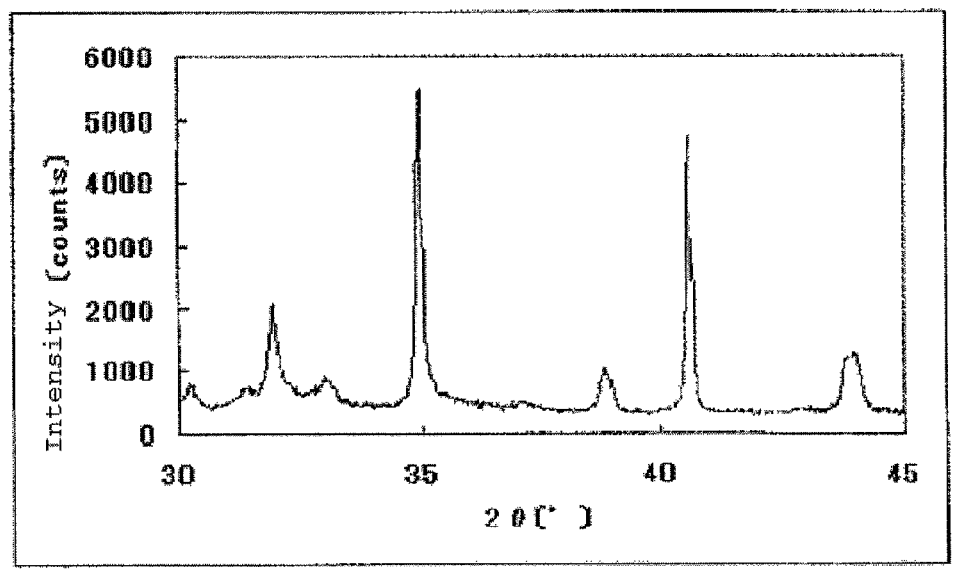
FIG. 23 is a powder X-ray diffraction spectrum of a catalyst (19) in Example 18.

FIG. 23 shows a powder X-ray diffraction spectrum of the catalyst (19). Four diffraction peaks were observed at diffraction angles 2θ of 33° to 43°.

2. Production of Fuel Cell Electrode

A fuel cell electrode (19) was produced in the same manner as in Example 1, except that the catalyst (19) was used.

3. Evaluation of Oxygen Reducing Ability

The fuel cell electrode (19) was evaluated for catalytic performance (oxygen reducing ability) as described in Example 1.

Figure 57:
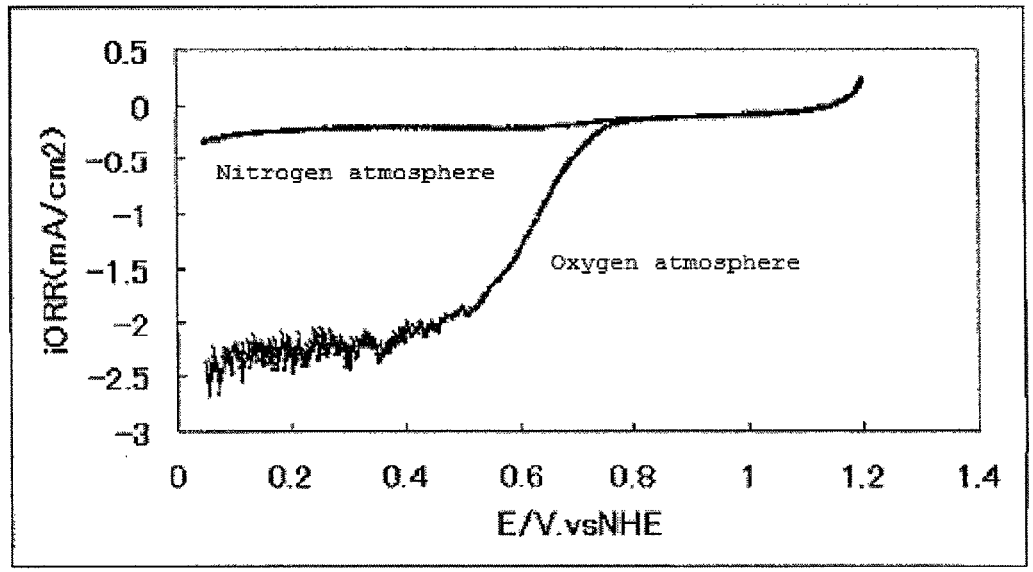
FIG. 57 is a graph showing an evaluation of the oxygen reducing ability of a fuel cell electrode (19) in Example 18.

The current-potential curve recorded during the measurement is shown in FIG. 57.

The fuel cell electrode (19) manufactured in Example 18 had an oxygen reduction onset potential of 0.90 V (vs. NHE) and was found to have high oxygen reducing ability.

Example 19

1. Preparation of Catalyst

Niobium carbide (NbC) weighing 5.88 g (56 mmol), silver acetate ($C_2H_3O_2Ag$) weighing 0.835 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 10.82 g of a carbonitride (20) containing silver and niobium. The sintered carbonitride (20) was crushed with a ball mill. The carbonitride (20) in an amount of 0.98 g was heat treated in the same manner as in Example 12 to give 1.27 g of an oxycarbonitride containing silver and niobium (hereinafter, also the catalyst (20)). The results of elemental analysis of the catalyst (20) are shown in Table 1.

Figure 24:
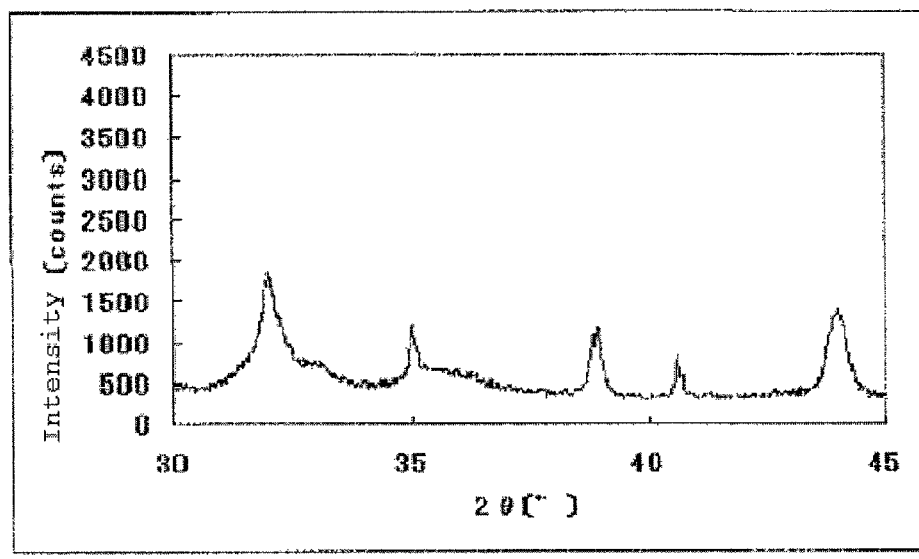
FIG. 24 is a powder X-ray diffraction spectrum of a catalyst (20) in Example 19.

FIG. 24 shows a powder X-ray diffraction spectrum of the catalyst (20). Three diffraction peaks were observed at diffraction angles 2θ of 33° to 43°.

2. Production of Fuel Cell Electrode

A fuel cell electrode (20) was produced in the same manner as in Example 1, except that the catalyst (20) was used.

3. Evaluation of Oxygen Reducing Ability

The fuel cell electrode (20) was evaluated for catalytic performance (oxygen reducing ability) as described in Example 1.

Figure 58:
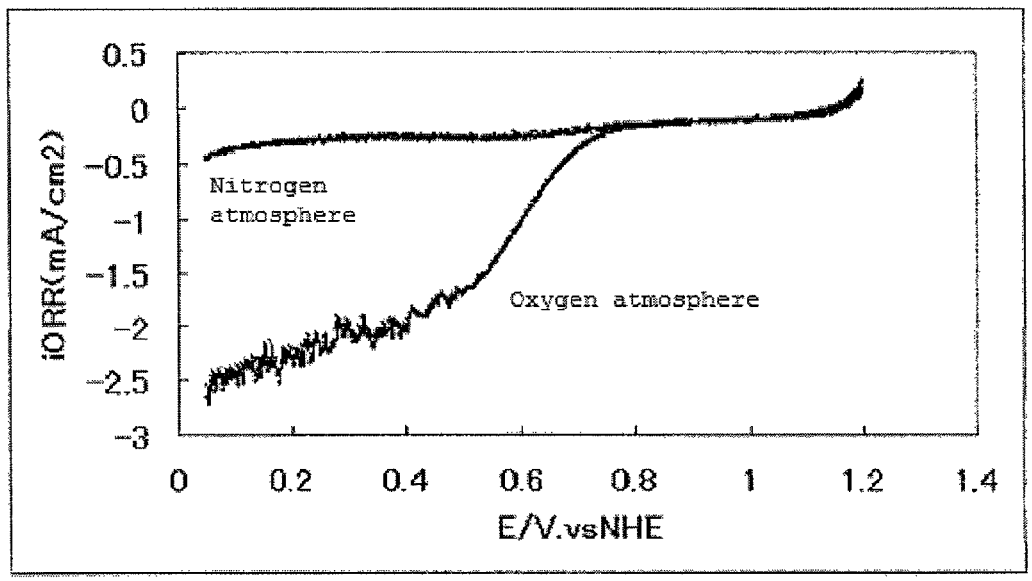
FIG. 58 is a graph showing an evaluation of the oxygen reducing ability of a fuel cell electrode (20) in Example 19.

The current-potential curve recorded during the measurement is shown in FIG. 58.

The fuel cell electrode (20) manufactured in Example 19 had an oxygen reduction onset potential of 0.88 V (vs. NHE) and was found to have high oxygen reducing ability.

Example 20

1. Preparation of Catalyst

Niobium carbide (NbC) weighing 5.88 g (56 mmol), palladium oxide (PdO) weighing 0.61 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 11.63 g of a carbonitride (21) containing palladium and niobium. The sintered carbonitride (21) was crushed with a ball mill. The carbonitride (21) in an amount of 0.99 g was heat treated in the same manner as in Example 12 to give 1.26 g of an oxycarbonitride containing palladium and niobium (hereinafter, also the catalyst (21)). The results of elemental analysis of the catalyst (21) are shown in Table 1.

FIG. 25 shows a powder X-ray diffraction spectrum of the catalyst (21). FIG. 26 is an enlarged view of the powder X-ray diffraction spectrum at diffraction angles 2θ of 30° to 45°. Four diffraction peaks were observed at diffraction angles 2θ of 33° to 43°.

2. Production of Fuel Cell Electrode

A fuel cell electrode (21) was produced in the same manner as in Example 1, except that the catalyst (21) was used.

3. Evaluation of Oxygen Reducing Ability

The fuel cell electrode (21) was evaluated for catalytic performance (oxygen reducing ability) as described in Example 1.

Figure 59:
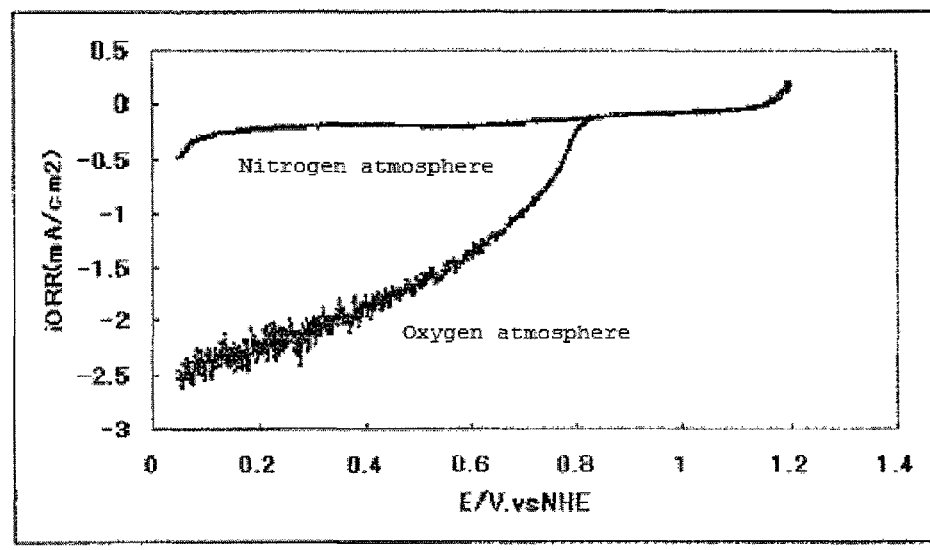
FIG. 59 is a graph showing an evaluation of the oxygen reducing ability of a fuel cell electrode (21) in Example 20.

The current-potential curve recorded during the measurement is shown in FIG. 59.

The fuel cell electrode (21) manufactured in Example 20 had an oxygen reduction onset potential of 0.88 V (vs. NHE) and was found to have high oxygen reducing ability.

Example 21

1. Preparation of Catalyst

Niobium carbide (NbC) weighing 5.88 g (56 mmol), iridium oxide ($IrO_2$) weighing 1.12 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 11.29 g of a carbonitride (22) containing iridium and niobium. The sintered carbonitride (22) was crushed with a ball mill. The carbonitride (22) in an amount of 1.01 g was heat treated in the same manner as in Example 12 to give 1.27 g of an oxycarbonitride containing iridium and niobium (hereinafter, also the catalyst (22)). The results of elemental analysis of the catalyst (22) are shown in Table 1.

Figure 27:
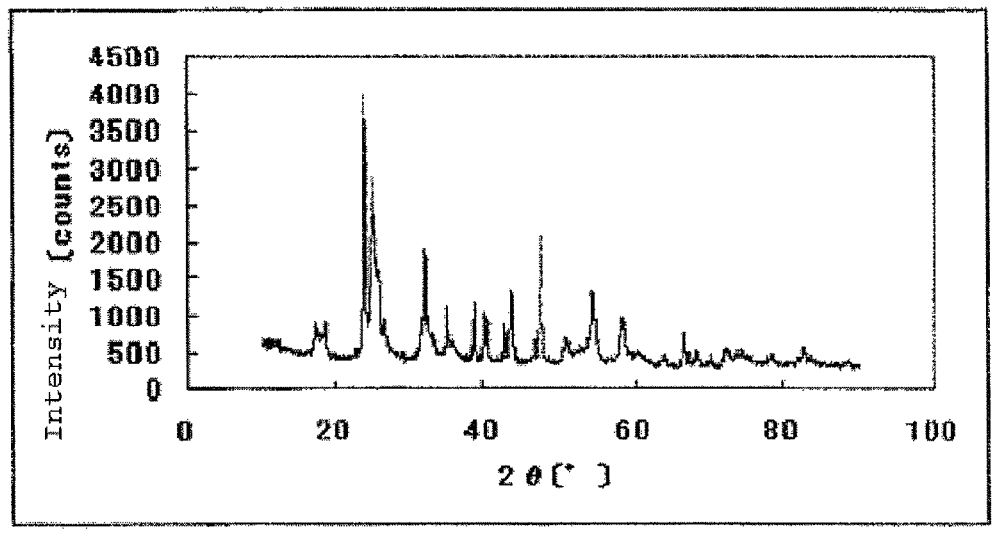
FIG. 27 is a powder X-ray diffraction spectrum of a catalyst (22) in Example 21.
Figure 28:
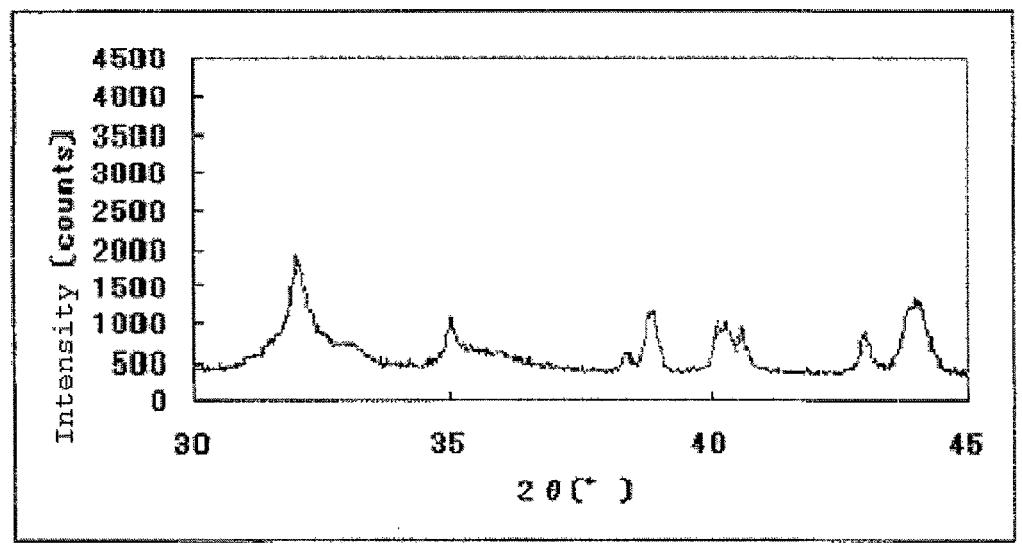
FIG. 28 is an enlarged view of the powder X-ray diffraction spectrum of the catalyst (22) in Example 21 at diffraction angles $2\theta$ of 30° to 45°.

FIG. 27 shows a powder X-ray diffraction spectrum of the catalyst (22). FIG. 28 is an enlarged view of the powder X-ray diffraction spectrum at diffraction angles 2θ of 30° to 45°. Five diffraction peaks were observed at diffraction angles 2θ of 33° to 43°.

2. Production of Fuel Cell Electrode

A fuel cell electrode (22) was produced in the same manner as in Example 1, except that the catalyst (22) was used.

3. Evaluation of Oxygen Reducing Ability

The fuel cell electrode (22) was evaluated for catalytic performance (oxygen reducing ability) as described in Example 1.

Figure 60:
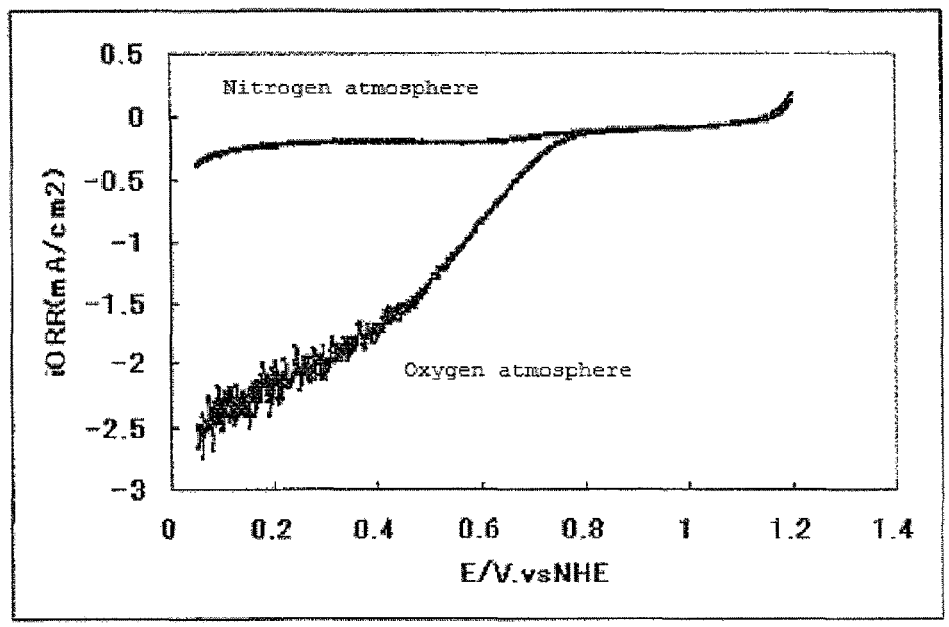
FIG. 60 is a graph showing an evaluation of the oxygen reducing ability of a fuel cell electrode (22) in Example 21.

The current-potential curve recorded during the measurement is shown in FIG. 60.

The fuel cell electrode (22) manufactured in Example 21 had an oxygen reduction onset potential of 0.88 V (vs. NHE) and was found to have high oxygen reducing ability.

Example 22

1. Preparation of Catalyst

Niobium carbide (NbC) weighing 5.88 g (56 mmol), ruthenium oxide ($RuO_2$) weighing 0.67 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 11.29 g of a carbonitride (23) containing ruthenium and niobium. The sintered carbonitride (23) was crushed with a ball mill. The carbonitride (23) in an amount of 1.02 g was heat treated in the same manner as in Example 12 to give 1.29 g of an oxycarbonitride containing ruthenium and niobium (hereinafter, also the catalyst (23)). The results of elemental analysis of the catalyst (23) are shown in Table 1.

Figure 29:
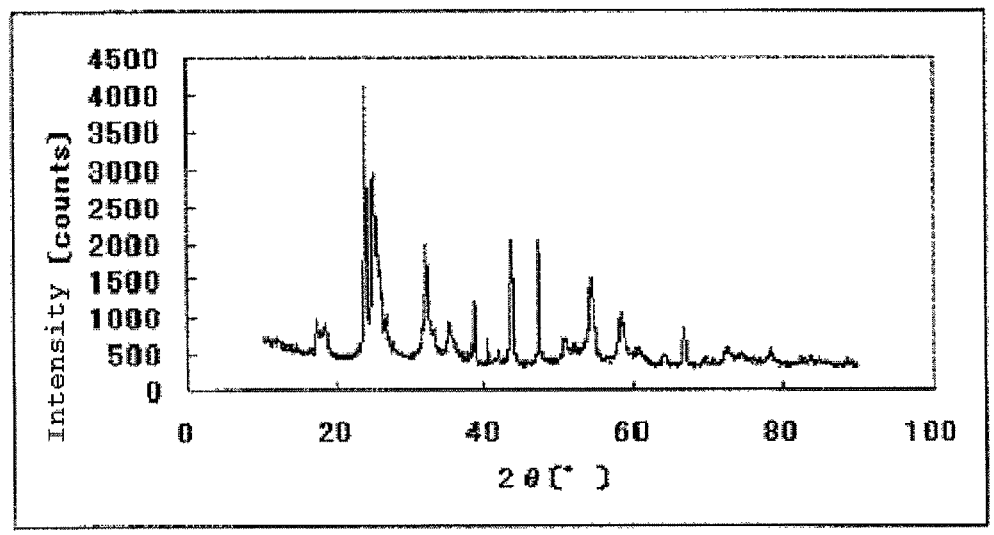
FIG. 29 is a powder X-ray diffraction spectrum of a catalyst (23) in Example 22.
Figure 30:
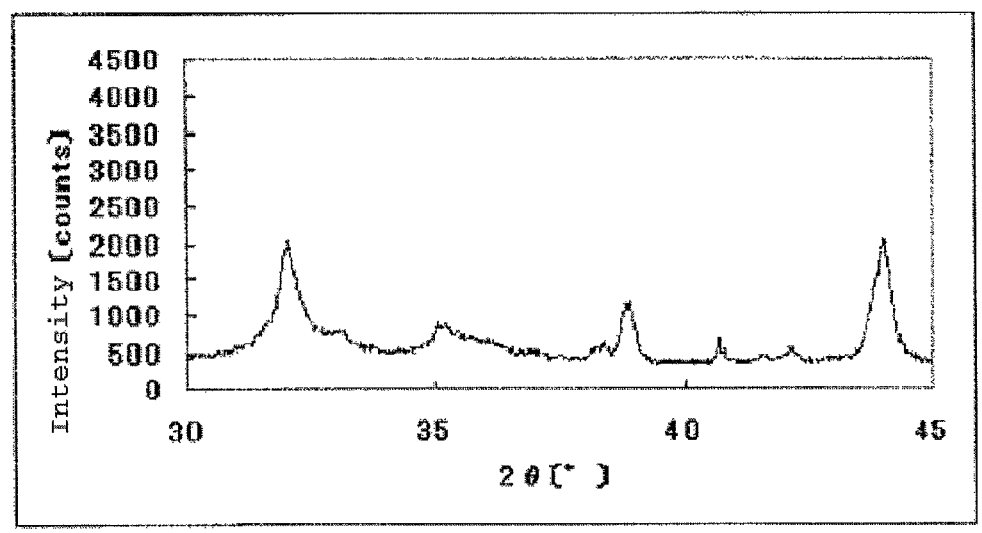
FIG. 30 is an enlarged view of the powder X-ray diffraction spectrum of the catalyst (23) in Example 22 at diffraction angles $2\theta$ of 30° to 45°.

FIG. 29 shows a powder X-ray diffraction spectrum of the catalyst (23). FIG. 30 is an enlarged view of the powder X-ray diffraction spectrum at diffraction angles 2θ of 30° to 45°. Three diffraction peaks were observed at diffraction angles 2θ of 33° to 43°.

2. Production of Fuel Cell Electrode

A fuel cell electrode (23) was produced in the same manner as in Example 1, except that the catalyst (23) was used.

3. Evaluation of Oxygen Reducing Ability

The fuel cell electrode (23) was evaluated for catalytic performance (oxygen reducing ability) as described in Example 1.

Figure 61:
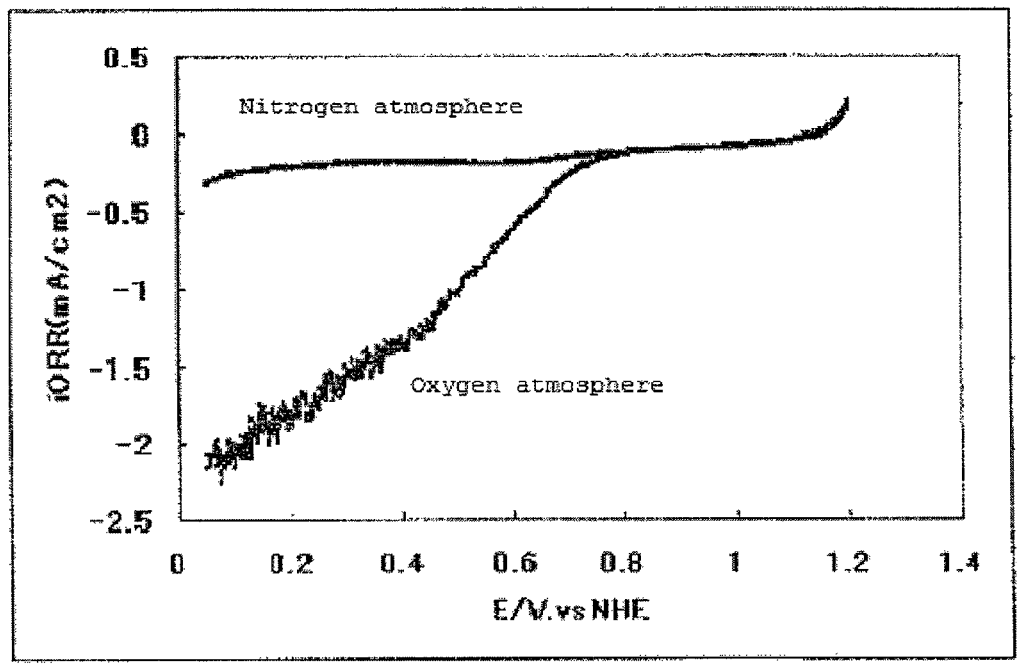
FIG. 61 is a graph showing an evaluation of the oxygen reducing ability of a fuel cell electrode (23) in Example 22.

The current-potential curve recorded during the measurement is shown in FIG. 61.

The fuel cell electrode (23) manufactured in Example 22 had an oxygen reduction onset potential of 0.88 V (vs. NHE) and was found to have high oxygen reducing ability.

Example 23

1. Preparation of Catalyst

Niobium carbide (NbC) weighing 5.17 g (49 mmol), lanthanum oxide ($La_2O_3$) weighing 0.30 g (0.9 mmol) and niobium nitride (NbN) weighing 4.52 g (42 mmol) were sufficiently crushed and mixed together. The resultant powder mixture was heat treated in a tubular furnace under a nitrogen atmosphere at 1600° C. for 3 hours to give a carbonitride (24) containing niobium and lanthanum.

The carbonitride (24) in an amount of 0.5 g was heat treated in a rotary kiln at 950° C. for 8 hours while passing through the kiln equal amounts of an argon gas containing 1% by volume of oxygen gas and a nitrogen gas containing 4% by volume of hydrogen gas. As a result, an oxycarbonitride containing niobium and lanthanum (hereinafter, also the catalyst (24)) was obtained.

Figure 31:
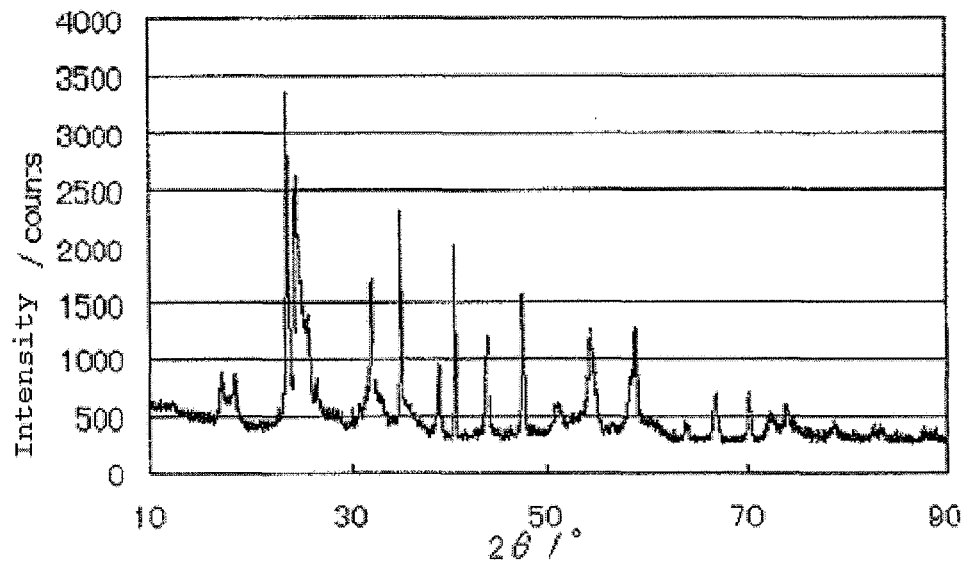
FIG. 31 is a powder X-ray diffraction spectrum of a catalyst (24) in Example 23.
Figure 32:
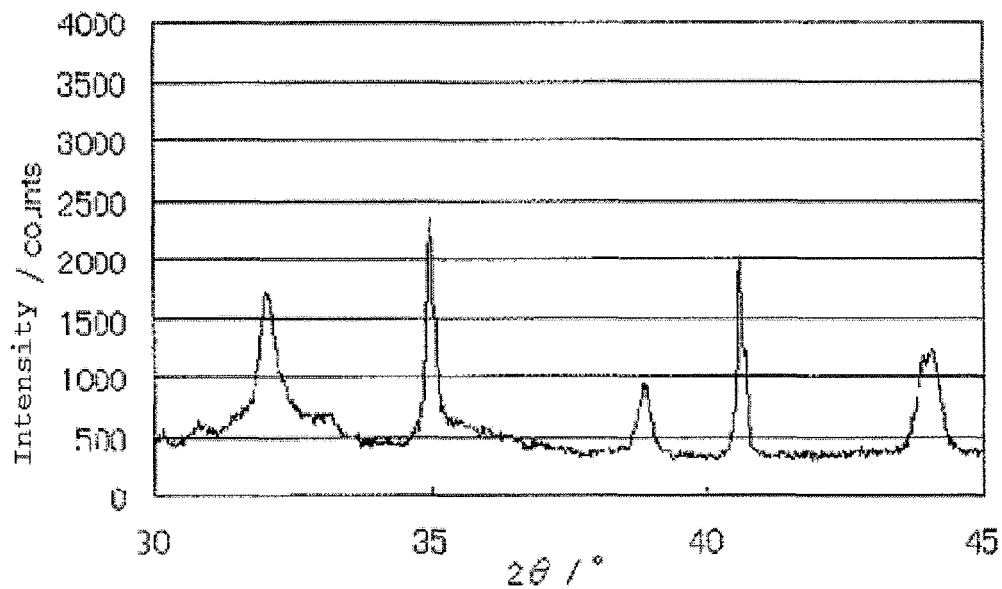
FIG. 32 is an enlarged view of the powder X-ray diffraction spectrum of the catalyst (24) in Example 23 at diffraction angles $2\theta$ of 30° to 45°.

FIG. 31 shows a powder X-ray diffraction spectrum of the catalyst (24). FIG. 32 is an enlarged view of the powder X-ray diffraction spectrum at diffraction angles 2θ of 30° to 45°. Three diffraction peaks were observed at diffraction angles 2θ of 33° to 43°.

2. Production of Fuel Cell Electrode

A fuel cell electrode (24) was produced in the same manner as in Example 1, except that the catalyst (24) was used.

3. Evaluation of Oxygen Reducing Ability

The fuel cell electrode (24) was evaluated for catalytic performance (oxygen reducing ability) as described in Example 1.

Figure 62:
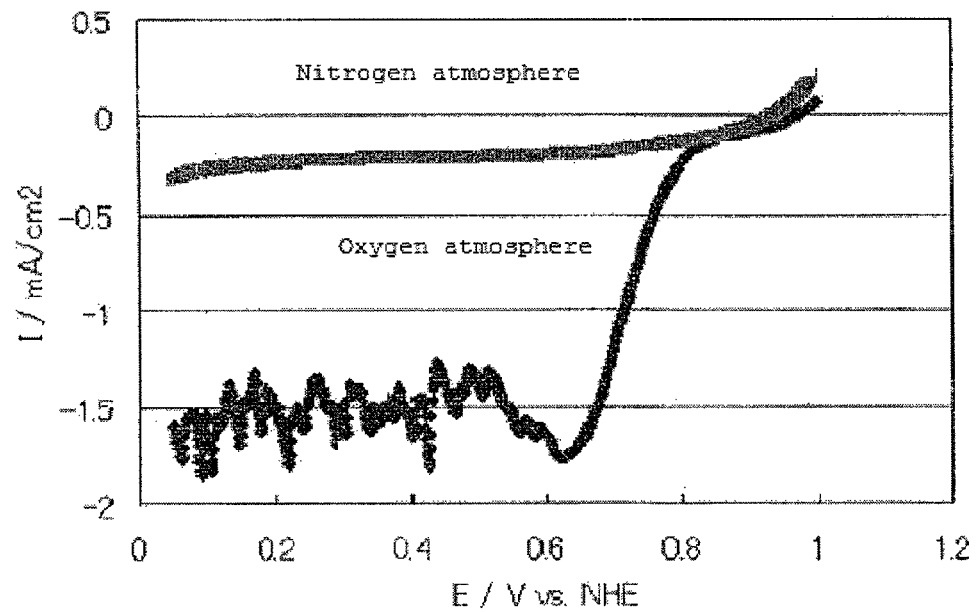
FIG. 62 is a graph showing an evaluation of the oxygen reducing ability of a fuel cell electrode (24) in Example 23.

The current-potential curve recorded during the measurement is shown in FIG. 62.

The fuel cell electrode (24) manufactured in Example 23 had an oxygen reduction onset potential of 0.88 V (vs. NHE) and was found to have high oxygen reducing ability.

Example 24

1. Preparation of Catalyst

Niobium carbide (NbC) weighing 5.17 g (49 mmol), praseodymium oxide ($Pr_6O_{11}$) weighing 0.31 g (0.3 mmol) and niobium nitride (NbN) weighing 4.52 g (42 mmol) were sufficiently crushed and mixed together. The resultant powder mixture was heat treated in a tubular furnace under a nitrogen atmosphere at 1600° C. for 3 hours to give a carbonitride (25) containing niobium and praseodymium.

The carbonitride (25) in an amount of 0.5 g was heat treated in a rotary kiln at 950° C. for 8 hours while passing through the kiln equal amounts of an argon gas containing 1% by volume of oxygen gas and a nitrogen gas containing 4% by volume of hydrogen gas. As a result, an oxycarbonitride containing niobium and praseodymium (hereinafter, also the catalyst (25)) was obtained.

Figure 33:
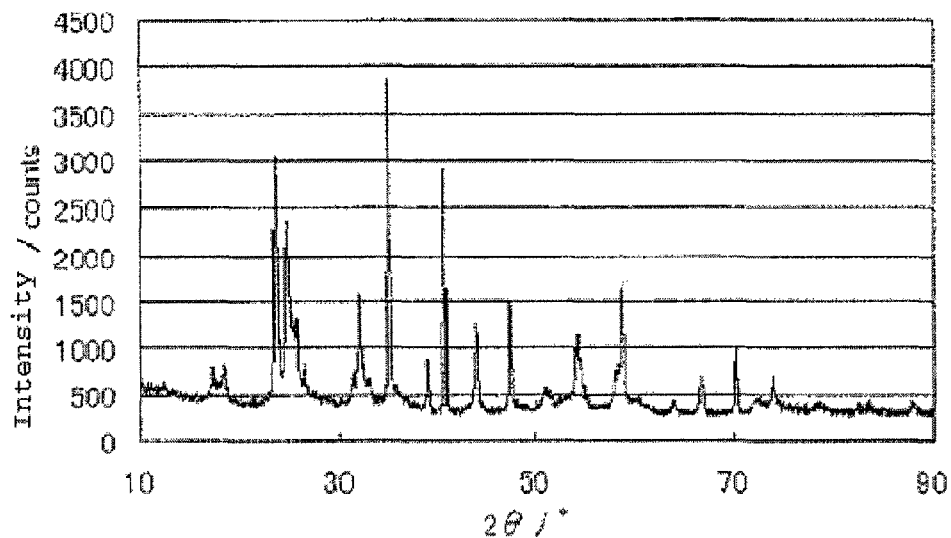
FIG. 33 is a powder X-ray diffraction spectrum of a catalyst (25) in Example 24.
Figure 34:
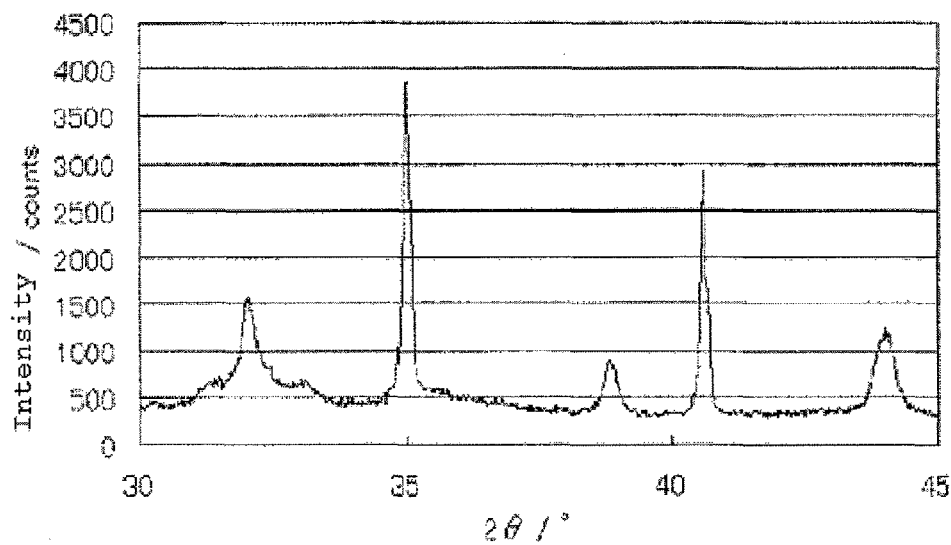
FIG. 34 is an enlarged view of the powder X-ray diffraction spectrum of the catalyst (25) in Example 24 at diffraction angles $2\theta$ of 30° to 45°.

FIG. 33 shows a powder X-ray diffraction spectrum of the catalyst (25). FIG. 34 is an enlarged view of the powder X-ray diffraction spectrum at diffraction angles 2θ of 30° to 45°. Three diffraction peaks were observed at diffraction angles 2θ of 33° to 43°.

2. Production of Fuel Cell Electrode

A fuel cell electrode (25) was produced in the same manner as in Example 1, except that the catalyst (25) was used.

3. Evaluation of Oxygen Reducing Ability

The fuel cell electrode (25) was evaluated for catalytic performance (oxygen reducing ability) as described in Example 1.

Figure 63:
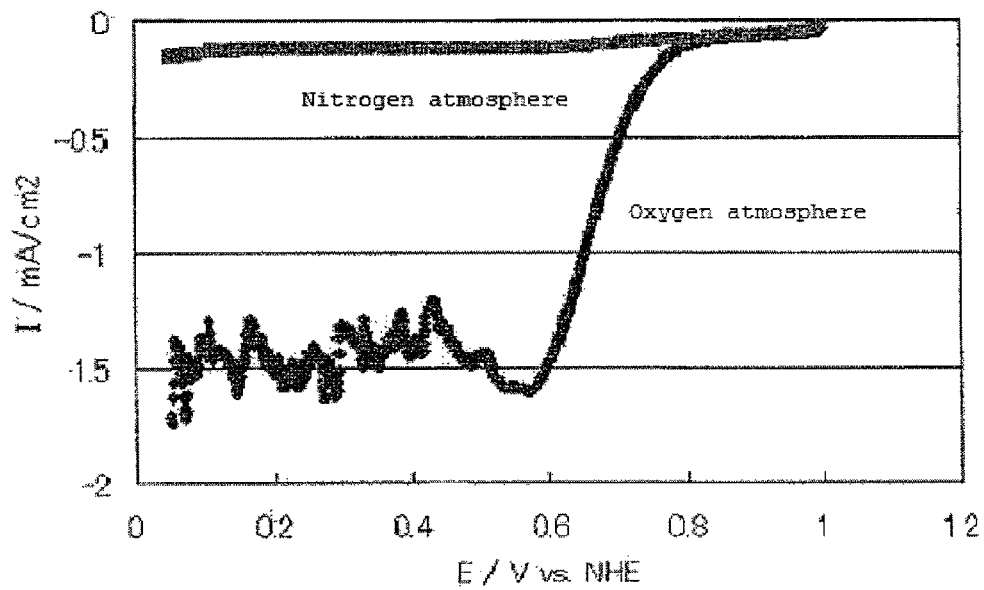
FIG. 63 is a graph showing an evaluation of the oxygen reducing ability of a fuel cell electrode (25) in Example 24.

The current-potential curve recorded during the measurement is shown in FIG. 63.

The fuel cell electrode (25) manufactured in Example 24 had an oxygen reduction onset potential of 0.85 V (vs. NHE) and was found to have high oxygen reducing ability.

Example 25

1. Preparation of Catalyst

Niobium carbide (NbC) weighing 5.17 g (49 mmol), neodymium oxide ($Nd_2O_3$) weighing 0.31 g (0.9 mmol) and niobium nitride (NbN) weighing 4.51 g (42 mmol) sufficiently crushed and mixed together. The resultant powder mixture was heat treated in a tubular furnace under a nitrogen atmosphere at 1600° C. for 3 hours to give a carbonitride (26) containing niobium and neodymium.

The carbonitride (26) in an amount of 0.5 g was heat treated in a rotary kiln at 950° C. for 8 hours while passing through the kiln equal amounts of an argon gas containing 1% by volume of oxygen gas and a nitrogen gas containing 4% by volume of hydrogen gas. As a result, an oxycarbonitride containing niobium and neodymium (hereinafter, also the catalyst (26)) was obtained.

Figure 35:
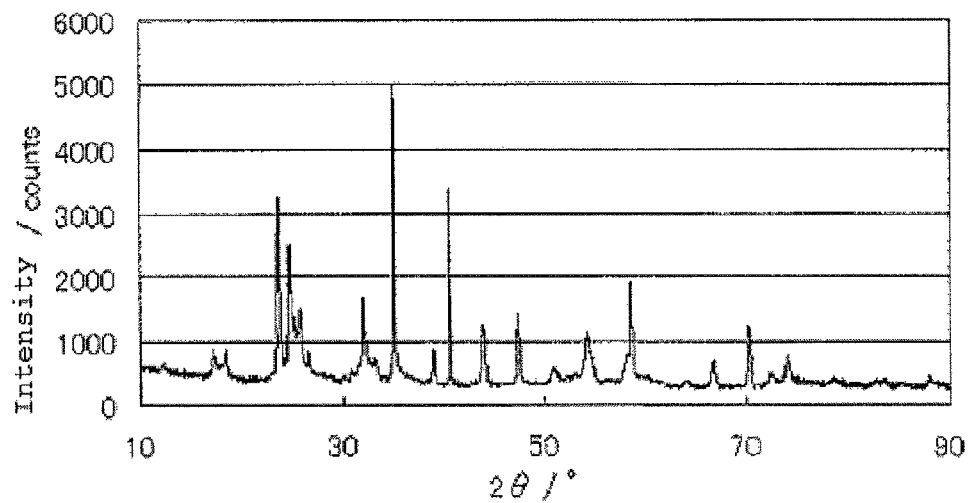
FIG. 35 is a powder X-ray diffraction spectrum of a catalyst (26) in Example 25.
Figure 36:
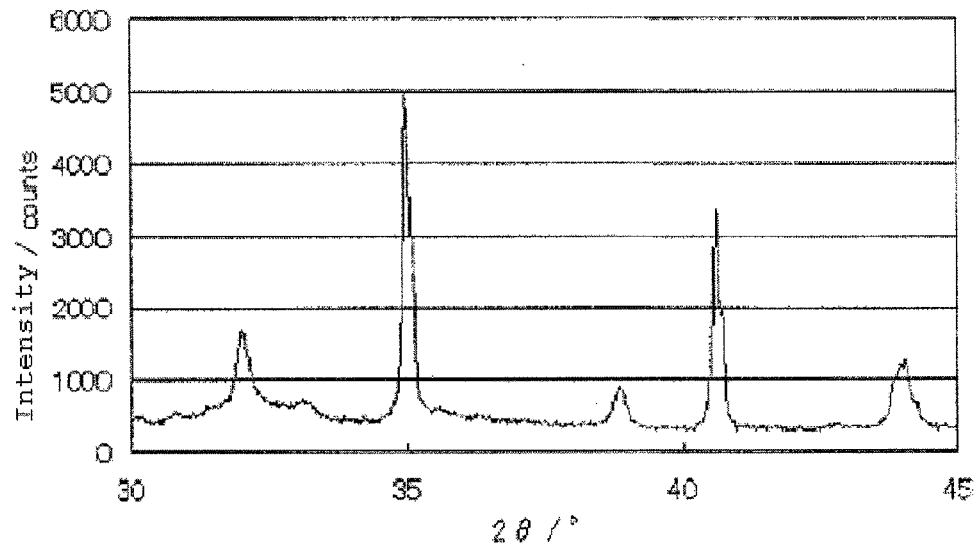
FIG. 36 is an enlarged view of the powder X-ray diffraction spectrum of the catalyst (26) in Example 25 at diffraction angles $2\theta$ of 30° to 45°.

FIG. 35 shows a powder X-ray diffraction spectrum of the catalyst (26). FIG. 36 is an enlarged view of the powder X-ray diffraction spectrum at diffraction angles 2θ of 30° to 45°. Three diffraction peaks were observed at diffraction angles 2θ of 33° to 43°.

2. Production of Fuel Cell Electrode

A fuel cell electrode (26) was produced in the same manner as in Example 1, except that the catalyst (26) was used.

3. Evaluation of Oxygen Reducing Ability

The fuel cell electrode (26) was evaluated for catalytic performance (oxygen reducing ability) as described in Example 1.

Figure 64:
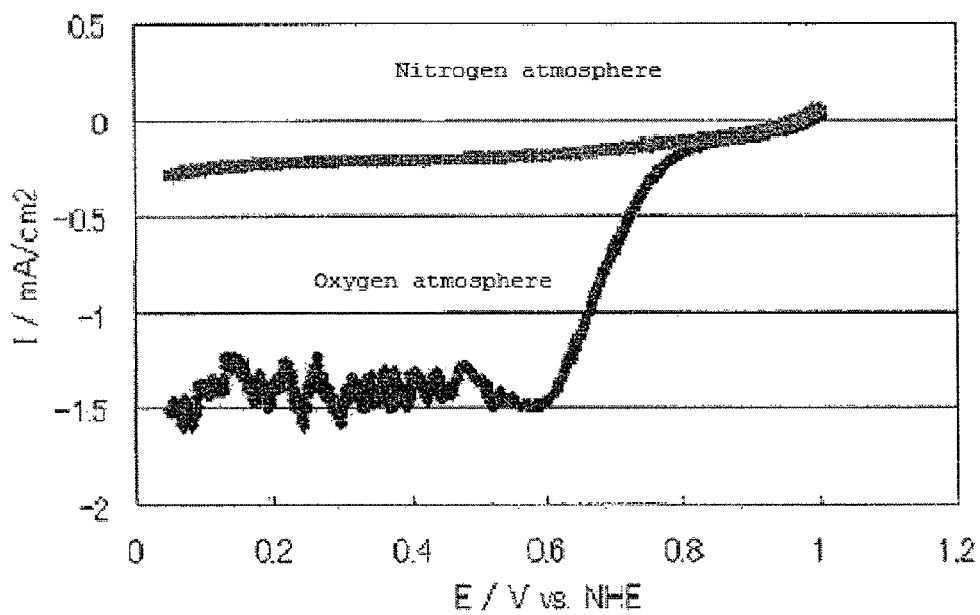
FIG. 64 is a graph showing an evaluation of the oxygen reducing ability of a fuel cell electrode (26) in Example 25.

The current-potential curve recorded during the measurement is shown in FIG. 64.

The fuel cell electrode (26) manufactured in Example 25 had an oxygen reduction onset potential of 0.85 V (vs. NHE) and was found to have high oxygen reducing ability.

Example 26

1. Preparation of Catalyst

Niobium carbide (NbC) weighing 5.17 g (49 mmol), samarium oxide ($Sm_2O_3$) weighing 0.32 g (0.9 mmol) and niobium nitride (NbN) weighing 4.51 g (42 mmol) were sufficiently crushed and mixed together. The resultant powder mixture was heat treated in a tubular furnace under a nitrogen atmosphere at 1600° C. for 3 hours to give a carbonitride (27) containing niobium and samarium.

The carbonitride (27) in an amount of 0.5 g was heat treated in a rotary kiln at 950° C. for 8 hours while passing through the kiln equal amounts of an argon gas containing 1% by volume of oxygen gas and a nitrogen gas containing 4% by volume of hydrogen gas. As a result, an oxycarbonitride containing niobium and samarium (hereinafter, also the catalyst (27)) was obtained.

Figure 37:
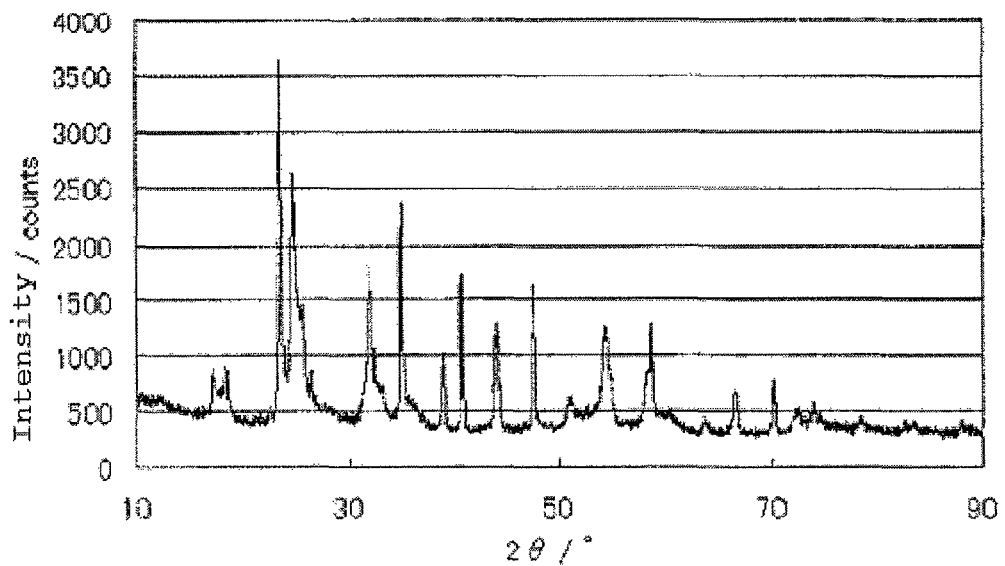
FIG. 37 is a powder X-ray diffraction spectrum of a catalyst (27) in Example 26.
Figure 38:
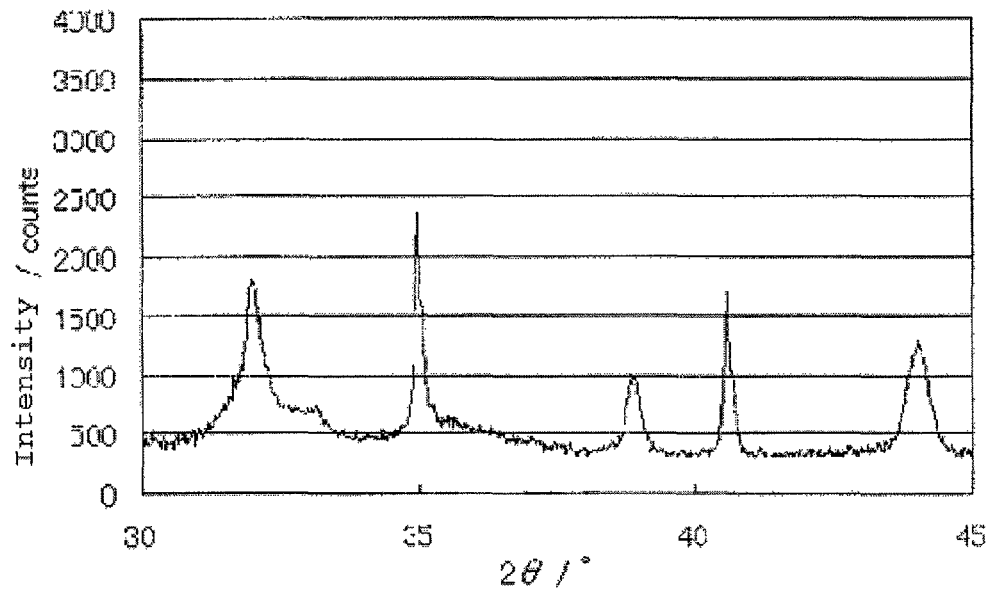
FIG. 38 is an enlarged view of the powder X-ray diffraction spectrum of the catalyst (27) in Example 26 at diffraction angles $2\theta$ of 30° to 45°.

FIG. 37 shows a powder X-ray diffraction spectrum of the catalyst (27). FIG. 38 is an enlarged view of the powder X-ray diffraction spectrum at diffraction angles 2θ of 30° to 45°. Three diffraction peaks were observed at diffraction angles 2θ of 33° to 43°.

2. Production of Fuel Cell Electrode

A fuel cell electrode (27) was produced in the same manner as in Example 1, except that the catalyst (27) was used.

3. Evaluation of Oxygen Reducing Ability

The fuel cell electrode (27) was evaluated for catalytic performance (oxygen reducing ability) as described in Example 1.

Figure 65:
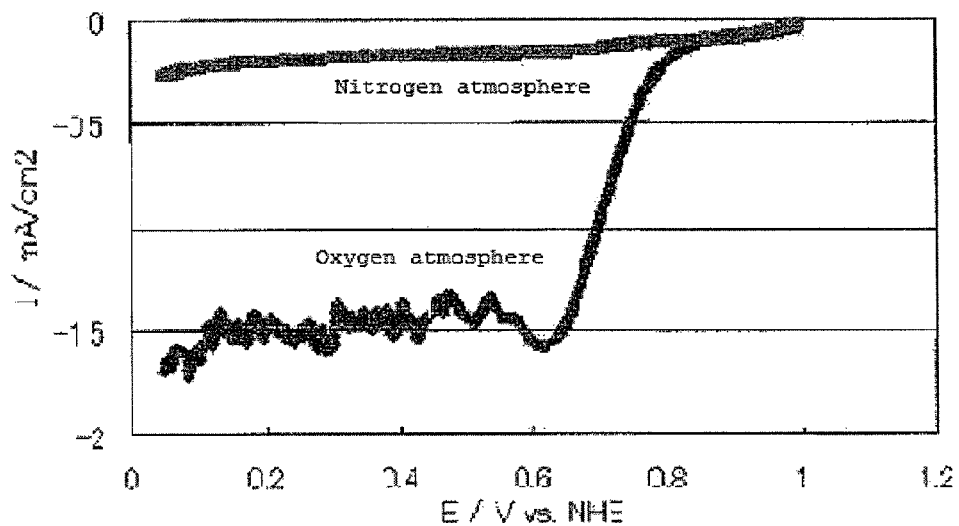
FIG. 65 is a graph showing an evaluation of the oxygen reducing ability of a fuel cell electrode (27) in Example 26.

The current-potential curve recorded during the measurement is shown in FIG. 65.

The fuel cell electrode (27) manufactured in Example 26 had an oxygen reduction onset potential of 0.90 V (vs. NHE) and was found to have high oxygen reducing ability.

Comparative Example 2

1. Preparation of Catalyst

Niobium carbide (NbC) weighing 5.88 g (56 mmol), ferric oxide ($Fe_2O_3$) weighing 0.40 g (2.5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 11.19 g of a carbonitride containing iron and niobium (hereinafter, also the catalyst (28)).

The sintered catalyst (28) was crushed with a ball mill.

The results of elemental analysis of the crushed catalyst (28) are shown in Table 1.

2. Production of Fuel Cell Electrode

A fuel cell electrode (28) was produced in the same manner as in Example 1, except that the catalyst (28) was used.

3. Evaluation of Oxygen Reducing Ability

The fuel cell electrode (28) was evaluated for catalytic performance (oxygen reducing ability) as described in Example 1.

Figure 66:
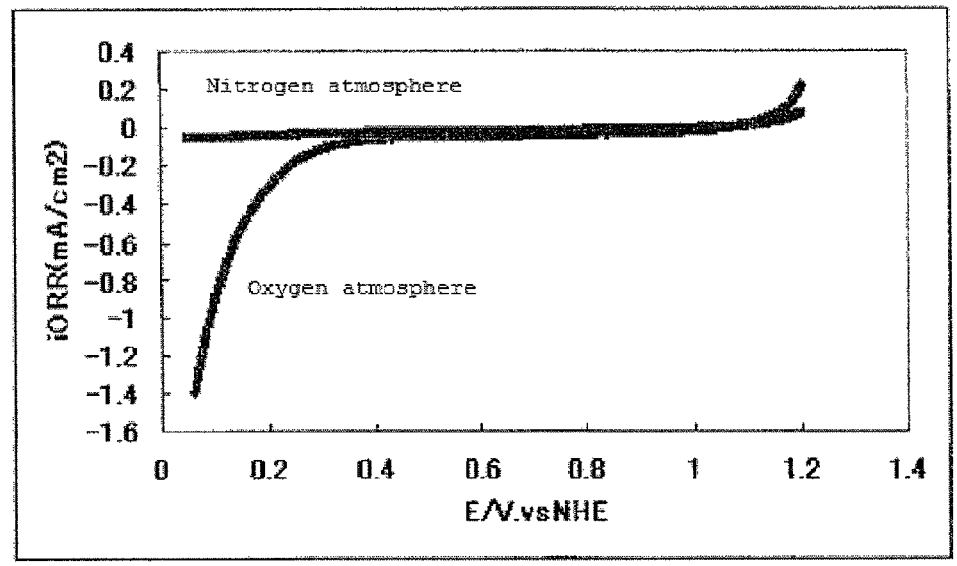
FIG. 66 is a graph showing an evaluation of the oxygen reducing ability of a fuel cell electrode (28) in Comparative Example 2.

The current-potential curve recorded during the measurement is shown in FIG. 66.

The fuel cell electrode (28) manufactured in Comparative Example 1 had an oxygen reduction onset potential of 0.50 V (vs. NHE) and was found to have low oxygen reducing ability.

Comparative Example 3

1. Preparation of Catalyst

Niobium carbide (NbC) weighing 5.88 g (56 mmol), cerium oxide ($CeO_2$) weighing 0.86 g (5 mmol) and niobium nitride (NbN) weighing 5.14 g (48 mmol) were sufficiently crushed and mixed together. The resultant powder mixture was heat treated in a tubular furnace under a nitrogen atmosphere at 1600° C. for 3 hours to give 11.69 g of a carbonitride containing cerium and niobium (hereinafter, also the catalyst (29)).

The sintered catalyst (29) was crushed with a ball mill.

The results of elemental analysis of the crushed catalyst (29) are shown in Table 1.

2. Production of Fuel Cell Electrode

A fuel cell electrode (29) was produced in the same manner as in Example 1, except that the catalyst (29) was used.

3. Evaluation of Oxygen Reducing Ability

The fuel cell electrode (29) was evaluated for catalytic performance (oxygen reducing ability) as described in Example 1.

Figure 67:
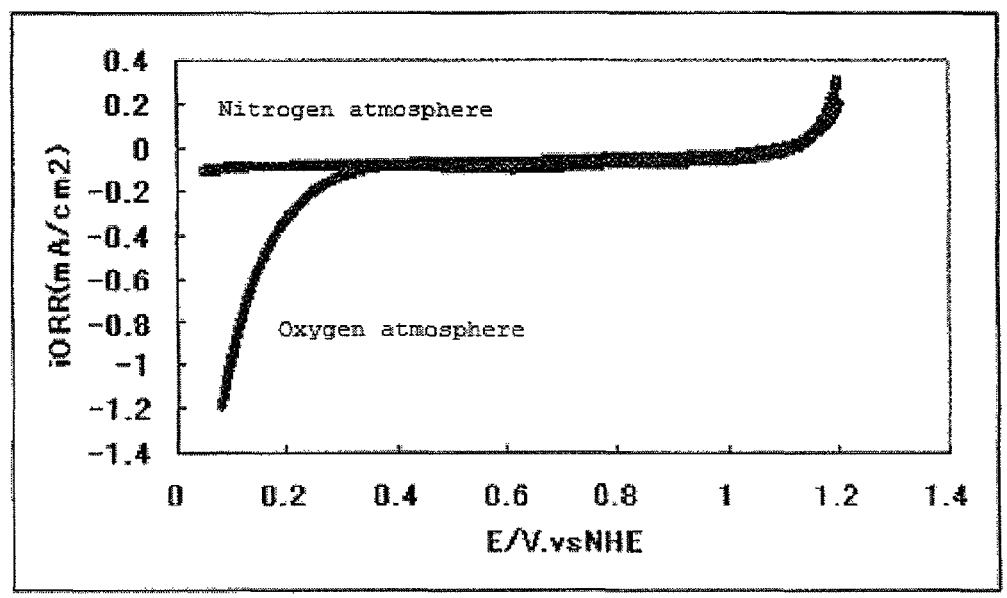
FIG. 67 is a graph showing an evaluation of the oxygen reducing ability of a fuel cell electrode (29) in Comparative Example 3.

The current-potential curve recorded during the measurement is shown in FIG. 67.

The fuel cell electrode (29) manufactured in Comparative Example 1 had an oxygen reduction onset potential of 0.45 V (vs. NHE) and was found to have low oxygen reducing ability.

TABLE 1

Results of elemental analysis of the catalysts
(% by mass (The numbers in parenthesis indicate ratios of the numbers of the atoms.))

| | Nb | Metal | C | N | O | Composition |
|---|---|---|---|---|---|---|
| Ex. 2 | 76.6 (0.96) | Sn: 3.1 (0.04) | 3.3 (0.33) | 5.0 (0.42) | 11.1 (0.81) | $Nb_{0.96}Sn_{0.04}C_{0.33}N_{0.42}O_{0.81}$ |
| Ex. 3 | 62.2 (0.79) | Sn: 21.9 (0.21) | 4.9 (0.48) | 3.2 (0.27) | 11.8 (0.87) | $Nb_{0.79}Sn_{0.21}C_{0.48}N_{0.27}O_{0.87}$ |
| Ex. 5 | 77.8 (0.98) | In: 2.8 (0.02) | 3.7 (0.36) | 5.0 (0.42) | 11.1 (0.81) | $Nb_{0.98}In_{0.02}C_{0.36}N_{0.42}O_{0.81}$ |
| Ex. 6 | 64.0 (0.81) | In: 18.0 (0.19) | 6.5 (0.64) | 2.4 (0.20) | 9.7 (0.72) | $Nb_{0.81}In_{0.19}C_{0.64}N_{0.20}O_{0.72}$ |
| Ex. 12 | 68.1 (0.96) | Fe: 1.8 (0.04) | 2.9 (0.33) | 0.7 (0.07) | 26.6 (2.18) | $Nb_{0.96}Fe_{0.04}C_{0.33}N_{0.07}O_{2.18}$ |
| Ex. 13 | 67.8 (0.99) | Mn: 0.43 (0.01) | 3.3 (0.37) | 0.8 (0.07) | 27.7 (2.35) | $Nb_{0.99}Mn_{0.01}C_{0.37}N_{0.07}O_{2.35}$ |
| Ex. 14 | 64.8 (0.97) | Ce: 2.8 (0.03) | 2.6 (0.30) | 0.5 (0.05) | 29.3 (2.55) | $Nb_{0.97}Ce_{0.03}C_{0.30}N_{0.05}O_{2.55}$ |
| Ex. 15 | 68.9 (0.95) | Cr: 2.0 (0.05) | 3.3 (0.35) | 1.4 (0.13) | 26.5 (2.12) | $Nb_{0.95}Cr_{0.05}C_{0.35}N_{0.13}O_{2.12}$ |
| Ex. 16 | 67.2 (0.95) | Fe: 2.1 (0.05) | 3.2 (0.35) | 0.7 (0.07) | 26.8 (2.20) | $Nb_{0.95}Fe_{0.05}C_{0.35}N_{0.07}O_{2.20}$ |
| Ex. 17 | 66.7 (0.97) | Co: 1.3 (0.03) | 2.9 (0.32) | 0.6 (0.05) | 28.6 (2.42) | $Nb_{0.97}Co_{0.03}C_{0.32}N_{0.05}O_{2.42}$ |
| Ex. 18 | 67.0 (0.96) | Au: 5.5 (0.04) | 3.8 (0.42) | 1.8 (0.17) | 23.0 (1.92) | $Nb_{0.96}Au_{0.04}C_{0.42}N_{0.17}O_{1.92}$ |
| Ex. 19 | 67.0 (0.97) | Ag: 2.3 (0.03) | 3.0 (0.34) | 0.72 (0.07) | 27.0 (2.28) | $Nb_{0.97}Ag_{0.03}C_{0.34}N_{0.07}O_{2.28}$ |
| Ex. 20 | 66.0 (0.95) | Pd: 4.0 (0.05) | 2.2 (0.25) | 0.53 (0.05) | 24.0 (2.01) | $Nb_{0.95}Pd_{0.05}C_{0.25}N_{0.05}O_{2.01}$ |
| Ex. 21 | 63.0 (0.97) | Ir: 3.5 (0.03) | 2.6 (0.31) | 0.6 (0.06) | 24.0 (2.16) | $Nb_{0.97}Ir_{0.03}C_{0.31}N_{0.06}O_{2.16}$ |
| Ex. 22 | 65.0 (0.97) | Ru: 2.3 (0.03) | 1.9 (0.32) | 0.41 (0.05) | 24.0 (2.42) | $Nb_{0.97}Ru_{0.03}C_{0.32}N_{0.05}O_{2.42}$ |
| Comp. Ex. 1 | 83.4 (1) | | 5.87 (0.55) | 5.53 (0.44) | | $NbC_{0.55}N_{0.44}$ |
| Comp. Ex. 2 | 84.9 (0.96) | Fe: 2.4 (0.04) | 5.23 (0.46) | 7.21 (0.54) | | $Nb_{0.96}Fe_{0.04}C_{0.46}N_{0.54}$ |
| Comp. Ex. 3 | 83.2 (0.98) | Ce: 3.2 (0.02) | 5.22 (0.47) | 6.93 (0.54) | | $Nb_{0.98}Ce_{0.02}C_{0.47}N_{0.54}$ |

TABLE 2

Oxygen reduction onset potential of the catalysts

| | Oxygen reduction onset potential (V (vs. NHE)) |
|---|---|
| Ex. 1 | 0.78 |
| Ex. 2 | 0.72 |
| Ex. 3 | 0.65 |
| Ex. 4 | 0.80 |
| Ex. 5 | 0.80 |
| Ex. 6 | 0.80 |
| Ex. 7 | 0.82 |
| Ex. 8 | 0.83 |
| Ex. 9 | 0.90 |
| Ex. 10 | 0.95 |
| Ex. 11 | 0.85 |
| Comp. Ex. 1 | 0.45 |
| Ex. 12 | 0.90 |
| Ex. 13 | 0.85 |
| Ex. 14 | 0.86 |
| Ex. 15 | 0.85 |
| Ex. 16 | 0.90 |
| Ex. 17 | 0.87 |
| Ex. 18 | 0.90 |
| Ex. 19 | 0.88 |
| Ex. 20 | 0.88 |
| Ex. 21 | 0.88 |
| Ex. 22 | 0.88 |
| Ex. 23 | 0.88 |
| Ex. 24 | 0.85 |
| Ex. 25 | 0.85 |
| Ex. 26 | 0.90 |
| Comp. Ex. 2 | 0.50 |
| Comp. Ex. 3 | 0.45 |

Industrial Applicability

The catalysts of the invention are not corroded in acidic electrolytes or at high potential and have excellent durability and high oxygen reducing ability. The catalysts are therefore suitably used in fuel cell catalyst layers, electrodes, membrane electrode assemblies and fuel cells.

The invention claimed is:

1. A catalyst which comprises a metal oxycarbonitride containing niobium and at least one metal (hereinafter the "metal M" or "M") selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel, wherein the metal oxycarbonitride has a compositional formula represented by $Nb_aM_bC_xN_yO_z$ wherein a, b, x, y and z represent a ratio of the numbers of the atoms, $0.01 \leq a < 1$, $0 < b \leq 0.99$, $0.01 \leq x \leq 2$, $0.01 \leq y \leq 2$, $0.01 \leq z \leq 3$, $a+b=1$, and $x+y+z \leq 5$.

2. The catalyst according to claim 1, wherein the metal oxycarbonitride shows two or more diffraction peaks at diffraction angles 2θ of 33° to 43° as measured by powder X-ray diffractometry via Cu—Kα radiation.

3. The catalyst according to claim 1, wherein the metal oxycarbonitride is a mixture comprising a plurality of phases and the metal oxycarbonitride shows a peak assigned to $Nb_{12}O_{29}$ as measured by powder X-ray diffractometry (Cu—Kα radiation).

4. A process for producing a catalyst comprising a metal oxycarbonitride of claim 1, the process comprising a step (ia) of heat treating a mixture comprising an oxide of at least one metal M, niobium oxide and carbon in a nitrogen atmosphere or an inert gas containing nitrogen to give a metal carbonitride; and a step (ii) of heat treating the metal carbonitride in an oxygen-containing inert gas to give a catalyst comprising a metal oxycarbonitride.

5. The process according to claim 4, wherein the heat treatment in the step (ia) is performed at a temperature in the range of 600 to 1800° C.

6. The process according to claim 4, wherein the heat treatment in the step (ii) is performed at a temperature in the range of 400 to 1400° C.

7. The process according to claim 4, wherein the inert gas in the step (ii) has an oxygen gas concentration in the range of 0.1 to 10% by volume.

8. The process according to claim 4, wherein the inert gas in the step (ii) contains hydrogen gas at not more than 5% by volume.

9. A process for producing a catalyst comprising a metal oxycarbonitride of claim 1, the process comprising a step (ib) of heat treating a mixture comprising an oxide of at least one metal M, niobium carbide and niobium nitride in an inert gas to give a metal carbonitride; and a step (ii) of heat treating the metal carbonitride in an oxygen-containing inert gas to give a catalyst comprising a metal oxycarbonitride.

10. The process according to claim 9, wherein the heat treatment in the step (ib) is performed at a temperature in the range of 600 to 1800° C.

11. A process for producing a catalyst comprising a metal oxycarbonitride of claim 1, the process comprising a step (ic) of heat treating a mixture comprising an oxide of at least one metal M, niobium carbide, niobium nitride and niobium oxide in an inert gas to give a metal carbonitride; and a step (ii) of heat treating the metal carbonitride in an oxygen-containing inert gas to give a catalyst comprising a metal oxycarbonitride.

12. The process according to claim 11, wherein the heat treatment in the step (ic) is performed at a temperature in the range of 600 to 1800° C.

13. A process for producing a catalyst comprising a metal oxycarbonitride of claim 1, the process comprising a step (id) of heat treating a mixture comprising a compound containing at least one metal M, niobium carbide and niobium nitride in an inert gas to give a metal carbonitride; and a step (ii) of heat treating the metal carbonitride in an oxygen-containing inert gas to give a catalyst comprising a metal oxycarbonitride.

14. The process according to claim 13, wherein the heat treatment in the step (id) is performed at a temperature in the range of 600 to 1800° C.

15. A catalyst layer for fuel cells, comprising the catalyst of claim 1.

16. The catalyst layer for fuel cells according to claim 15, further comprising electron conductive particles as a carrier for the catalyst.

17. An electrode comprising a catalyst layer for fuel cells and a porous support layer, wherein the catalyst layer for fuel cells is the catalyst layer for fuel cells of claim 15.

18. A membrane electrode assembly comprising a cathode, an anode and an electrolyte membrane interposed between the cathode and the anode, wherein the cathode and/or the anode is the electrode of claim 17.

19. A fuel cell comprising the membrane electrode assembly of claim 18.

20. A polymer electrolyte fuel cell comprising the membrane electrode assembly of claim 18.

* * * * *